(12) United States Patent
Kozma et al.

(10) Patent No.: US 12,566,904 B2
(45) Date of Patent: Mar. 3, 2026

(54) METHODS AND SYSTEMS FOR DOMAIN-SPECIFIC INTERVIEW SIMULATIONS

(71) Applicants:Christian Kozma, Simpsonville, SC (US); James Chesser, Fountain Inn, SC (US)

(72) Inventors: Christian Kozma, Simpsonville, SC (US); James Chesser, Fountain Inn, SC (US)

( * ) Notice: Subject to any disclaimer, the term of this patent is extended or adjusted under 35 U.S.C. 154(b) by 0 days.

(21) Appl. No.: 19/300,607

(22) Filed: Aug. 14, 2025

(65) Prior Publication Data

US 2026/0050707 A1      Feb. 19, 2026

Related U.S. Application Data

(60) Provisional application No. 63/683,284, filed on Aug. 15, 2024.

(51) Int. Cl.
| | |
|---|---|
| *G06F 21/00* | (2013.01) |
| *G06F 21/57* | (2013.01) |
| *G06F 21/62* | (2013.01) |
| *G06F 30/20* | (2020.01) |
| *G06T 13/40* | (2011.01) |
| *H04L 9/40* | (2022.01) |
| *H04W 12/02* | (2009.01) |

(52) U.S. Cl.
CPC ............ *G06F 30/20* (2020.01); *G06F 21/577* (2013.01); *G06F 21/6254* (2013.01); *G06T 13/40* (2013.01); *H04L 63/0407* (2013.01); *H04W 12/02* (2013.01)

(58) Field of Classification Search
CPC .... G06F 30/20; G06F 21/577; G06F 21/6254; G06T 13/40; H04L 63/0407; H04W 12/02
See application file for complete search history.

(56) References Cited

U.S. PATENT DOCUMENTS

| | | | |
|---|---|---|---|
| 2024/0428015 A1* | 12/2024 | Yoon | G06F 40/40 |
| 2025/0225375 A1* | 7/2025 | Lohiya | G06N 3/092 |
| 2025/0259754 A1* | 8/2025 | Hamilton | G16H 80/00 |
| 2025/0273334 A1* | 8/2025 | Brigham | G16H 50/20 |
| 2025/0315214 A1* | 10/2025 | Ataei | G06F 8/20 |

OTHER PUBLICATIONS

Xu, Ruijian, et al. "Learning an effective context-response matching model with self-supervised tasks for retrieval-based dialogues." Proceedings of the AAAI Conference on Artificial Intelligence. vol. 35. No. 16. 2021. (Year: 2021).*

* cited by examiner

*Primary Examiner* — Ka Shan Choy
(74) *Attorney, Agent, or Firm* — Polsinelli LLP

(57) ABSTRACT

The present disclosure relates to systems and methods for domain-specific interview simulations performed through generative artificial intelligence semantic matching with concurrent completions, logic configurations sharing characteristics of both discriminative and recurrent neural networks, stochastic corrections, data matrices and object-oriented data processing, Natural Language Processing (NLP), and real-time and batch data analysis and optimization. Components of these systems are combined to extract understanding and meaning of user-to-virtual entity interactions in domain-specific and realistic interrogation environments, thereby creating improved methods of education and interview preparation.

21 Claims, 44 Drawing Sheets

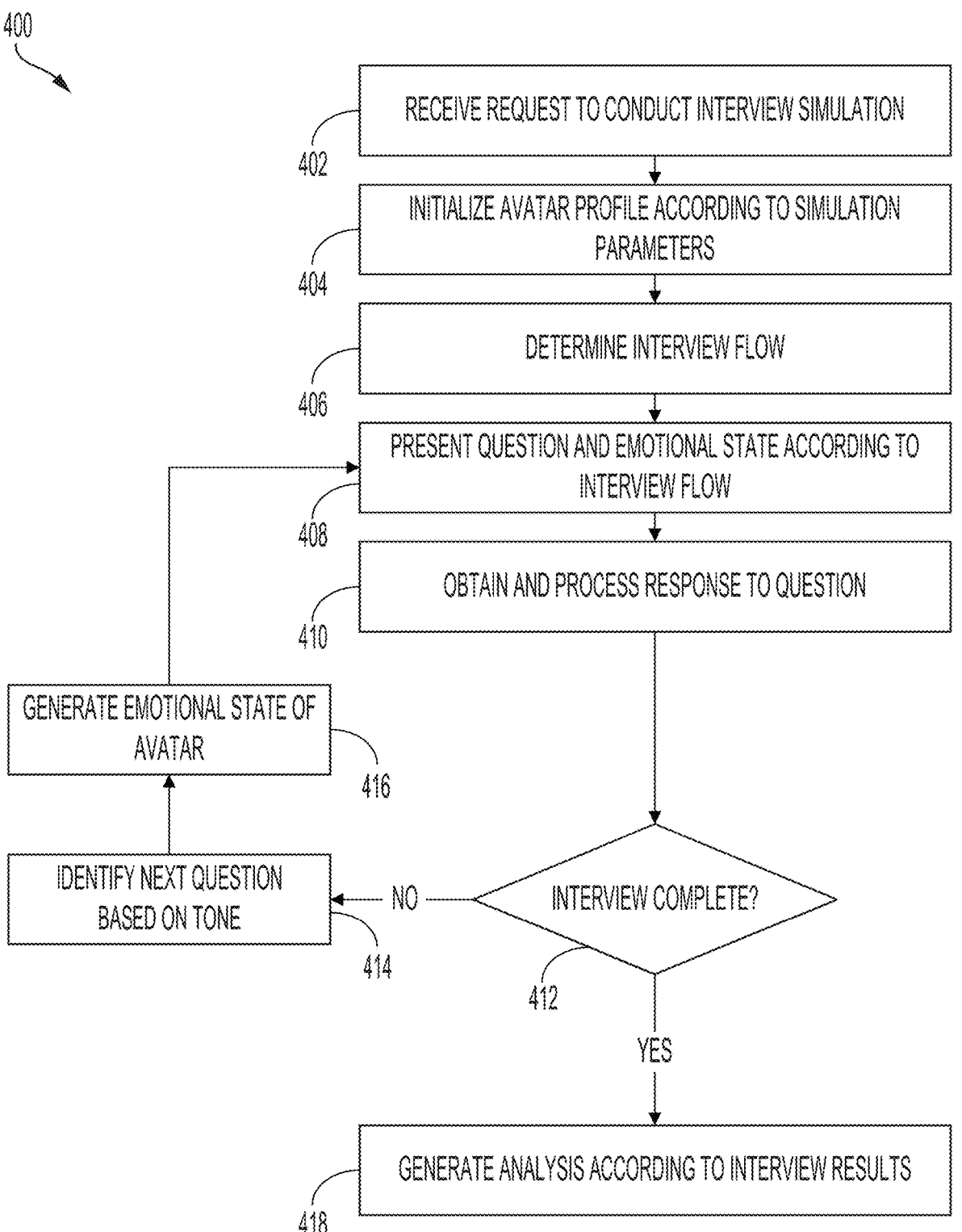

400

402   RECEIVE REQUEST TO CONDUCT INTERVIEW SIMULATION

404   INITIALIZE AVATAR PROFILE ACCORDING TO SIMULATION PARAMETERS

406   DETERMINE INTERVIEW FLOW

408   PRESENT QUESTION AND EMOTIONAL STATE ACCORDING TO INTERVIEW FLOW

410   OBTAIN AND PROCESS RESPONSE TO QUESTION

416   GENERATE EMOTIONAL STATE OF AVATAR

414   IDENTIFY NEXT QUESTION BASED ON TONE

412   INTERVIEW COMPLETE?

NO

YES

418   GENERATE ANALYSIS ACCORDING TO INTERVIEW RESULTS

702 — PROCESS FINALIZED USER INPUT AS PART OF INTERROGATION SIMULATION PROCESS

704 — FINAL ANALYSIS?

706 — LOAD INTERIM ANALYSIS TEMPLATE AND READ LAST STATE CHANGE DETAILS

NO

YES

708 — LOAD FINAL ANALYSIS TEMPLATE AND READ FULL INTERROGATION DETAILS

710 — POPULATE ANALYSIS TEMPLATE AND GENERATE DOMAIN-SPECIFIC DETAILS

712 — GENERATE RESPONSE PAYLOAD

714 — PRESENT RESPONSE TO USER

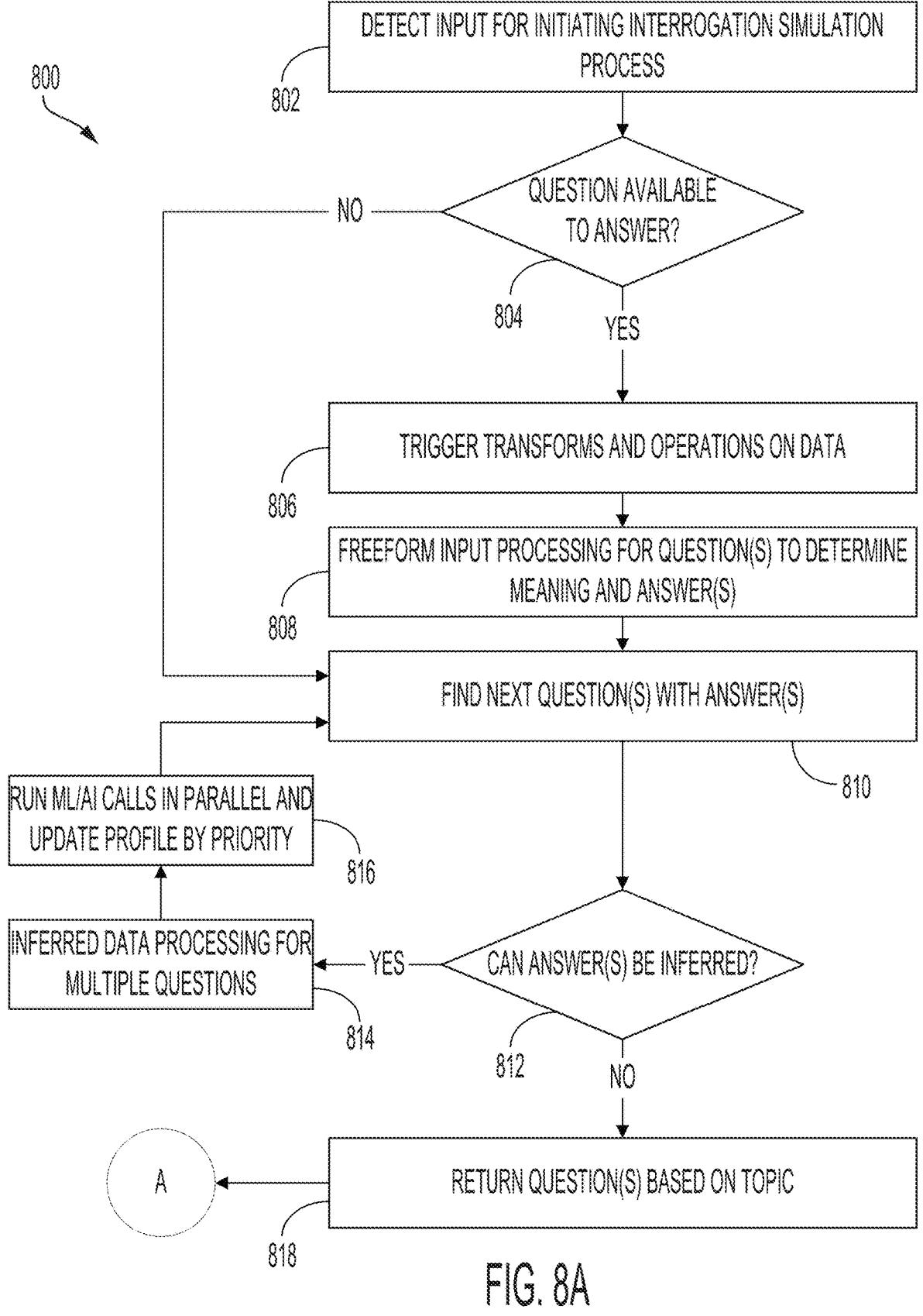

800

802  DETECT INPUT FOR INITIATING INTERROGATION SIMULATION PROCESS

804  QUESTION AVAILABLE TO ANSWER?

NO

YES

806  TRIGGER TRANSFORMS AND OPERATIONS ON DATA

808  FREEFORM INPUT PROCESSING FOR QUESTION(S) TO DETERMINE MEANING AND ANSWER(S)

810  FIND NEXT QUESTION(S) WITH ANSWER(S)

816  RUN ML/AI CALLS IN PARALLEL AND UPDATE PROFILE BY PRIORITY

814  INFERRED DATA PROCESSING FOR MULTIPLE QUESTIONS

812  CAN ANSWER(S) BE INFERRED?

YES

NO

818  RETURN QUESTION(S) BASED ON TOPIC

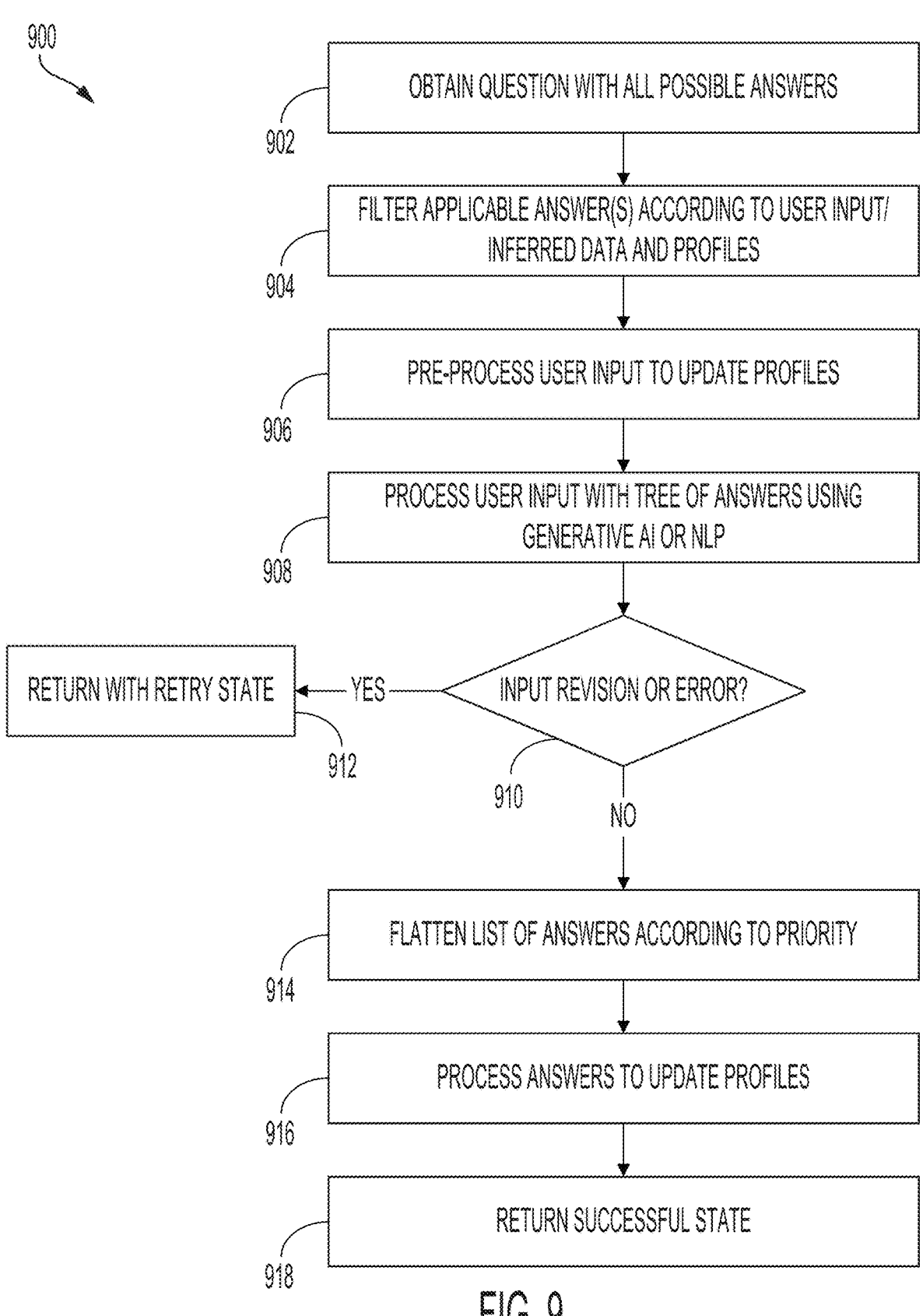

900

OBTAIN QUESTION WITH ALL POSSIBLE ANSWERS
902

FILTER APPLICABLE ANSWER(S) ACCORDING TO USER INPUT/ INFERRED DATA AND PROFILES
904

PRE-PROCESS USER INPUT TO UPDATE PROFILES
906

PROCESS USER INPUT WITH TREE OF ANSWERS USING GENERATIVE AI OR NLP
908

INPUT REVISION OR ERROR?
910

RETURN WITH RETRY STATE ← YES
912

NO

FLATTEN LIST OF ANSWERS ACCORDING TO PRIORITY
914

PROCESS ANSWERS TO UPDATE PROFILES
916

RETURN SUCCESSFUL STATE
918

FIG. 9

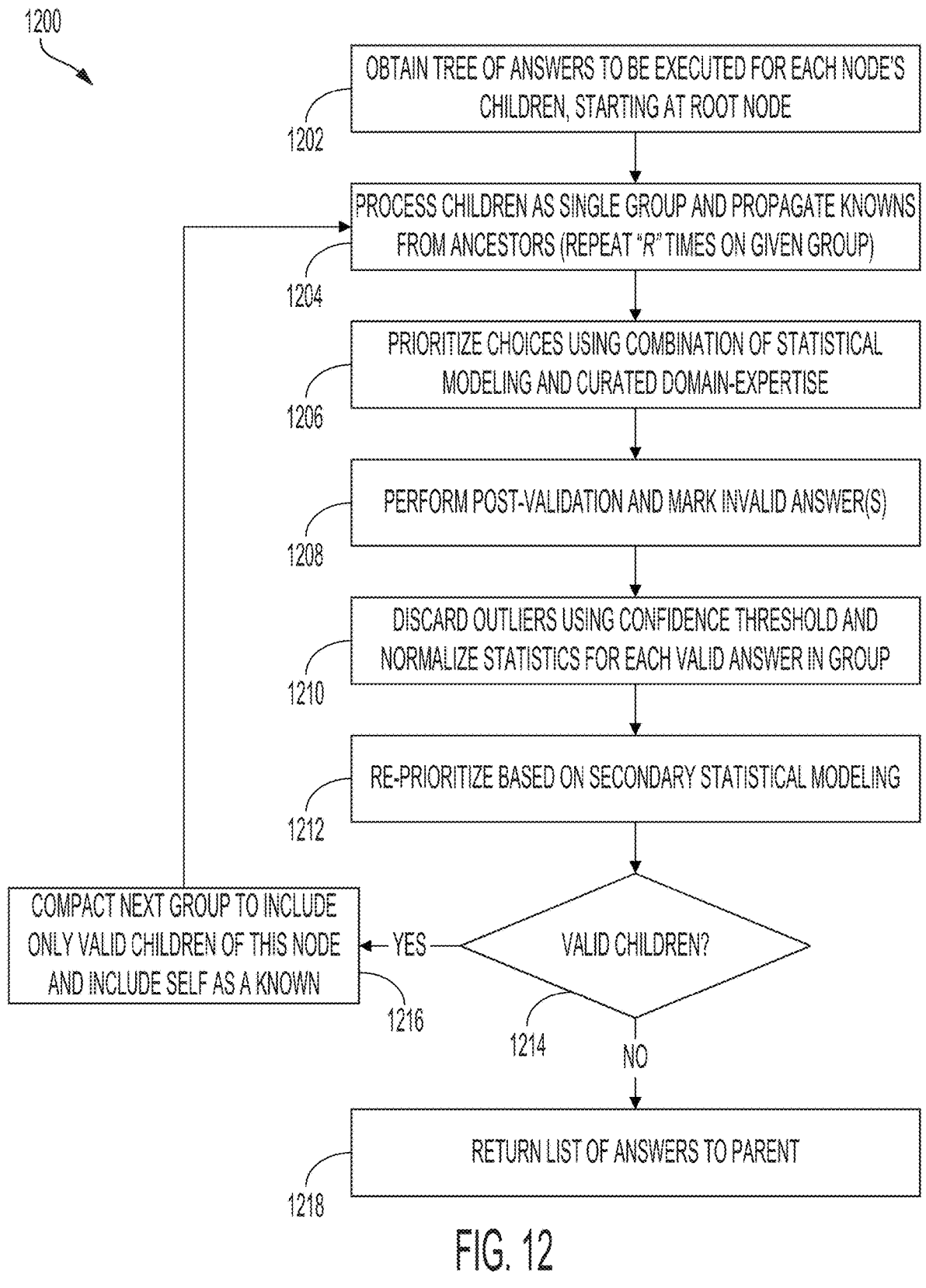

1200

1202 — OBTAIN TREE OF ANSWERS TO BE EXECUTED FOR EACH NODE'S CHILDREN, STARTING AT ROOT NODE

1204 — PROCESS CHILDREN AS SINGLE GROUP AND PROPAGATE KNOWNS FROM ANCESTORS (REPEAT "R" TIMES ON GIVEN GROUP)

1206 — PRIORITIZE CHOICES USING COMBINATION OF STATISTICAL MODELING AND CURATED DOMAIN-EXPERTISE

1208 — PERFORM POST-VALIDATION AND MARK INVALID ANSWER(S)

1210 — DISCARD OUTLIERS USING CONFIDENCE THRESHOLD AND NORMALIZE STATISTICS FOR EACH VALID ANSWER IN GROUP

1212 — RE-PRIORITIZE BASED ON SECONDARY STATISTICAL MODELING

1214 — VALID CHILDREN?

1216 — COMPACT NEXT GROUP TO INCLUDE ONLY VALID CHILDREN OF THIS NODE AND INCLUDE SELF AS A KNOWN

YES

NO

1218 — RETURN LIST OF ANSWERS TO PARENT

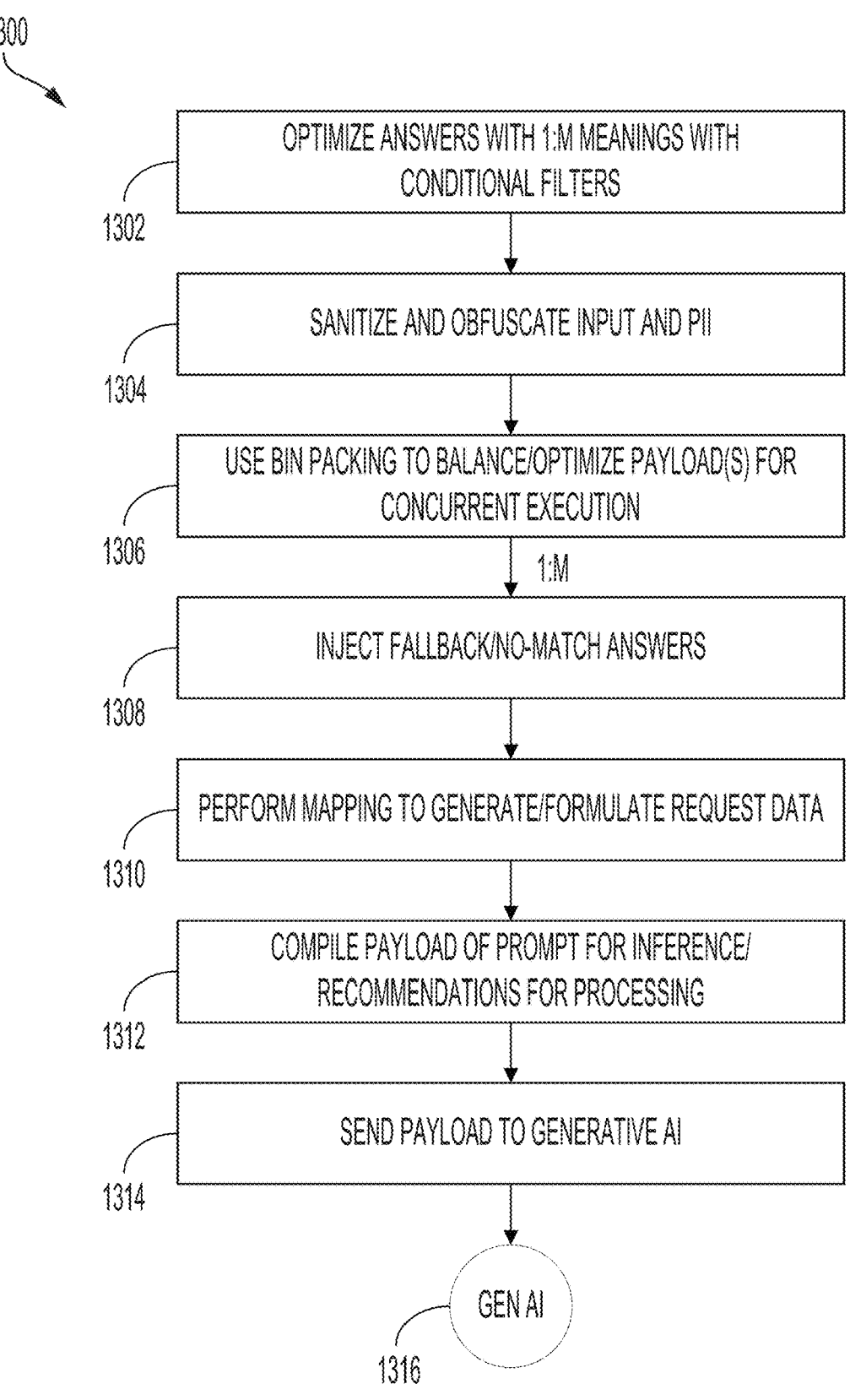

OPTIMIZE ANSWERS WITH 1:M MEANINGS WITH CONDITIONAL FILTERS

1302

SANITIZE AND OBFUSCATE INPUT AND PII

1304

USE BIN PACKING TO BALANCE/OPTIMIZE PAYLOAD(S) FOR CONCURRENT EXECUTION

1306

1:M

INJECT FALLBACK/NO-MATCH ANSWERS

1308

PERFORM MAPPING TO GENERATE/FORMULATE REQUEST DATA

1310

COMPILE PAYLOAD OF PROMPT FOR INFERENCE/ RECOMMENDATIONS FOR PROCESSING

1312

SEND PAYLOAD TO GENERATIVE AI

1314

GEN AI

OBTAIN ANSWERS DEFINING CODIFIED MEANINGS BEHIND THE
ANSWER TO THE QUESTION

1502

EXTRACT ALL NUMBERS FROM THE TEXT AND
STORE IN "COLLIDING NUMBERS" SET

1504

A

GENERATE 1:1 ORDINAL MAPPING FOR THE ANSWERS

1506

FORMULATE AND RETURN PROMPT

1508

1500

1600

C

1640 — FORMULATE REQUEST THAT EXTRACTS DATE FROM INPUT ACCORDING TO PRESCRIBED FORMAT

1642 — NLP

RETURN ERROR

1646

NO ← VALID ANSWER?

1644

YES

RETURN TREE OF ANSWERS AND REVISED ANSWER

1648

1800

2100

FIG. 23A

METHODS AND SYSTEMS FOR DOMAIN-SPECIFIC INTERVIEW SIMULATIONS

CROSS-REFERENCE TO RELATED APPLICATIONS

The present application claims the priority benefit of U.S. provisional patent application No. 63/683,284 filed Aug. 15, 2024, the disclosures of which are incorporated by reference herein.

FIELD

The present disclosure relates generally to systems and methods for domain-specific interview simulations performed through generative artificial intelligence semantic matching with concurrent completions, logic configurations sharing characteristics of both discriminative and recurrent neural networks, stochastic corrections, data matrices and object-oriented data processing, explicit and implicit conditions, key variables, Natural Language Processing (NLP), and real-time and batch data analysis and optimization. Components of these systems are combined with various algorithms and Boolean logic to produce Natural Language Understanding (NLU). This method of NLU extracts meaning and offers understanding of person-to-virtual entity interactions in domain-specific and realistic interrogation environments, thereby creating improved methods of education and interview preparation.

BACKGROUND

Systems that implement Large Language Models (LLMs) often possess advanced text generation capabilities that are useful in various applications. However, these systems have notable limitations when creating semantic automated agents for domain-specific environments where context, emotional intelligence, and deep understanding are crucial. Despite their ability to conduct conversations in a realistic manner and to organize diverse information convincingly, fundamental deficiencies have emerged in real-time, domain-specific interactions.

A fundamental deficiency of systems that implement LLMs is that they typically lack deep understanding. For instance, while LLMs generate responses based on patterns in the data used to train them, these LLMs do not truly understand the underlying meaning of the text. These LLMs thus lack comprehension of any given data context beyond the immediate text they process. This can lead to responses that, while semantically correct, are contextually and emotionally inappropriate.

Another example of a fundamental deficiency of these LLMs is the difficulty in maintaining context over long conversations. The systems that implement these LLMs often lose track of prior interactions, leading to irrelevant or repetitive questions and answers during the course of a conversation. In a domain-specific environment, maintaining context over several interactions is important for meaningful dialogue and progression. However, traditional LLMs do not comprehend context in the same manner as humans.

LLMs further do not inherently possess any emotional intelligence and cannot, therefore, accurately interpret or respond to human emotions during ongoing conversations. As a result, these LLMs can often generate responses that may seem insensitive, impersonal, or otherwise inappropriate in emotionally charged situations. Emotional misinterpretations are especially dangerous in an interrogation environment as they can lead to interviewee or interviewer frustration and a breakdown in communication.

In many instances, LLMs further fail to grasp subtle nuance and ambiguities in language. This can often occur as a result of these LLMs not having an awareness of a person's culture, emotional energy, age, conversation context, and the like. An automated agent acting as an interviewer may incorrectly interpret figurative language, sarcasm, or idiomatic expressions literally. Misunderstanding nuanced language can result in user responses that do not align with the user's intent, causing confusion or an untoward conclusion by the interviewer.

While LLMs can be fine-tuned with domain-specific data, these LLMs may still lack the depth and breadth of knowledge required for specialized fields such as law, science, finance, and the like. These LLMs can provide generic responses or misinformation due to limitations in meaningful training data, which could include the culture of the interviewee, or unique policies or idiosyncrasies inherent in the physical office where they are appearing for an interview. Further, sudden changes in the domain-specific environment (e.g., new administrative procedures, rules, mandates, etc.) may not be known to the public at large and, thus, may not be included in the LLM as updating the LLM may be difficult to perform quickly. Inaccurate or superficial responses can undermine the credibility of the automated agent in specialized domains such as law, science, finance, and the like.

LLMs trained on sentence patterns, structure, and proximity of critical word tokens often have difficulty creating meaningful, context-aware questions because they may not grasp the meaning of previous interactions or the user's intent the way a human would. As a result, in domain-specific environments, LLMs can generate questions that are irrelevant, too generic, or otherwise fail to drive the conversation forward. This inability to formulate meaningful follow-up questions can disrupt the flow of conversation and limit the automated agent's usefulness.

Another common deficiency of LLMs is their lack of ethical reasoning to avoid sensitive or inappropriate topics without explicit filtering and additional layers of moderation, which can be costly to implement. Further, Generative Pre-trained Transformers (GPTs) in particular can inadvertently generate inaccurate, harmful, or biased content based on their training data and application programming interface (API) settings. While certain methods such as Retrieval-Augmented Generation (RAG) processing and gateway filters may reduce these issues, they cannot control them due to the fundamental lack of data provenance associated with LLMs. That is, LLMs in their present configurations, cannot easily introduce or remove specific amounts of bias or misinformation for teaching purposes. However, in real-life interview simulations, it is useful to educate a pupil on how to recognize and deal with bias and misinformation, which are regrettable, but indelible human foibles that all interviewees must overcome to some extent.

LLMs further do not naturally personalize responses based on individual user preferences or histories. These LLMs treat each interaction in isolation unless specifically designed to incorporate user data. Lack of personalization can make interactions feel generic and impersonal, reducing user engagement and satisfaction.

Semantic automated agents, driven by LLMs, often rely on complex pattern recognition, which limits their effectiveness as interview preparation resources due to their lack of human understanding. These systems are more adept at handling word meanings and prompt completions than at interpreting fixed regulations or the nuances of human personalities, which require special data curation and pre-training by subject-matter experts.

While solutions to these deficiencies are being developed, automated agents and generative artificial intelligence systems alone are still unable to provide data provenance. These systems also struggle to prioritize, weigh, partition, or control the real-time processing of multiple issues, which may unfold from an interview response. These systems also fail to analyze these responses-either in real-time or following an interview-against inherent human bias, relevance, intuition, credibility assessments, or a complex code of laws or domain-specific rules. Further, generative artificial intelligence systems are subject to hallucinations which various proofs (e.g., Cantor's Diagonalization Argument, etc.) suggest may be impossible ever to fully eliminate. Since current generative artificial intelligence systems traverse opaque deep learning systems containing exabytes of data without the ability to trace their processes, identifying, correcting, or controlling misinformation can be challenging.

LLMs currently struggle with context awareness, either knowing what context is important to determine, or how to obtain that information in real-time. For example, it may not be prudent to ask an interviewee about context—especially when credibility is at issue—but rather to review prior written filings or to reach out to more neutral, vetted factual sources. LLMs do not always know what they need to know to provide reliable, accurate answers to nuanced domain-specific subjects. Also, LLMs may struggle to perceive credibility issues, which are often inextricably linked to context—that is, an interviewee's answer to a question may be a deliberate lie, or a misunderstanding or error based on lack of knowledge.

Thus, LLMs often lack the critical attributes necessary for effective teaching through simulated realistic interviews in specialized fields. These attributes include data provenance, bias control, and the ability to relate pre-curated meanings of a user's responses to the interviewer personally and in relation to the codified rules or laws the user must follow. Effective interview preparation should prioritize human context and the interpretation of meanings, particularly where humans must make discretionary inferences and apply complex rules. For educational purposes, the system must also be reliable, engaging, simple, and practical. Therefore, a domain-specific system is required that more effectively utilized artificial intelligence methods and logic processes for accurately extracting complex content and inferring human meaning and emotions.

SUMMARY

The present disclosure relates to an educational process that teaches through simulation of person-to-person interviews, either with a live interviewee and a virtual interviewer (i.e., an automated agent), or with a live interviewer and a virtual interviewee. This educational process incorporates realistic attributes and relevant real-time data, and analyzes both human meanings of the responses given and their relevance to domain-specific codes or rules.

This educational process, in an embodiment, employs a domain-specific method for creating questions, using document analysis and semantic decomposition. The process includes real-time issue identification, partitioning, and prioritization to assess whether an interviewee qualifies for specific benefits, relief, or discretionary adjudication. The education and feedback provided by this process can help prepare a pupil or other user for crucial in-person applications, such as live consular visa interviews, asylum or adjustment of immigration status interviews, or border crossing examinations. Additionally, this interview preparation methodology can be applied to other fields, including medicine, taxes, engineering, and the like.

Individuals who lack training in complex domain-specific subjects often have difficulty maintaining focus over long periods while learning new concepts. They may be distracted by or uninterested in issues that do not directly apply to their particular scenario. The present systems and methods address these challenges by educating users in only the specific issues that apply to them. The systems and methods described herein further help maintain user attention by offering an interface where visual, emotional, and semantic elements stimulate a desire for repetitive use. Repetitive use creates experience, which can further educate users.

In an embodiment, the systems and methods described herein are designed to analyze in real-time the human meaning and legal relevance of each response a user provides to a simulated interviewer's questions. This allows for instant generation of reports, detailing answer relevance to specific laws, key facts, credibility, and emotional responses. This feature is especially useful in domain-specific environments or situations where interviewee's culture and primary language differ from that of the interviewer, making the subjective interpretation of the interviewee's responses, and their perceived meaning, critically important.

The present disclosure provides: 1) a comprehensive method and process for delivering simulated experience-based training for users anticipating a benefit or discretionary decision from a future live interview; 2) enhanced techniques for acquiring and evaluating relevant background data both prior to and during the simulated interview; and 3) an intuitive, engaging, and educational user interface applicable in various domain-specific environments, capable of providing detailed real-time interpretation as well as post-interview analyses of the questions posed, the responses given, and the corresponding legal implications.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Illustrative embodiments are described in detail below with reference to the following figures.

FIG. 4 shows an illustrative example of a process for conducting an interview simulation in accordance with at least one embodiment;

FIGS. 8A-8B show an illustrative example of the interrogation simulation process executed by the domain-specific interview simulation system in accordance with at least one embodiment;

FIG. 9 shows an illustrative example of a process for identifying applicable answers to user inputs and updating corresponding profiles according to processing of the user input with a corresponding tree of applicable answers in accordance with at least one embodiment;

FIG. 12 shows an illustrative example of a process for conducting a statistical analysis of answers within a tree of answers to prioritize valid answers in accordance with at least one embodiment;

FIGS. 13A-13B show an illustrative example of a process for parsing and decoding a single group of answers while considering contextual ambiguity in accordance with at least one embodiment;

FIGS. 23A-23B show an illustrative example of conditions view windows associated with a system editor in accordance with at least one embodiment;

FIGS. 29A-29B show an illustrative example of tone editor view windows associated with a system editor in accordance with at least one embodiment;

FIG. 30 shows an illustrative example of a search window associated with a system editor in accordance with at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Figure 1:
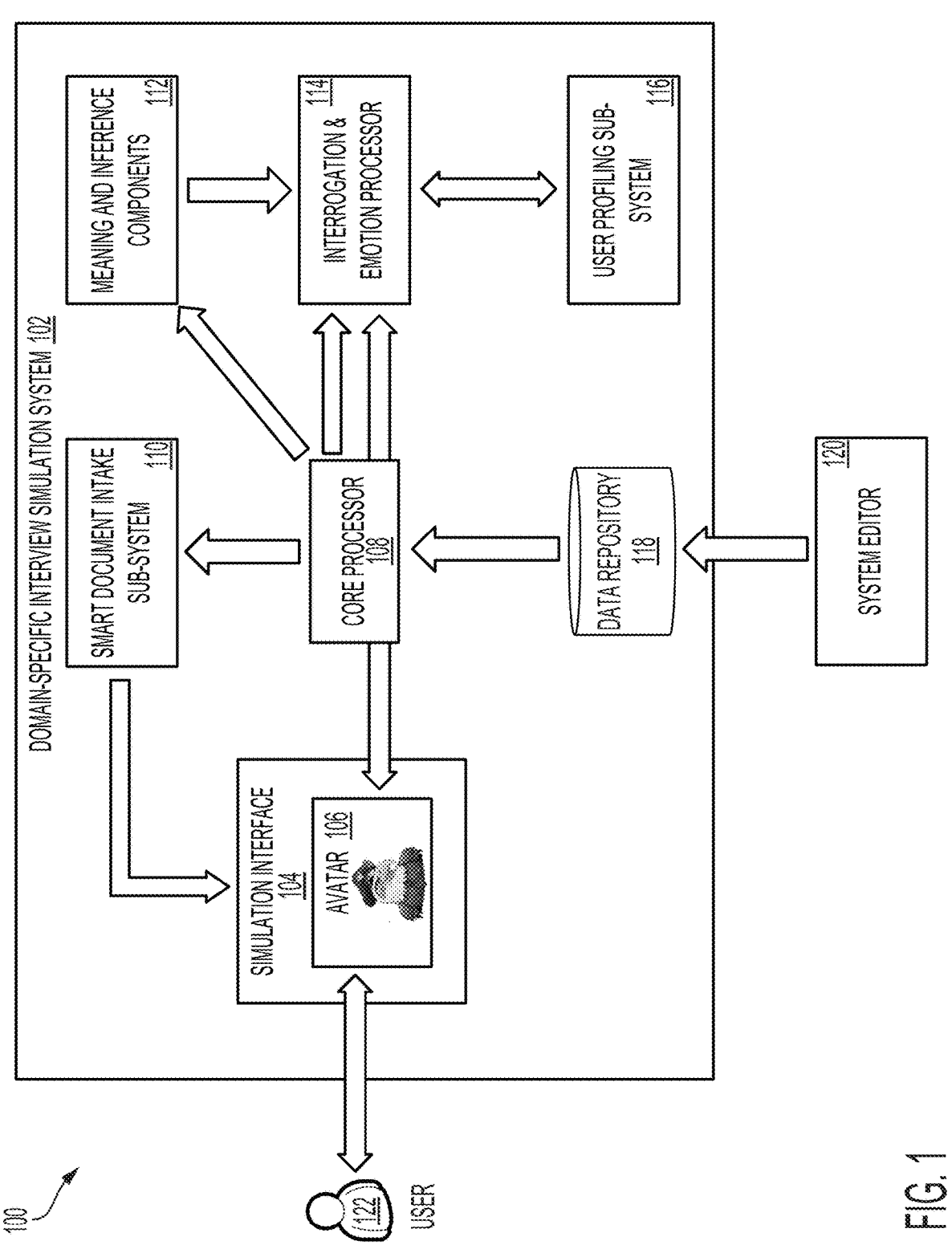
FIG. 1 shows an illustrative example of an environment in which a domain-specific interview simulation system performs different interview simulations in accordance with at least one embodiment.

FIG. 1 shows an illustrative example of an environment 100 in which a domain-specific interview simulation system 102 performs different interview simulations in accordance with at least one embodiment. In the environment 100, a user 122 interacts with an avatar 106 through a simulation interface 104 implemented by a domain-specific interview simulation system 102. The domain-specific interview simulation system 102, in an embodiment, is implemented to simulate person-to-person interviews through which a live interviewee (i.e., user 122) can interact with a virtual interviewer. In some instances, the domain-specific interview simulation system 102 may further simulate person-to-person interviews through which a live interviewer (i.e., user 122) can perform simulated interviews with virtual interviewees. Through the implementation of these simulated interviews, the domain-specific interview simulation system 102 provides an education process that allows for the identification of the ongoing meaning of responses within the domain-specific environment provided by the domain-specific interview simulation system 102. Through the implementation of simulated interviews, the domain-specific interview simulation system 102 prepares users (such as user 122) for actual interviews through experience and improved training in complex subject matter, providing these users with real-time and after-interview analyses.

As noted above, the domain-specific interview simulation system 102 includes a simulation interface 104 through which a user 122 can engage in a simulated interview with an automated agent that is graphically represented through an animated avatar 106 or virtual interviewer. Through the simulation interface 104, the animated avatar 106 may present the user 122 with various questions as part of a simulated interview and prompt the user 122 to provide answers or other responses to these questions. In an embodiment, and as described in greater detail herein, the animated avatar 106 dynamically asks questions to the user 122 through the simulation interface 104 and responds emotionally and verbally (such as through textual and/or audiovisual responses) to the user 122 as the user 122 responds to different questions provided by the animated avatar 106.

In an embodiment, the domain-specific interview simulation system 102 implements a core processor 108 that controls the system operations and accesses data for the execution of simulated interviews. The core processor 108, for instance, controls multiple functional units of the domain-specific interview simulation system 102, such as the simulation interface 104 (including the avatar 106), the smart-document intake sub-system 110, the meaning and inference components (MIC) 112, the interrogation and emotion processor (IEP) 114, a user profiling sub-system 116, and a data repository 118. These various functional components of the domain-specific interview simulation system 102 may be linked to each other programmatically or through interconnected processes which may not be discrete units.

In an embodiment, the domain-specific interview simulation system 102 interfaces with a system editor 120 that is functionally and physically separated from the domain-specific interview simulation system 102. The system editor 120, in an embodiment, maintains the initial system logic, constants, base state criteria, artificial intelligence interface considerations, and curated data. The system editor 120 may control and map the inherent data, mission statement, and personality of the domain-specific interview simulation system 102. More granularly, this may include logical flows, algorithms, Boolean equations, mappings of key variables, filters, score criteria, and the like. Prior to a simulated interview being conducted, the initial system parameters, logic pathways, and data are controlled through the system editor 120. The system editor 120 may be isolated from the production environment implemented by the domain-specific interview simulation system 102 to provide enhanced security and efficiency. For instance, if the domain-specific interview simulation system 102 is compromised (e.g., hacked, etc.), the functionality of the system editor 120 may be preserved through this isolation of the system editor 120, allowing for quick implementation of a new or replacement domain-specific interview simulation system 102.

Prior to conducting a simulated interview, the user 122 may upload or answer questions relevant to an application form commonly used in real-life, domain-specific interviews. These responses may be provided electronically, such as through the smart document intake sub-system 110 implemented by the domain-specific interview simulation system 102. Alternatively, if the responses are provided in a hardcopy format, the user 122 may scan or otherwise provide these responses through one or more peripheral devices, such as a scanner or other device through which the user 122 may upload the responses to the smart document intake sub-system 110.

As an illustrative example of the document intake process for a simulated interview, the domain-specific interview simulation system 102 may simulate a non-immigrant visa interview, which can include gathering information necessary for completing an online DS-160 form. In an embodiment, smart document intake process executed by the smart document intake sub-system 110 is interrogative and interactive, functioning as an unseen and virtual interviewer that focuses on key issues related to the user's profile and its implications for a domain-specific case. The smart document intake sub-system 110, in an embodiment, collects data that is typically obtained through a form or other document, infers additional information, asks targeted questions, and excludes personally identifiable information (PII) or redundant, non-essential information. Users, such as user 122, can enter data in various formats consistent with the original form, such as through drop-down lists, radio buttons, text fields, and other interface elements provided through the simulation interface 104. As described in greater detail herein, the smart document intake sub-system 110 uses any provided information to set conditions, scores, and other key parameters for the simulated interview.

Based on the specific characteristics of the user 122, the virtual interviewer, and the data incorporated and interconnected within the domain-specific interview simulation system 102, the user profiling sub-system 116 initializes an optimized data state in which some questions, or groups (specific topics) or nested groups (categories of topics) (i.e., topics including layers of descendant topics with logically related questions) are excluded from a neural network of possible questions and answers. The remaining groups of active questions are given weights for initial priority of processing, which may be changed at any time, while equally weighted groups compete for priority. Still other groups or individual questions, or answers are rendered inactive and forfeit their ability to stay relevant until and unless some condition or score-level occurs to activate them.

In an embodiment, the simulated interview begins with one or more questions about the user's application or other provided process for which the simulated interview is being conducted. Based on the application or other provided process, the virtual interviewer may assume a particular role through which the virtual interviewer may act as an authoritative figure consistent with the application or other provided process. For example, if the application or other provided process corresponds to an application for a specific United States visa, the virtual interviewer may assume the role of a United States consular officer that is stationed at a foreign consular post or embassy. The user 122, for the purposes of the simulated interview related to this application or other provided process, may assume the role of the visa applicant.

In an embodiment, through the simulation interface 104, the domain-specific interview simulation system 102 provides an animated avatar 106 that may communicate with the user 122 through an auditory and visual interface, such as a computer screen, hologram, or physical caricature of the virtual interviewer. The simulation interface 104 may provide the user 122 with one or more interface elements through which the user 122 may provide responses to the questions provided by the avatar 106. For instance, the domain-specific interview system 102 may provide, through the simulation interface 104, one or more input fields through which the user 122 may type their responses to questions presented by the avatar 106. As another illustrative example, the domain-specific interview system 102 may allow the user 122 to submit responses to presented questions through audiovisual recordings or data streams (e.g., livestreams, etc.) using an audiovisual capture device (e.g., camera, microphone, etc.).

As the user 122 submits a response to a presented question, the MIC 112 processes the response by first filtering the response through a gateway using low-cost generative artificial intelligence prompts that execute in parallel to each other. These gateways can exclude irrelevant answers or reroute the virtual interviewer's questions in order to save time and resources. Irrelevant responses may include abusive language, completely unresponsive or unrelated statements, questions, nonsensical remarks, and the like. In an embodiment, the user's response to a particular question or other prompt is added to a generative artificial intelligence prompt which formulates a request to a generative artificial intelligence platform to recommend the best matches from a numerically indexed and detailed listing of general and specific items that were originally entered and curated by the system editor 120. This listing of structured, curated answers may correspond to cross-reference sections of specific statutes, regulations, policy and procedure manuals, case law, and other knowledge bases that are relevant to the domain-specific interview and are available and updateable through one or more online repositories. The answers may further link to specific strings detailing human meanings of each answer by itself, or in combination with other answers and questions, or with the scores or the conditions which the system sets while the real-time simulated interview is ongoing.

In an embodiment, the general and specific items manually curated through the system editor 120 include varied and often detailed information. Matching these items through typical artificial intelligence prompts can be costly, time-consuming, and prone to errors. In some instances, the system editor 120 employs a translator that reduces the token size of the completion so that only numbers are returned from the artificial intelligence completion, without text, that correspond to numbers from the curated numbered list of general and specific items. Numbers which may appear within the list itself are removed programmatically before the request is made. This process of token optimization, when used in combination with the other methodologies described herein, provides significant benefits. For instance, this process reduces costs for completions because returned token sizes (i.e., numbers) are smaller than traditional text-based strings. Further, this process makes the system more efficient by reducing processing times of a critical function, which could otherwise become a bottleneck for the domain-specific interview simulation system 102. Additionally, this process mitigates artificial intelligence hallucinations by addressing a common flaw of GPTs and other LLMs, namely the creation of their own text when they do not find a match in a curated list and double down on the mistake. The aforementioned token optimization process prevents these hallucinations from occurring. For example, when an ordinal list spanning the numerical values 1-2000 exists with corresponding text, the artificial intelligence is required to add or create a new number (i.e., 2001) for its hallucination to occur. This causes the artificial intelligence to expose itself as hallucinating simply by using an invalid number that can be ignored by the system. By ignoring numbers that are not in the ordinal list, the system creates a solution that eliminates a common limitation of artificial intelligence processes, namely the creation of hallucinations. This process of generating ordinal mappings for the elimination of artificial intelligence hallucinations is described in greater detail herein in connection with FIGS. 15A-15B.

It should be noted that LLM prompts are typically not precise and are not analogous to computer or programmatic code. Thus, prior to making any calls to a generative AI platform, the domain-specific interview simulation system 102 may be required to design a prompt through a large iterative methodology. In an embodiment, the MIC 112 performs various advanced statistical operations according to the domain-specific application, error tolerance, and profile of the overall domain-specific interview simulation system 102. In addition to performing these advanced statistical operations, the underlying prompt may still need to be as clear as possible in order to yield consistent results. Thus, to achieve this, the system editor 120 incorporates a prompt batch tester that is configured to execute thousands of tests against any given prompt and assess its ability to extract meaningful results. These results are reviewed through the system editor 120 to select an optimal prompt.

In an embodiment, prompts that require a natural language response (i.e., free form response by voice or text by the user 122) have iteratively designed and batch tested prompts associated with them. A call may be made to an artificial intelligence process for which a pre-determined number of completions (e.g., 100 completions, etc.) are requested in a cost-effective manner. This may generate statistically significant data that may be used to match the user's answer, and its partitioned semantic components, to the system's fixed, curated list of answers.

In an embodiment, the MIC 112 performs special processing to streamline a generative artificial intelligence request and to render this request more reliable. For instance, in response to a user input (e.g., a response to a presented question, etc.), the MIC 112 matches the user input to general classes of answer categories. As an illustrative example, if the MIC 112 matches a user input to the general class "Pro Athlete" (indexed under USDOS Foreign Affairs Manual 9FAM402.2-5(C)(4)), the MIC 112 excludes any other answer categories that are deemed irrelevant (i.e., unrelated whatsoever to USDOS Foreign Affairs Manual 9FAM402.2-5(C)(4)) from further scrutiny or analysis. Within each general class or category, there is a listing of specific answers (e.g., "participating in a sporting event" indexed in USDOS Foreign Affairs Manual 9FAM402.2-5 (C)(4)(a)) which the MIC 112 also matches against the user's response. Additionally, depending on relevance and meaning, there may be more specific answers nested within any given answer, thereby giving rise to nested specifics— first, second, third, etc. levels—with each containing more detailed and domain-relevant information. For example, for the general class "Pro Athlete," there may exist a first-level specific answer ("participating in a sporting event") and a second-level specific answer ("without salary or payment other than prize money").

Once a number list is returned from the generative artificial intelligence completion, a process of statistical analysis (e.g., a Holm Bonferroni correction, etc.) can be used to remove any outliers and to provide a detailed, domain-specific, and meaningful information from the virtual interviewer's perspective. Multiple specific answers within a general classification are filtered to the statistically strongest (i.e., most relevant) answer. Special weights and priorities are given to specific answers from different general classifications according to the domain-specific importance of the general classifications in which they are found. For example, the specific answer "I'm going to visit friends" may be given less weight than the specific answer "I'm going to receive medical assistance for the delivery of my child."

In an embodiment, the MIC 112 can apply different statistical models to the generative artificial intelligence results. An example application of these different statistical models is described in greater detail herein in connection with FIG. 12. A special feature of this paradigm is that one request can be cloned and processed through different generative artificial intelligence platforms. This may further enhance reliability and error detection.

As noted above, the MIC 112 may extract the best answer match from each level of the text listing (e.g., [General, Specific(1), Specific(2), . . . . Specific(n)], etc.). More specific answers (i.e., more detailed, more granular level, etc.) may be afforded a greater weight by the MIC 112. Answers having higher weights are given priority in any general class. For example, the specific answer "proposing to my girlfriend" may be more detailed when compared to the specific answer "visiting my girlfriend." Thus, the specific answer "proposing to my girlfriend" may be afforded a greater weight. However, if the specific class "participate in a felony with someone" was matched (whereby a match would result in a higher priority than the specific answer "proposing to my girlfriend"), this specific class would be prioritized for review. In an embodiment, when the MIC 112 determines that an answer falls within an ambiguous or questionable range, the MIC 112 prompts the artificial intelligence to confirm its previous assessment by reframing the statement in the negative.

As noted above, ordinal mappings and token optimizations are used to eliminate artificial intelligence hallucinations during the processing of user inputs. In an embodiment, the MIC 112 contains hallucination elimination functionality. For instance, the MIC 112 uses token optimization to prevent confabulated text or other responses from being introduced into the system. Further, should a spurious number or mismatched meaning occur, the MIC 112 may note this in the statistical data analysis described above and may further eliminate this spurious number or mismatched meaning through the aforementioned hallucination elimination processes. This hallucination elimination functionality, used in combination with the prompt batch tester implemented through the system editor 120, enhances the system's overall reliability to levels suitable for domain-specific applications.

Through the MIC 112, multiple issues can be assessed and prioritized based on their statistical significance and on the curated priority order or weight they are given in the dataset. The process of formulating a generative artificial intelligence request or prompt in the manner described herein allows for semantic decomposition of either facts or relevant issues in a realistic setting where the user 122 responds in complex or compound statements. Once issues or facts are identified and prioritized, further questioning can occur at the virtual interviewer's discretion based on conditions and scores (e.g., eligibility, relevance, credibility, patience, etc.) as well as time remaining. The virtual interviewer may review some or all of the prioritized issues extracted from the user's response based on what each issue means to the virtual interviewer. As a result of these decisions, the flow of the interrogation (i.e., network of the interview tree) is adjusted.

As the interview or interrogation traverses a mutable neural network of questions or prompts, the core processor 108 may access, from the data repository 118, data matrices or online updates related to the situational environment of the user 122—their job, country conditions, education, wealth, immigration history, etc.—through object-oriented code. This mutable neural network offers a hybrid functionality. For instance, it shares the ability to handle generative tasks, similar in some respects to recurrent neural networks (RNNs), Long Short-Term Memory (LSTM) networks, and Gated Recurrent Units (GRUs), and also boundary detection between issue classes such as found in discriminative networks (e.g., convolutional neural networks (CNNs), etc.).

The neural network of questions or prompts may be defined through a combination of filters, algorithms, key variables, Boolean equations, object-oriented data, and the like, controlled by scores, variables, and conditions which a user's responses set. These responses may lead to further questions, comments, or emotional interactions by the virtual interviewer under realistic and real-time constraints, until a final score is reached and the interview or interrogation terminates. While the problem of vanishing and exploding gradients is prevalent in RNNs, it is ameliorated by a network that excludes known questions, and re-optimizes itself, as the interview simulation evolves. The system implements two fundamental states: excluded questions and unanswered questions. As the interview simulation progresses, the system becomes more streamlined and efficient, forming new neural pathways that focus on the most critical issues within the remaining time. For instance, as the profiles corresponding to the user and the virtual interviewer are updated in real-time during the course of an interview simulation, the neural network of questions or prompts is streamlined by excluding any questions or prompts that are no longer relevant to the interview simulation or for which answers may be inferred from previous responses. Additionally, based on these profiles, the neural network of questions or prompts may be streamlined to only include those questions or prompts that have been unanswered, which may be arranged or ordered according to their assigned priority (as described in greater detail herein). This has the benefit, over time, of reducing the size of generative artificial intelligence prompts and corresponding outputs, which may result in faster completions and reduction in resource requirements.

In an embodiment, the interview simulation, in addition to generating targeted questions that may be presented to the user 122 through the simulation interface 104, further indicates subtle animated facial expressions that relate to the virtual interviewer's emotive state and which are adjusted by algorithms implemented by an interrogation and emotion processor 114 in real-time. For instance, throughout an interview simulation, these facial expressions may be represented through the avatar 106 and may run a spectrum from happy to exasperated (e.g., the avatar's feathers are ruffled, eyes flash, and steam emits from its ears, etc.). The virtual interviewer's questions may also assume varied tones based on the emotional nuances created by the user's responses. The virtual interviewer's tone may, for instance, vary from cordial, professional, or cynical within the span of a few minutes.

In an embodiment, ongoing scores are calculated based on the meaning of the responses provided to the virtual interviewer. For example, the system 102 may modify "eligibility" scores by "relevance" scores, and "credibility" scores by "patience" scores (which are influenced by time remaining). The scores are combined in real-time through different algorithms (as described in greater detail herein) until a threshold is reached either for approving or denying the user's application.

Following an interview simulation, a detailed analysis of the questions and responses are provided to the user 122 through the simulation interface 104. This detailed analysis may identify key, pivotal moments in the simulation, and what specific responses meant to the virtual interviewer. Additionally, authoritative and reference materials may be cited for further study and review.

The domain-specific interview simulation system 102 does not expose any PII during the interview simulation to ensure user privacy. As noted above, the smart document intake sub-system 110 collects data that is typically obtained through a form or other document, infers additional information, asks targeted questions, and excludes personally identifiable information (PII) or redundant, non-essential information. Further, calls to external services (i.e., external generative artificial intelligence platforms) are obfuscated through a mapping process. Persistent storage (such as through the data repository 118) is encrypted at the data level to allow decryption during the interview simulation by only the user 122 or by approved parties after the conclusion of the interview simulation.

In an embodiment, once large pools of data are available from different users, the domain-specific interview simulation system 102 can use non-generative artificial intelligence deep learning technologies to further refine and optimize its question flow and reach reasonable conclusions about a user's interview strengths and weaknesses. For instance, with greater volumes of data from different users, the domain-specific interview simulation system 102 can create more reliable inferences (i.e., recognize logical patterns, etc.) based on fewer questions, thereby improving the efficiency of the domain-specific interview simulation system 102.

Figure 2:
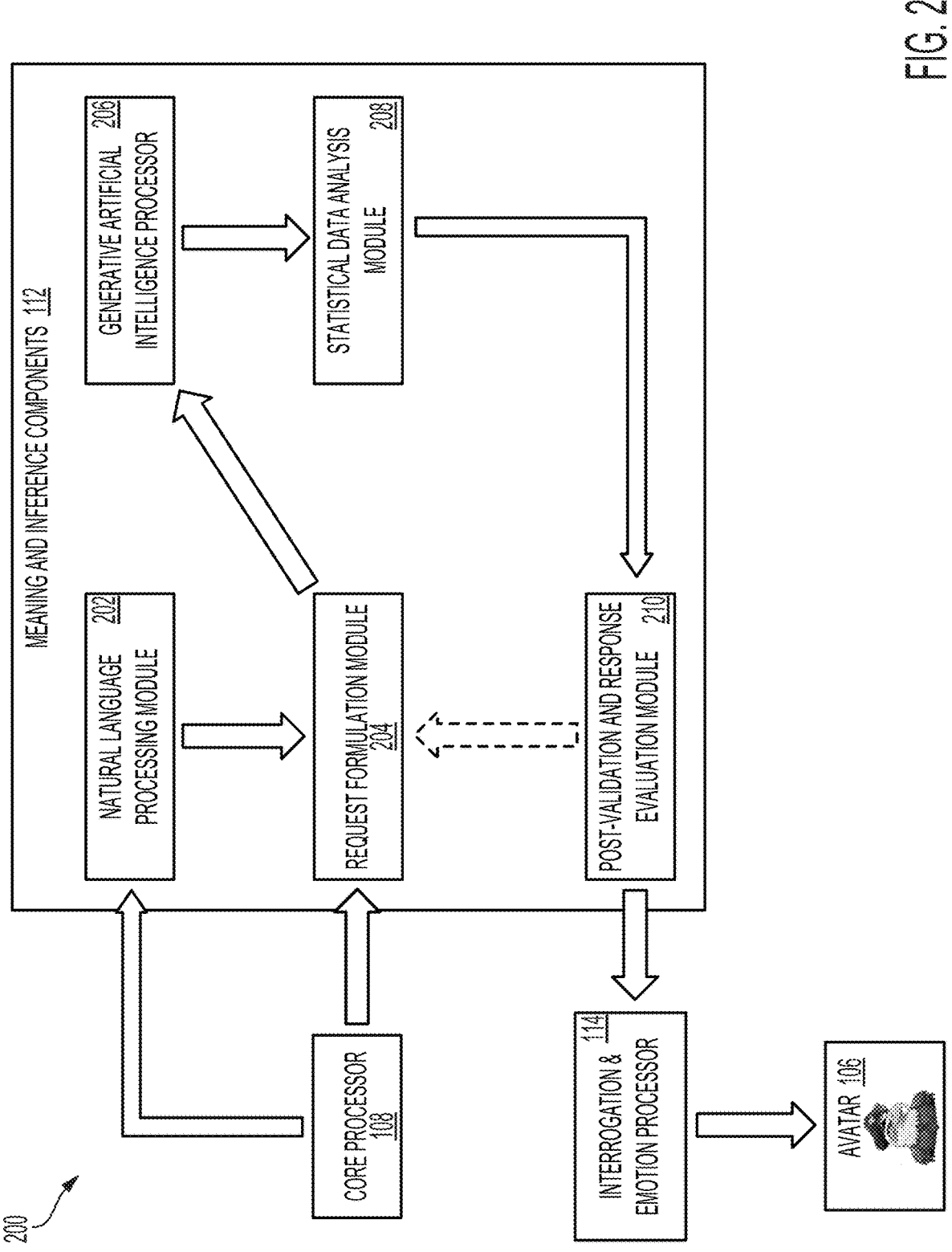
FIG. 2 shows an illustrative example of an environment in which meaning and inference components of a domain-specific interview simulation system execute special processing of user responses using generative artificial intelligence in accordance with at least one embodiment.

FIG. 2 shows an illustrative example of an environment 200 in which the MIC 112 of a domain-specific interview simulation system 102 executes special processing of user responses using generative artificial intelligence in accordance with at least one embodiment. In the environment 200, the MIC 112 may obtain, from the core processor 108, a user input generated during an interview simulation. This user input may be provided by the core processor 108 according to the format in which the user input was provided (e.g., text, speech, other audiovisual recording, etc.). In an embodiment, if the user input includes a free form response by voice or text that requires natural language processing, the core processor 108 transmits the user input to a NLP module 202 of the MIC 112 to convert the user input into a format that allows for general and specific answer classification.

As illustrated in FIG. 2, the MIC 112 includes a request formulation module 204 that is implemented to perform special processing of a user input to streamline a generative artificial request so that the request is made more reliable. For instance, in an embodiment, the request formulation module 204 adds the user input to a generative artificial intelligence prompt, which formulates a request to a generative artificial intelligence platform to recommend best matches from a numerically indexed and detailed listing of general and specific text items that were originally entered and curated through the system editor (i.e., the system editor 120 described above in connection with FIG. 1). The underlying generative artificial intelligence prompt (to which the user input is to be added) may be generated through a prompt batch tester of the system editor, which may perform thousands of tests against this prompt to assess its ability to extract meaningful results. These results are reviewed through the system editor to select the best generative artificial intelligence prompt for the corresponding question. Thus, through the system editor, and based on the question that prompted the user to provide their response, the request formulation module 204 may identify the baseline generative artificial intelligence prompt to which the user response may be added.

In an embodiment, the request formulation module 204 matches the user input to general classes of answer categories and excludes any other answer categories that are deemed irrelevant to these general classes. As noted above, within each general class or category, there is a listing of specific answers which the request formulation module 204 matches against the user input. The request formulation module 204 may generate, based on these general and specific answers, a numerically indexed, ordinal mapping for these answers. For instance, each number within this ordinal mapping may correspond to a general or specific answer that may be possible given the question provided to the user and the corresponding user input.

In an embodiment, using the user input and this ordinal mapping, the request formulation module 204 formulates a generative artificial intelligence prompt that may be transmitted to one or more generative artificial intelligence platforms to identify a set of options selectable from the original mapping and that may best represent the appropriate answers corresponding to the user input. The request formulation module 204, for instance, may transmit a pre-defined number of calls (e.g., 100 calls, 1000 calls, etc.) to the one or more generative artificial intelligence platforms in a cost-effective manner to generate statistically significant data that may best match the user's input (as well as its partitioned semantic components) to the system's fixed, curated answer list (e.g., the ordinal mapping). These pre-defined number of calls may be performed through a generative artificial intelligence processor 206, which may be implemented to automatically transmit the generative artificial intelligence prompt from the request formulation module 204 to the one or more generative artificial intelligence platforms to obtain a corresponding pre-defined number of completions that may represent possible answers that best match the user's input.

In an embodiment, once the number lists are returned from the generative artificial intelligence completions, a statistical data analysis module 208 of the MIC 112 performs one or more statistical analyses (e.g., a Holm Bonferroni correction, etc.) to remove any outliers (e.g., any numbers that fail to satisfy a pre-defined confidence threshold, any numbers that are not part of the ordinal mapping and represent possible hallucinations, etc.) and to provide detailed, domain-specific, and meaningful information from the virtual interviewer's perspective. Additionally, the statistical data analysis module 208 may filter multiple specific answers within a general classification to the statistically strongest (i.e., most relevant) answer. As noted above, special weights and priorities are given to specific answers from different general classifications according to the domain-specific importance of the general classifications in which they are found.

Through the implementation of these one or more statistical analyses, the statistical data analysis module 208 may extract the best answer match from each level of the text listing (e.g., [General, Specific(1), Specific(2), . . . . Specific (n)], etc.). More specific answers (i.e., more detailed, more granular level, etc.) may be afforded a greater weight by the statistical data analysis module 208. Answers having higher weights are given priority in any general class. In an embodiment, when the statistical data analysis module 208 determines that an answer falls within an ambiguous or questionable range (e.g., between a minimum confidence threshold value corresponding to statistical outliers and a minimum confidence threshold value above which an answer may be deemed a suitable match, etc.), the statistical data analysis module 208, through a post-validation and response evaluation module 210, prompts the one or more generative artificial intelligence platforms to confirm their previous assessment by reframing the statement in the negative.

Once the post-validation and response evaluation module 210 identifies, through the statistical data analysis module 208, valid answers corresponding to the user's input, the post-validation and response evaluation module 210 may provide these valid answers and corresponding scores (e.g., confidence values, etc.) to the interrogation and emotion processor 114. The interrogation and emotion processor 114 may dynamically process these valid answers (with corresponding scores), along with a set of profiles corresponding to the avatar 106 and the user, to define a sequence of emotive expressions for the avatar 106. For example, if the interrogation and emotion processor 114 determines, based on the identified valid answers and corresponding scores, that the user is being evasive, the interrogation and emotion processor 114 may define a sequence of emotion expressions whereby the avatar 106 may transition from a calm emotional state to an angry emotional state. This transition may be defined through an emotive animation script that may be executed to cause the avatar 106 to execute and render this emotive transition through the simulation interface. The interrogation and emotion processor 114, based on this emotional transition, may further adjust the tone or tenor of subsequent questions or prompts presented to the user through the simulation interface.

FIGS. 3A-3D show an illustrative example of an environment 300 in which responses provided through a simulation interface are processed and graphically represented through an avatar in accordance with at least one embodiment. As illustrated in FIGS. 3A-3D, the environment 300 may correspond to an active interview simulation being conducted through a simulation interface through which an avatar is presented to provide the user with emotional insights into how their responses are being received in real-time. Additionally, the simulation interface may include an input window through which a user may submit an input (e.g., a response to a presented question or prompt, etc.).

Figure 3A:
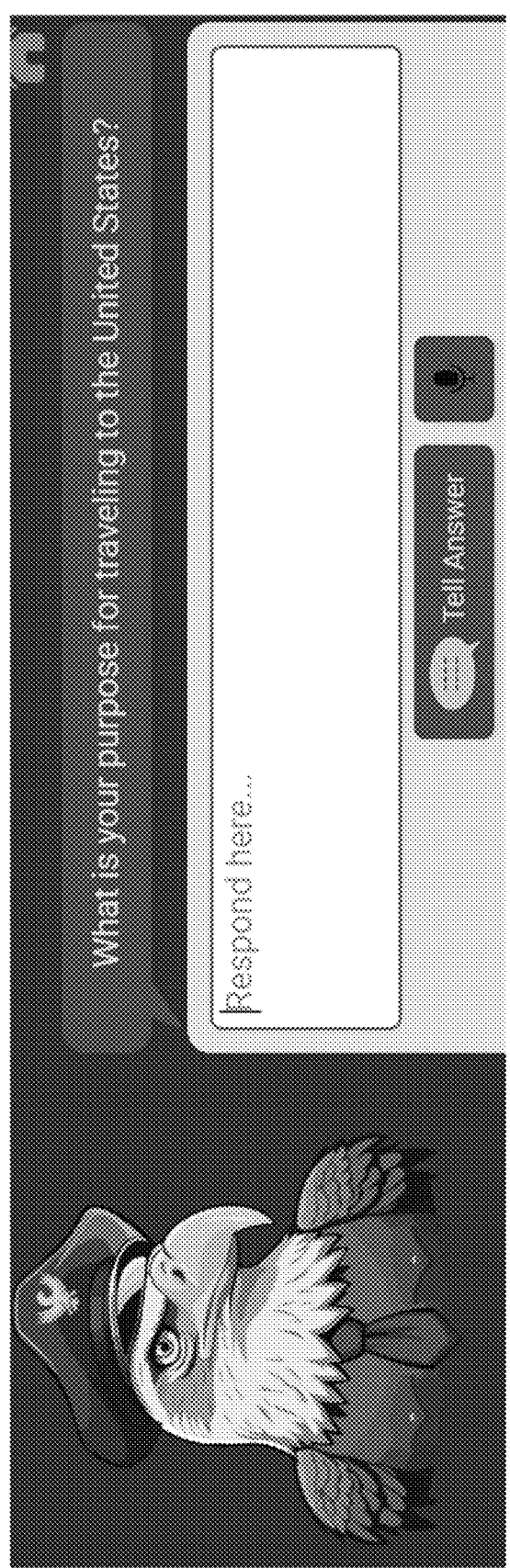
FIGS. 3A-3D show an illustrative example of an environment in which responses provided through a simulation interface are processed and graphically represented through an avatar in accordance with at least one embodiment.

As illustrated in FIG. 3A, through the simulation interface, the virtual interviewer may present the user with an initial question (i.e., "What is your purpose for traveling to the United States?"). This initial question may be selected by the domain-specific interview simulation system based on any documents provided by the user prior to the simulation and as processed through the smart-document intake subsystem. Additionally, or alternatively, this initial question may be selected according to the purpose of the interview simulation (e.g., a non-immigrant visa interview, etc.). As the interview simulation is only being initiated at this point, the domain-specific interview simulation system may define an initial emotional state for the avatar that represents a neutral or indifferent expression.

Figure 3B:
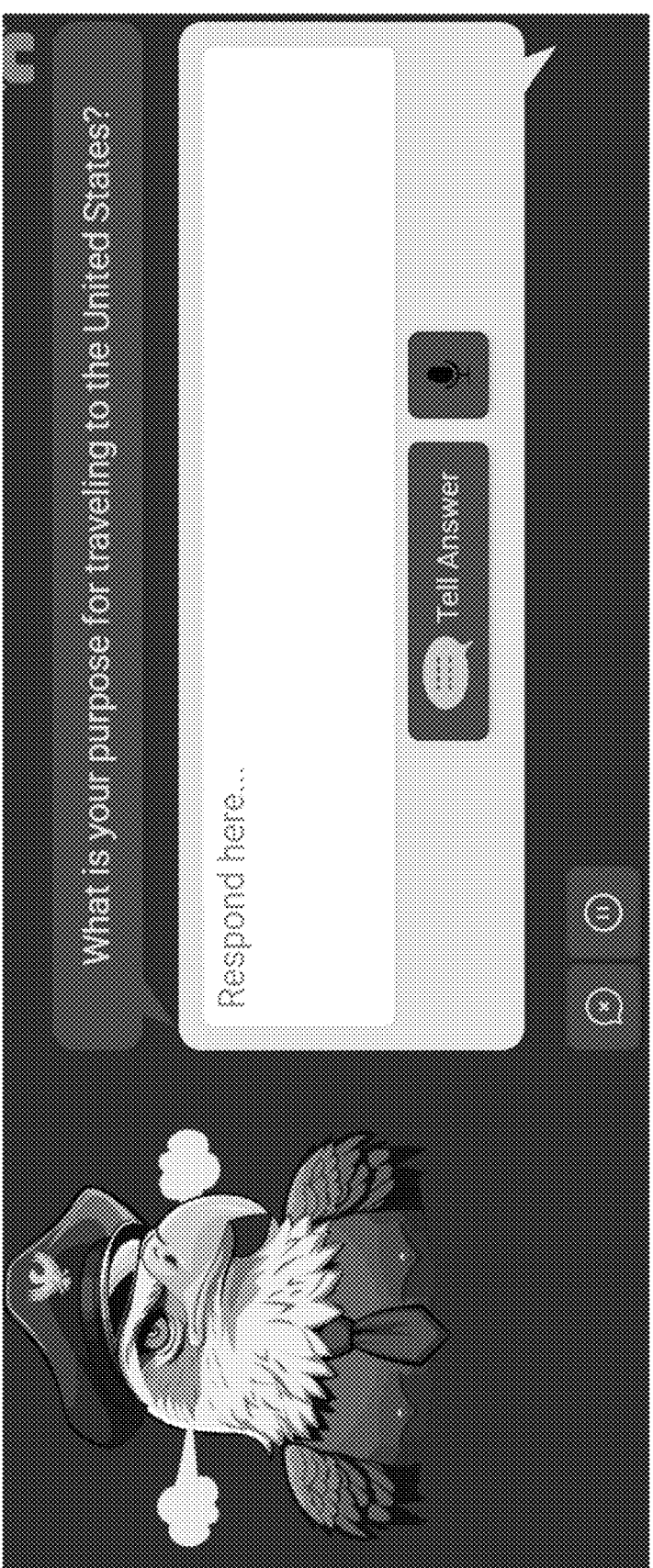

In an embodiment, the domain-specific interview simulation system (through the aforementioned interrogation and emotion processor) may dynamically monitor the amount of time that is taken by the user to provide a response to a presented question. As noted above, ongoing scores are calculated based on the meaning of the responses provided to the virtual interviewer. For example, the system may modify "eligibility" scores by "relevance" scores, and "credibility" scores by "patience" scores (which are influenced by time remaining). As the amount of time taken to respond to a given question increases, for instance, the "patience" score for the simulation may decrease resulting in a corresponding reduction in the "credibility" score for the user. Accordingly, the interrogation and emotion processor may dynamically adjust the emotional state of the virtual interviewer from a neutral/indifferent expression to one of anger, impatience, or other emotional state that denotes the virtual interviewer's frustration with the user resulting from the user's failure to provide a response over time. For example, as illustrated in FIG. 3B, the interrogation and emotion processor may transition the emotional state of the virtual interviewer from the initial neutral/indifferent expression (illustrated in FIG. 3A) to one that clearly denotes anger. For instance, through the simulation interface, the virtual interviewer may scowl while its eyes flash red and steam emanates from its ears. This emotional transition may provide the user with dynamic feedback with regard to their performance during the interview simulation.

Figure 3C:
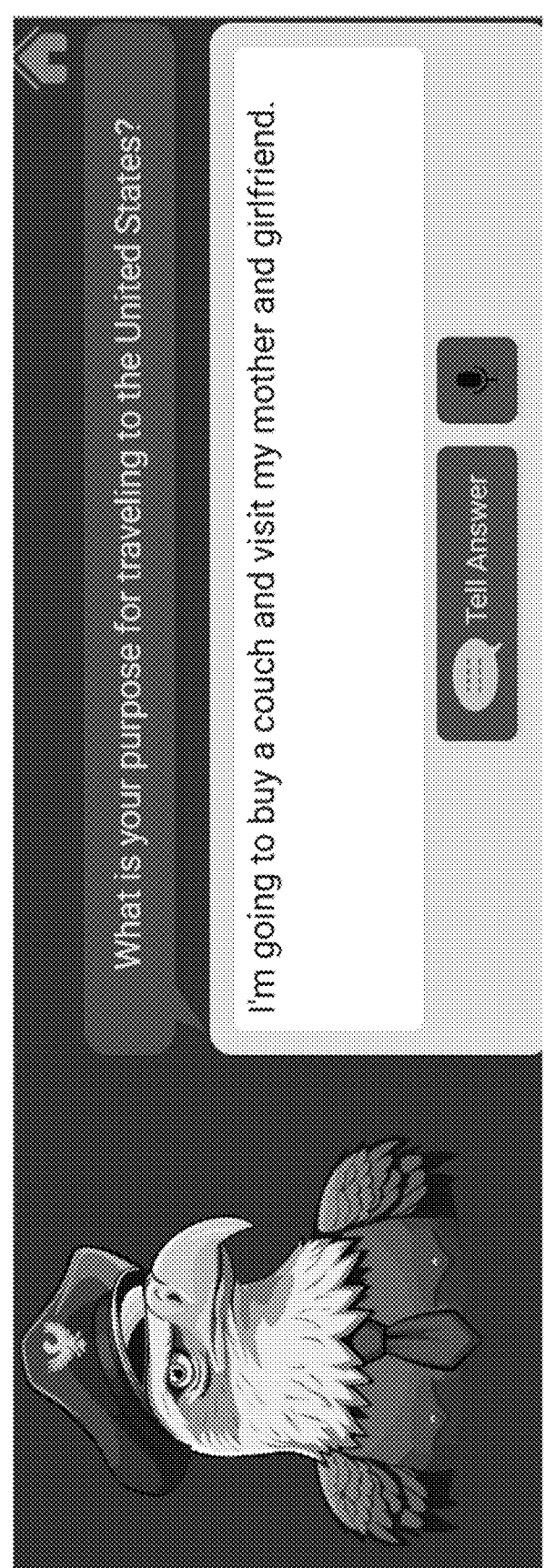

As illustrated in FIG. 3C, the user has provided, through the input field, a response to the presented question (i.e., "I'm going to buy a couch and visit my mother and girl-friend."). When the user submits this response (such as through selection of the "Tell Answer" interface element), the MIC of the domain-specific interview simulation system may dynamically generate a generative artificial intelligence prompt and a corresponding ordinal mapping of possible answers to the presented question (modified by any appli-cable conditions and profiles), as described above. Addition-ally, the interrogation and emotion processor may dynami-cally update the emotional state of the virtual interviewer to indicate that the virtual interviewer is processing the user's provided response. As illustrated in FIG. 3C, this may be denoted through a transition from the angry expression illustrated in FIG. 3B to one of contemplation, whereby the virtual interviewer may tilt its head to the side as if thinking about the response submitted by the user. However, it should be noted that additional and/or alternative emotional states may be graphically represented through the simulation inter-face. For example, the interrogation and emotion processor may animate the avatar's wing coming up to stroke the avatar's chin in addition to the head tilt illustrated in FIG. 3C to denote a pensive state.

Figure 3D:
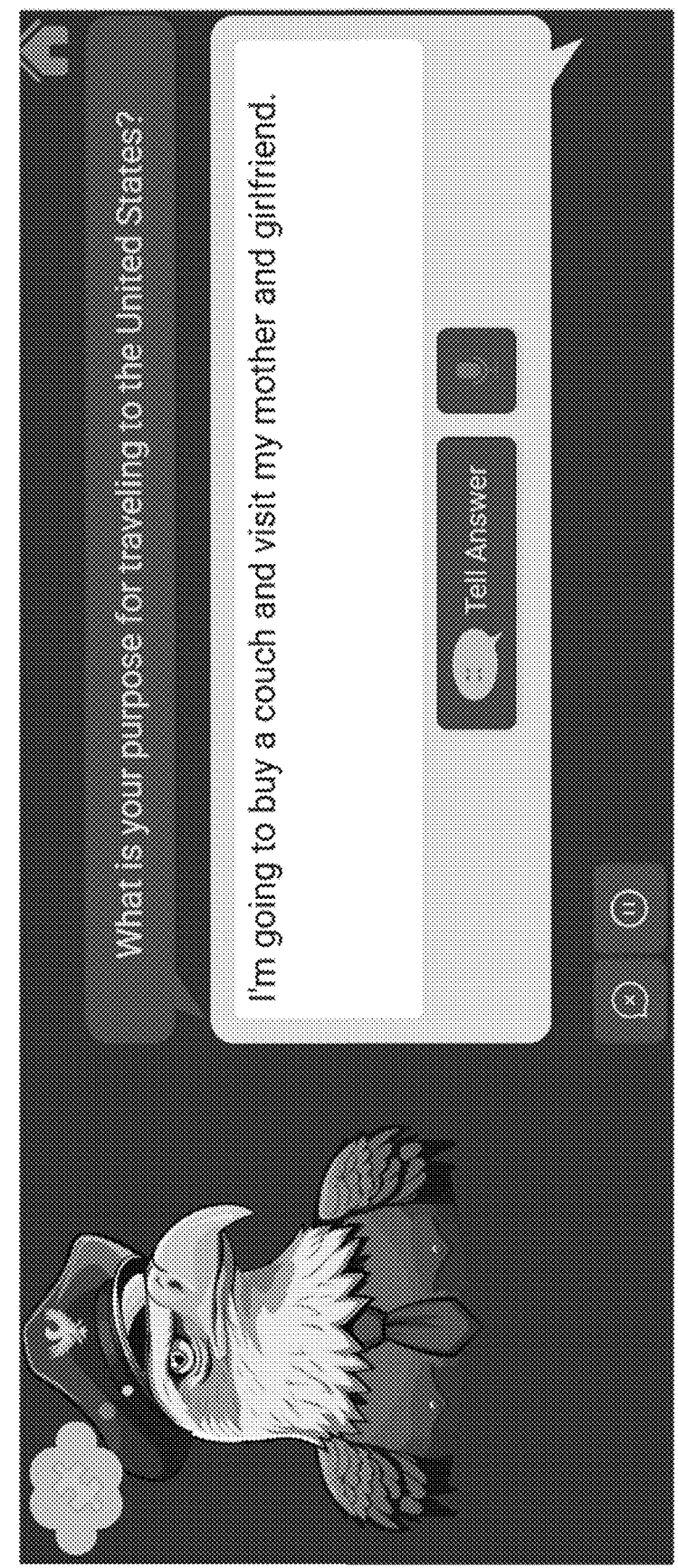

As illustrated in FIG. 3D, the domain-specific interview simulation system may update the emotional state of the virtual interviewer to provide the user with an indication of how their response was processed and received by the virtual interviewer. For example, if the user's response results in the identification of different encoded answers, the interrogation and emotion processor may transition the avatar's emotional state from one of contemplation (as illustrated in FIG. 3C) to one of possible confusion or further contemplation. This new emotional state, as illustrated in FIG. 3D, may be graphically represented through a thought bubble within which a puzzle piece may be presented. In addition to this new emotional state, the domain-specific interview simulation system, in some instances, may provide the user with the corresponding answer codes (e.g., numeri-cal values, etc.) and corresponding encoded answers that may be associated with their provided input. For each of these answer codes and encoded answers, the domain-specific interview simulation system may further provide an indication of the confidence score denoting the level of confidence that the user input corresponds to the particular code and encoded answer. These answer codes/encoded answers and corresponding confidence scores may be obtained by the MIC according to the methodologies described above.

Based on the flow of the interview simulation, the domain-specific interview simulation system, through the MIC, may modify the flow of the interview simulation based on new profiles corresponding to the user and the virtual interviewer. These new profiles may be generated according to the user's response to the presented question or prompt, as noted above. Further, these new profiles may be processed by the interrogation and emotion processor to determine the new emotional state of the virtual interviewer. Thus, when the next question is presented to the user through the simulation interface, the interrogation and emotion proces-sor may dynamically transition the avatar's expressions according to the new emotional state. This process may be ongoing until the interview simulation is concluded and a final performance determination is made for the user (e.g., the visa application is approved, the visa application is denied, the visa application is submitted for additional processing, etc.).

FIG. 4 shows an illustrative example of a process 400 for conducting an interview simulation in accordance with at least one embodiment. The process 400 may be performed by the domain-specific interview simulation system through the various components described above (such as the com-ponents illustrated and described herein in connection with FIGS. 1-2). At step 402, the domain-specific interview simulation system may receive a request to conduct an interview simulation. For instance, the user may access (through an application or web portal provided by the domain-specific interview simulation system) a simulation interface through which the user may select the purpose of the interview simulation. Additionally, through the simula-tion interface, the user may provide any required forms or documents that may be processed to generate an initial profile of the user, extract any relevant answers that may inform the initial flow of the interview simulation, and the like. As noted above, based on the specific characteristics of the user, the virtual interviewer, and the data incorporated and interconnected within the domain-specific interview simulation system, the domain-specific interview simulation system may initialize an optimized data state in which some questions, or groups (specific topics) or nested groups (cat-egories of topics) (i.e., topics including layers of descendant topics with logically related questions) are excluded from a neural network of possible questions and answers. The remaining groups of active questions are given weights for initial priority of processing, which may be changed at any time, while equally weighted groups compete for priority. Still other groups or individual questions, or answers are rendered inactive and forfeit their ability to stay relevant until and unless some condition or score-level occurs to activate them.

At step 404, the domain-specific interview simulation system may initialize an avatar profile according to different simulation parameters. This initial avatar profile may define the base tone, behavior, and biases of the virtual interviewer. These may be calculated and defined according to the specific characteristics of the user, the virtual interviewer, and the data incorporated and interconnected within the domain-specific interview simulation system and as defined in the corresponding profiles.

At step 406, the domain-specific interview simulation system may determine the initial interview flow for the interview simulation. This interview flow may be pseudo-random and may include a prioritization according to an initial relevance of interview topics. This initial relevance of interview topics may be determined according to the afore-mentioned inputs provided by the user when requesting an interview simulation (e.g., any responses provided through submitted forms, etc.). The domain-specific interview simulation system may accordingly remove and discard any topics that are deemed irrelevant to the interview simulation.

At step 408, the domain-specific interview simulation system, through the simulation interface, may present a question and adjust the emotional state of the avatar according to the interview flow. For instance, based on the determined interview flow, the domain-specific interview simulation system may determine an initial question that may be presented to the user. Further, the domain-specific interview simulation system may apply a corresponding avatar tone and emotional state. The avatar, through the simulation interface, may present this question and its emotional state to the user.

At step 410, the domain-specific interview simulation system may obtain and process a user response to the presented question. As noted above, through the simulation interface, the domain-specific interview simulation system may provide the user with an input field through which the user may submit a response to the question. In some instances, the domain-specific interview simulation system may provide the user with an option to use one or more peripheral devices (e.g., a microphone, a camera, etc.) to submit their response. This may allow the user to provide audiovisual responses to presented questions.

The domain-specific interview simulation system may process any submitted responses through generative artificial intelligence platforms and evaluates the completions from these generative artificial intelligence platforms according to the processes described herein, at least in connection with FIGS. 1-2. Additionally, the domain-specific interview simulation system may update the user and virtual interviewer profiles using one or more pseudorandom methods that allow for replay. Based on these updates, the domain-specific interview simulation system may reconcile and determine any courses of action on any identified contradictions in user responses. Through this processing of user responses, the domain-specific interview simulation system may update the virtual interview profile to denote a new avatar tone and emotional state that may be presented to the user through the simulation interface. Further, the domain-specific interview simulation system may update the priority of different topics, which may inform an updated interview flow for the interview simulation.

At step 412, the domain-specific interview simulation system determines whether the interview simulation has been completed. If the domain-specific interview simulation system determines that the interview simulation has not been completed (e.g., there is time remaining in the interview simulation, additional questions are required to produce an application determination, etc.), the domain-specific interview simulation system, at step 414, may generate a new question according to the topic to be addressed and define the tone for this new question according to the updated avatar profile. Further, at step 416, the domain-specific interview simulation system may generate a script that may be executed to present, through the simulation interface, the new emotional state of the avatar. Once completed, the domain-specific interview simulation system may return to step 408, whereby the domain-specific interview simulation system (through the avatar) may present the next question and emotional state of the avatar according to the updated interview flow. This process may continue until a determination is made that the simulation interview has been completed.

Once the domain-specific interview simulation system determines that the simulation interview has concluded, the domain-specific interview simulation system, at step 418, may generate an analysis according to the interview results. This analysis may include an evaluation of the user's responses according to different scoring metrics. As noted above, ongoing scores are calculated based on the meaning of the responses provided to the virtual interviewer. Returning to an earlier illustrative example, the domain-specific interview simulation system may modify "eligibility" scores by "relevance" scores, and "credibility" scores by "patience" scores (which are influenced by time remaining). The scores are combined in real-time through different algorithms (as described in greater detail herein) until a threshold is reached either for approving or denying the user's application. These scores, as well as any approval/denial decisions, may be presented to the user through the simulation interface. In some instances, the domain-specific interview simulation system may provide this analysis to other relevant parties, such as vendors and other entities that may use the analysis to train others.

Figure 5:
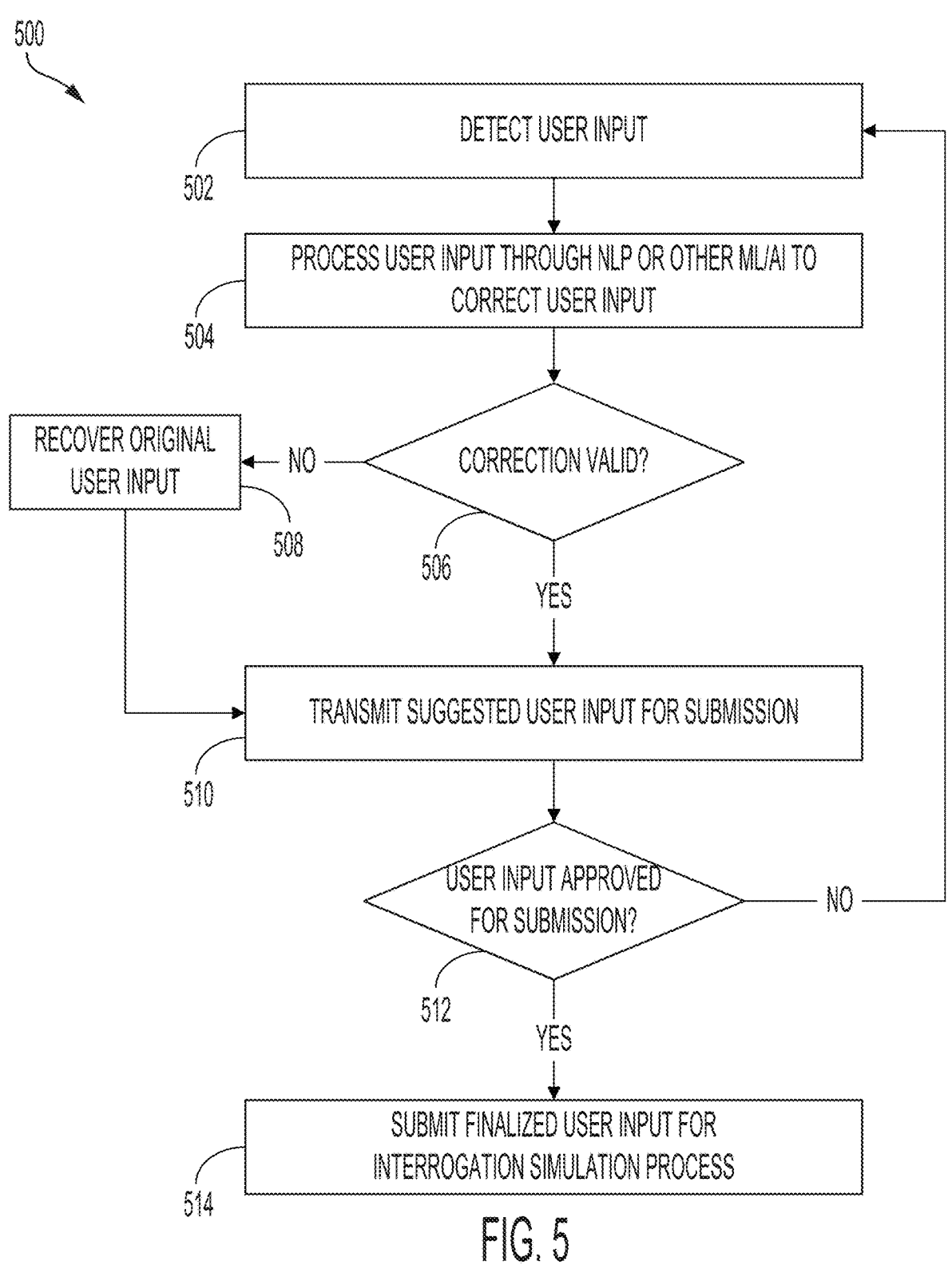
FIG. 5 shows an illustrative example of a process for evaluating and revising user inputs using Natural Language Processing (NLP) or other artificial intelligence techniques prior to submission of user inputs for the interrogation simulation process in accordance with at least one embodiment.

FIG. 5 shows an illustrative example of a process 500 for evaluating and revising user inputs using NLP or other artificial intelligence techniques prior to submission of user inputs for the interrogation simulation process in accordance with at least one embodiment. The process 500 may be performed by the MIC implemented by the domain-specific interview simulation system.

At step 502, the MIC may detect a user input. For instance, during the course of an interview simulation, a user may submit one or more responses to presented questions or other prompts. These one or more responses may be provided in the form of audiovisual recordings (e.g., speech, video captures, etc.) that may require additional processing to extract the actual meaning of the user's one or more responses. Traditionally, these types of inputs may be processed using speech recognition components. However, these speech recognition components may cause errors during speech-to-text translations. Thus, at step 504, these one or more responses may be processed through NLP or other machine learning/artificial intelligence processes correct any errors that may result from these initial speech-to-text translations. For example, if the speech-to-text translation of a user input results in the non-sensical input "I played fetch with my dock," the NLP or other machine learning/artificial intelligence processes may perform a logical corrective action to change the input to "I played fetch with my dog." As another illustrative example, the NLP or other machine learning/artificial intelligence processes may make accent-related corrections based on a user's nationality (e.g., "I dantna" may be corrected to "I don't know," etc.).

At step 506, the MIC may determine whether the generated correction is valid. For instance, the MIC may evaluate the output of the NLP or other machine learning/artificial intelligence processes to determine whether the correction satisfies a pre-defined confidence threshold for valid inputs. If the correction does not satisfy this pre-defined threshold, the MIC, at step 508, may recover either the original input or the closest matching response.

At step 510, the MIC may transmit the suggested input to the user for approval. This suggested input may include the correction generated by the NLP or other machine learning/artificial intelligence processes (if the confidence threshold is satisfied) or the original input or closest matching response (if the confidence threshold is not satisfied). The suggested input may be presented to the user through the simulation interface and may be provided with options to either accept or reject the suggested input.

At step 512, the MIC determines if the user input has been approved for submission. If the user rejects the suggested user input, the MIC may prompt the user to provide a new response that may be processed for the corresponding interview question, thereby restarting the process 500. However, if the user input has been approved for submission, the MIC may submit this finalized user input for processing as part of the interrogation simulation process.

Figure 6:
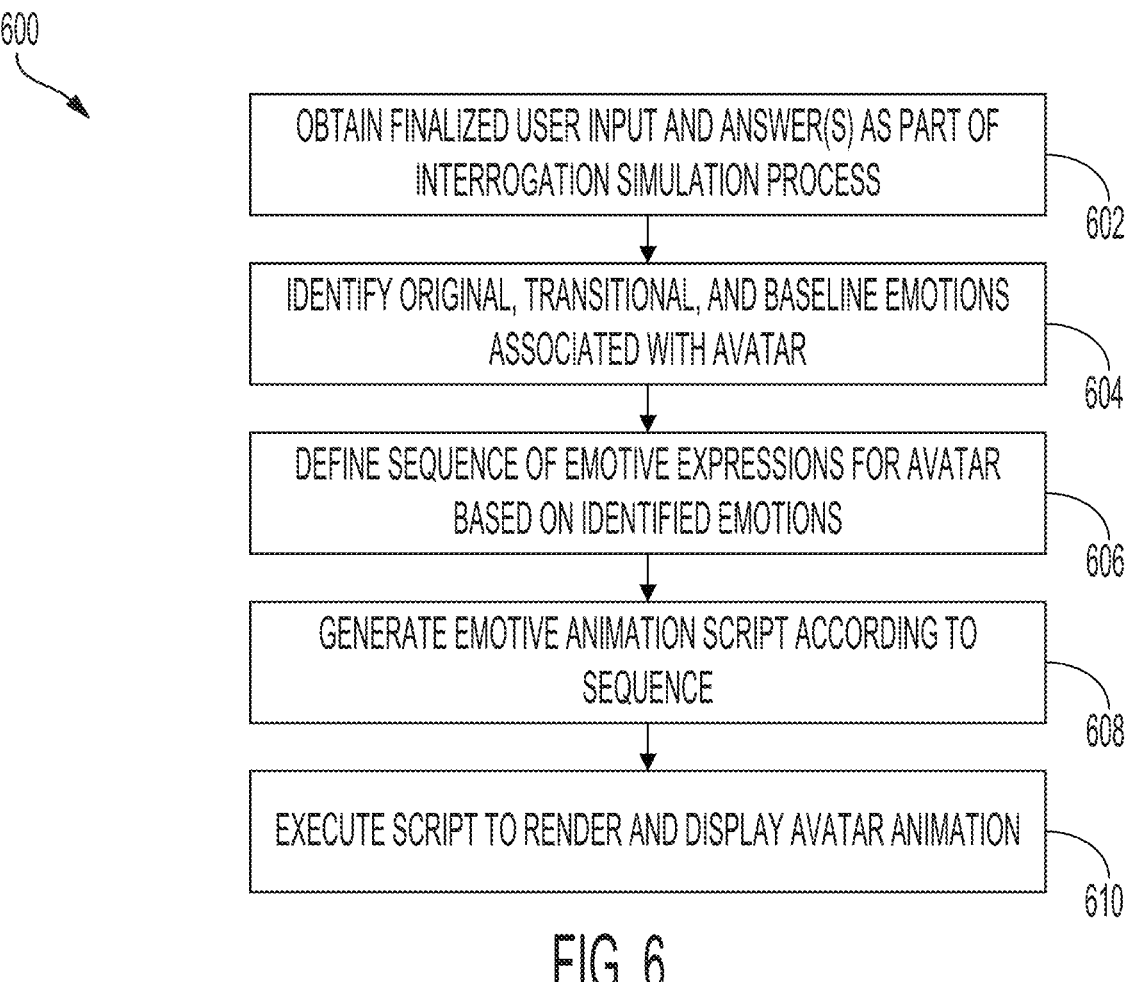
FIG. 6 shows an illustrative example of a process for generating and executing emotive animation scripts associated with an avatar during processing of a user input in accordance with at least one embodiment.

FIG. 6 shows an illustrative example of a process 600 for generating and executing emotive animation scripts associated with an avatar during processing of a user input in accordance with at least one embodiment. The process 600 may be performed by the interrogation and emotion processor of the domain-specific interview simulation system. At step 602, the interrogation and emotion processor may obtain the finalized user input and any identified valid answers as part of the interrogation simulation process. As noted above, the interrogation and emotion processor may receive, from the MIC, valid answers corresponding to the user's input and corresponding scores (e.g., confidence values, etc.).

At step 604, the interrogation and emotion processor may identify the original, transitional, and baseline emotions associated with the avatar implemented for the interview simulation. The original emotion may denote a "from" state corresponding to the avatar's emotional state prior to an update. The transitional emotion may correspond to a "to" state and may be implemented to reflect a single sequence of expressions that may be denote a reaction to the user input. The baseline emotion may correspond to a "base" state that defines a sequence of expressions that the avatar is to maintain while awaiting an update. Based on these identified emotions, the interrogation and emotion processor, at step 606, may define a sequence of emotive expressions for the avatar.

At step 608, the interrogation and emotion processor may generate an emotive animation script according to the defined sequence of emotive expressions. This script may define configurable frame start/stop times, speed, looping, delays, durations, randomizing of animations, partial animations, and expression freezing for the avatar. The script may be defined using any programmatic code (e.g., JavaScript, etc.) that is executable by the domain-specific interview simulation system. At step 610, the emotive animation script may be executed to render and display the configured avatar animation through the simulation interface. Through execution of this script, the avatar may express different emotions that are responsive to the user's input in real-time.

Figure 7:
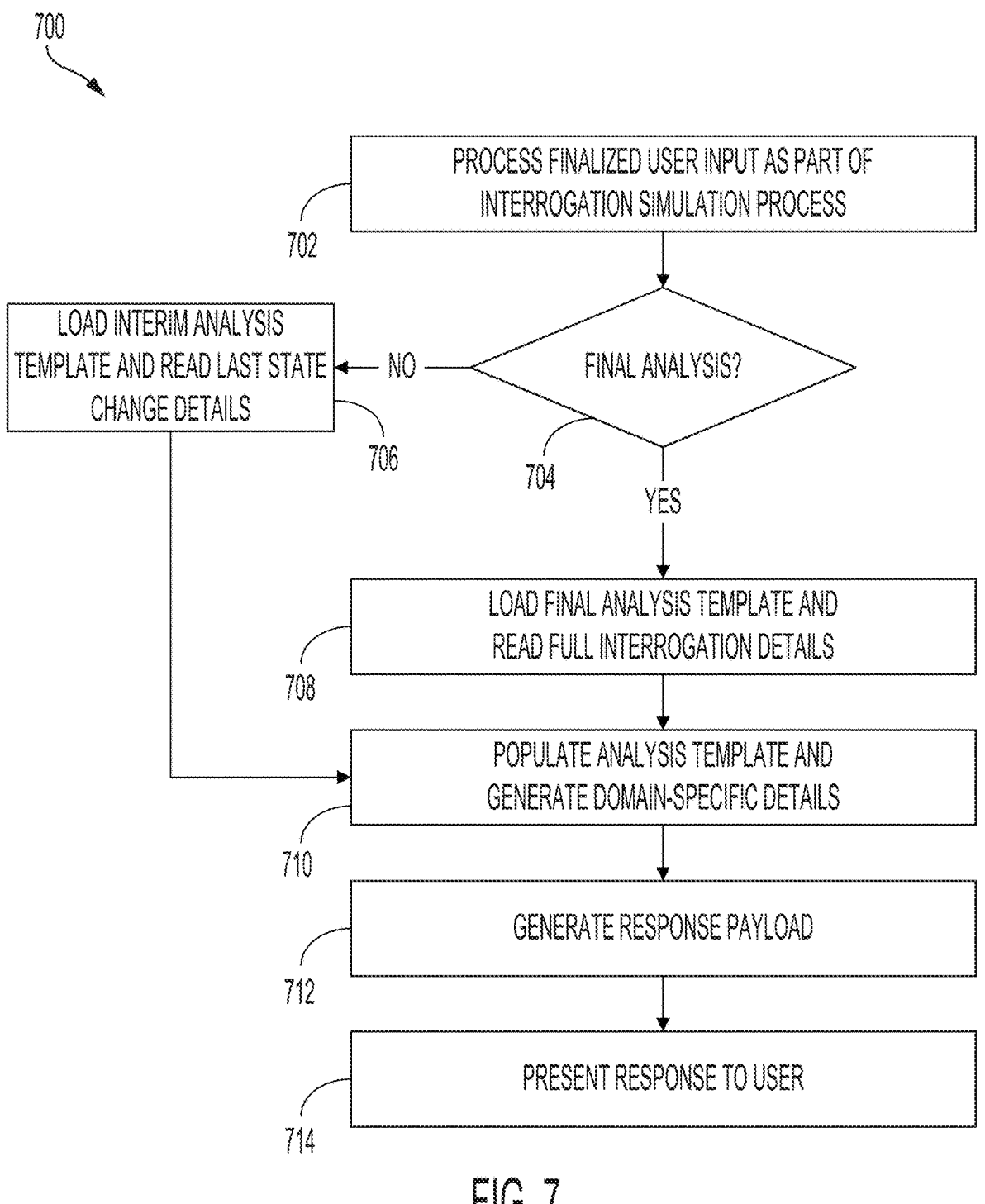
FIG. 7 shows an illustrative example of a process for generating and presenting responses to user inputs during an interim or final analysis conducted during an interrogation simulation process and in response to user inputs in accordance with at least one embodiment.

FIG. 7 shows an illustrative example of a process 700 for generating and presenting responses to user inputs during an interim or final analysis conducted during an interrogation simulation process and in response to user inputs in accordance with at least one embodiment. The process 700 may be performed by the domain-specific interview simulation system through the MIC.

At step 702, the domain-specific interview simulation system may process a finalized user input as part of the interrogation simulation process. This processing of a finalized user input may be performed through the MIC as described above in connection with FIG. 2. At step 704, the domain-specific interview simulation system may determine whether the output of the MIC represents a final analysis of the interview simulation conducted between the user and the virtual interviewer. If the domain-specific interview simulation system determines that the interview simulation is still ongoing (i.e., the output does not represent a final analysis of the interview simulation), the domain-specific interview simulation system, at step 706, may load an interim analysis template and read the last state change details for the interview simulation. Alternatively, if the domain-specific interview simulation system determines that the interview simulation has reached a final state (i.e., the output represents a final analysis of the interview simulation), the domain-specific interview simulation system, at step 708, may load a final analysis template and read the full interrogation details for the interview simulation.

At step 710, the domain-specific interview simulation system may dynamically populate the selected analysis template (interim or final) and generate domain-specific details corresponding to the present status of the interview simulation and of any submitted responses. At step 712, the domain-specific interview simulation system may generate a response payload that includes the populated analysis template, as well as any additional insights that may inform the user's performance during the interview simulation. Further, in some instances, the response payload may be provided to the interrogation and emotion processor, which may define the emotional state of the avatar for the interview simulation. At step 714, the domain-specific interview simulation system may present the response payload to the user. The response payload may be presented to the user through the simulation interface. For example, the response payload may be presented as text in a description area of the simulation interface (e.g., a webpage side note in a thought bubble, a section between conversation steps, etc.).

Figure 8B:
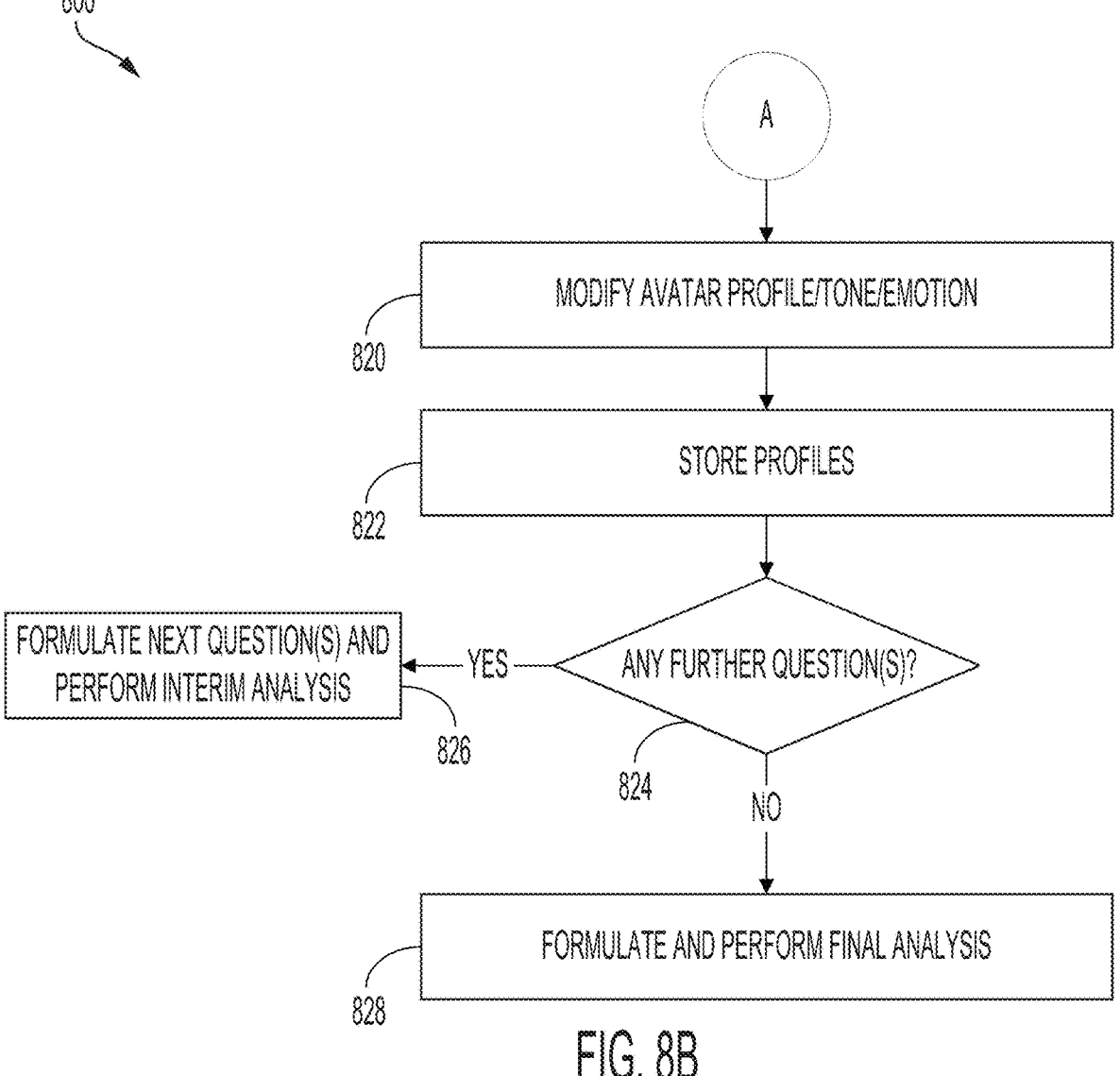

FIGS. 8A-8B show an illustrative example of the interrogation simulation process 800 executed by the domain-specific interview simulation system in accordance with at least one embodiment. At step 802, the domain-specific interview simulation, through the MIC, may detect a user input for initiating the interrogation simulation process. For instance, when a user accesses the simulation interface, they may be presented with an option to initiate the interrogation simulation process. When this option is selected, the MIC may receive an indication of the user's desire to start a new interview simulation. In some instances, the user may transmit a user input regardless of whether a session with the domain-specific interview simulation system has been initialized. For example, if a user accesses the domain-specific interview simulation system through a virtual reality or augmented reality environment whereby user inputs may be submitted randomly, the domain-specific interview simulation system may dynamically process this randomly obtained input to detect a user input corresponding to an interview simulation that the user may wish to initiate.

At step 804, the MIC may determine whether there is a question available to answer. For example, in some instances, a previously available question corresponding to a user input may no longer be available. This may occur as a result of an update to the pool of questions associated with the particular domain of the interview simulation, such as through manual editing of this pool of questions through the system editor or through processing of new data from one or more knowledge sources that maintain this pool of questions for the particular domain. The pool of questions may be dynamically updated, in some instances, based on vetted results associated with previously conducted interviews (simulated and/or actual). In some instances, a question may not be available to answer if the user input is randomly received without any underlying context that may correspond to a particular question that may be provided. For instance, if the user accesses the domain-specific interview simulation system and provides a random user input corresponding to a request to initiate an interview simulation but does not provide any other information about the user or their particular request, the domain-specific interview simulation system may determine that there is no current question to answer.

If the MIC determines that there is a question that is available to answer, the MIC, at step 806, may trigger a set of transforms and operations on the data associated with the user input to set and store one or more variables corresponding to the question. As an illustrative example, if the user is presented with the question "When were you born?," the MIC may trigger a set of transforms and operations on the user input (i.e., data) to extract the user's age. If the user indicates that they were born in October of 1980 and the interview simulation is being conducted in August of 2024, the MIC may apply a transform to the user input to determine that user is 43 years of age. The user's age, as calculated through transformation of the user input, may be stored as an input variable that is available according to the question's scope. Further, this determined age may be used to set other variables that may be relevant for other questions. For example, based on the user's determined age, the MIC may determine the average number of years that the user has been driving (e.g., average number of years driving=age−16). Further, based on the user's determined age, the MIC may determine whether car rental fees apply to the user (e.g., a Boolean set according to a determination whether age<25). These variables may be stored by the MIC in association with a user profile and, as described in greater details herein, used to infer answers for other questions that may be part of the interview simulation.

At step 808, the MIC may perform freeform input processing for one or more questions to determine corresponding meanings and answers. Through this freeform input processing, the MIC may identify any applicable answers to the user input and update corresponding profiles according to the processing of the user input with a corresponding tree of applicable answers. The operations performed as part of this freeform input processing are described in greater detail herein in connection with FIG. 9.

At step 810, the MIC may find one or more next questions with corresponding answers. As noted above, the domain-specific interview simulation system may determine an initial interview flow for the interview simulation. This interview flow may be pseudorandom and may include a prioritization according to an initial relevance of interview topics. This initial relevance of interview topics may be determined according to the aforementioned inputs provided by the user when requesting an interview simulation (e.g., any responses provided through submitted forms, etc.). The domain-specific interview simulation system may accordingly remove and discard any topics that are deemed irrelevant to the interview simulation. As the user provides different user inputs (e.g., answers) to presented questions, the domain-specific interview simulation system may dynamically adjust the interview flow based on conditions and scores (e.g., eligibility, relevance, credibility, patience, etc.) as well as time remaining in the interview simulation. Through this adjustment, the MIC may identify one or more next questions and the corresponding answers for these one or more next questions.

At step 812, the MIC may determine whether any answers can be inferred from the previous user inputs provided by the user. As noted above, when the MIC receives a user input, the MIC may trigger a set of transforms and operations on the user input to set one or more variables and conditions that may be applicable to other questions that may be associated with the interview simulation. Returning to an earlier illustrative example, where the user is prompted to indicate when they were born and the user's answer is processed to determine that the user is 43 years of age, the MIC may set a variable corresponding to the average number of years that the user has been driving (e.g., average number of years driving=age−16=27) and may set a conditional variable corresponding to the determination of rental car fees (e.g., age<25=>No rental car fees applicable). If the next question associated with the current interview flow corresponds to the user's driving experience or the user's desire to rent a vehicle while in the United States, the MIC may infer one or more answers (e.g., the user's average number of years driving, the user's eligibility for rental car fees, etc.) from the previously set variables and conditions.

If the MIC determines that one or more answers can be inferred from the user's previously provided inputs, the MIC, at step 814, may perform inferred data processing for a set of questions associated with the interview flow. Further, the MIC, at step 816, may run a set of machine learning or artificial intelligence calls in parallel and update the profile concurrently by priority. These operations are described in greater detail herein in connection with FIG. 9. Once the profile has been updated to indicate applicable answers and corresponding scores for determining the user's performance during the interview simulation, the MIC may return to step 810 and find the next questions and corresponding answers according to the present interview flow. This present interview flow may be dynamically updated according to the profile updates performed as part of step 816.

If the MIC determines that answers cannot be inferred for the identified set of questions, the MIC, at step 818 may return this set of questions based on the present topic of the interview simulation. This topic may be determined based on the present interview flow of the interview simulation. At step 820, the MIC may modify the avatar's profile, tone, and/or emotion according to the present interview flow. For instance, the MIC, through the interrogation and emotion processor, may dynamically process the valid answers (with corresponding scores) corresponding to the answered questions, along with a set of profiles corresponding to the avatar and the user, to define a sequence of emotive expressions for the avatar. The interrogation and emotion processor, based on this sequence of emotive expressions, may generate a script that may be executed to present, through the simulation interface, the new emotional state of the avatar. This sequence and script, as well as the user's performance, may be stored in the avatar and user profiles, respectively, at step 822.

At step 824, the MIC may determine whether there are any further questions as part of the interview flow. If there are any further questions that may be presented to the user, the MIC, at step 826 use the stored profile corresponding to the user and the avatar to formulate the next questions that may be presented to the user and perform an interim analysis. This interim analysis may include processing the user's previously provided and/or inferred answers according to different metrics to generate one or more interim scores. These one or more interim scores may provide a contemporaneous indicator of the user's performance during the interview simulation. The MIC, based on this interim analysis, may generate a new question according to the topic to be addressed and define the tone for this new question according to the updated avatar profile. Further, the MIC may execute the script stored in the avatar profile to present, through the simulation interface, the new emotional state of the avatar. Once completed, the MIC (through the avatar) may present the next question and emotional state of the avatar according to the updated interview flow. This process may continue until a determination is made that the simulation interview has been completed.

If the MIC determines that there are no further questions and that the interview simulation has been completed, the MIC, at step 828, may formulate and perform a final analysis of the interview simulation. This analysis may include an evaluation of the user's responses (actual and inferred) according to different scoring metrics. As noted above, ongoing scores are calculated based on the meaning of the responses provided to the virtual interviewer. Returning to an earlier illustrative example, the domain-specific interview simulation system may modify "eligibility" scores by "relevance" scores, and "credibility" scores by "patience" scores (which are influenced by time remaining). The scores are combined in real-time through different algorithms (as described in greater detail herein) until a threshold is reached either for approving or denying the user's application. These scores, as well as any approval/denial decisions, may be presented to the user through the simulation interface. In some instances, the domain-specific interview simulation system may provide this analysis to other relevant parties, such as vendors and other entities that may use the analysis to train others.

FIG. 9 shows an illustrative example of a process 900 for identifying applicable answers to user inputs and updating corresponding profiles according to processing of the user input with a corresponding tree of applicable answers in accordance with at least one embodiment. At step 902, the MIC obtains a question with all possible answers according to the present interview flow. For instance, if the MIC determines that there is a question available to answer in response to a user input, the MIC may evaluate this question to identify a tree of possible answers for this question. This tree of possible answers may be obtained from the data repository 118 described above in connection with FIG. 1.

At step 904, the MIC may filter the applicable answers from the tree of possible answers according to the user input, inferred data, and user and avatar profiles. Returning to an earlier illustrative example, whereby a user has indicated that they are 43 years of age, the MIC may filter the tree of possible answers to remove any answers that do not comport with the user's defined age. Further, the MIC may process the user profile associated with this user to filter out any possible answers that not comport with the user's defined characteristics (e.g., demographics, educational background, etc.) as defined by the user through an onboarding process or inferred through prior responses to presented questions.

At step 906, the MIC may pre-process the user input to update the profiles associated with the interview simulation. The actions performed by the MIC as part of step 906 are described in greater detail herein in connection with FIG. 10, which illustrates a process for updating profiles according to pre-processing of user inputs and to processing of different answers in accordance with at least one embodiment.

Once the MIC has pre-processed the user input to update the profiles associated with the interview simulation, the MIC, at step 908, may process the user input with the tree of answers using generative artificial intelligence or NLP. For instance, using the user input and this tree of answers, the MIC may formulate a generative artificial intelligence or NLP prompt (depending on the question type) that may be transmitted to one or more generative artificial intelligence or NLP platforms to identify a set of options selectable from the tree of answers that may best represent the appropriate answers corresponding to the user input. The MIC, for instance, may transmit a pre-defined number of calls (e.g., 100 calls, 1000 calls, etc.) to these platforms in a cost-effective manner to generate statistically significant data that may best match the user's input (as well as its partitioned semantic components) to the system's fixed, curated answer list.

At step 910, the MIC may determine whether the user input required revision or caused an error. As noted above, during the course of an interview simulation, a user may submit one or more responses to presented questions that may require additional processing to extract the actual meaning of the user's responses. These one or more responses may be processed through NLP or other machine learning/artificial intelligence processes correct any errors that may result from these initial speech-to-text translations. Any corrections made to the user input may need to be presented to the user for approval prior to further processing, as described above in connection with the process 500 illustrated in FIG. 5. In some instances, these one or more responses may result in errors as they may not be readily understandable. Returning to an earlier illustrative example, if the speech-to-text translation of a user input results in the non-sensical input "I played fetch with my dock," processing this user input with the tree of answers may result in an error, which may serve as an indication that the user input requires correction. Accordingly, if the user input requires revision or otherwise results in an error, the MIC, at step 912 may return with a retry state. This may force presentation of the same question with an indication of a possible error message or of a revised user answer that may require confirmation from the user prior to further processing.

If the MIC determines that the user input does not require further revision and does not result in an error during processing through generative artificial intelligence or NLP, the MIC, at step 914, may flatten the list of answers according to priority (highest to lowest). For instance, each layer of the tree of answers may have higher priority over descendants across ancestor layers. Once the MIC has flattened the list of answers according to priority, the MIC, at step 916, may process the flattened list of answers to update the profiles. This processing of answers is described in greater detail herein in connection with FIG. 10. The processing of the flattened list of answers may result in a modification of the interview flow according to the updated profiles and updated scores that may denote the user's current performance during the interview simulation. Accordingly, the interview simulation may proceed at step 918, whereby the MIC may return a successful state.

Figure 10:
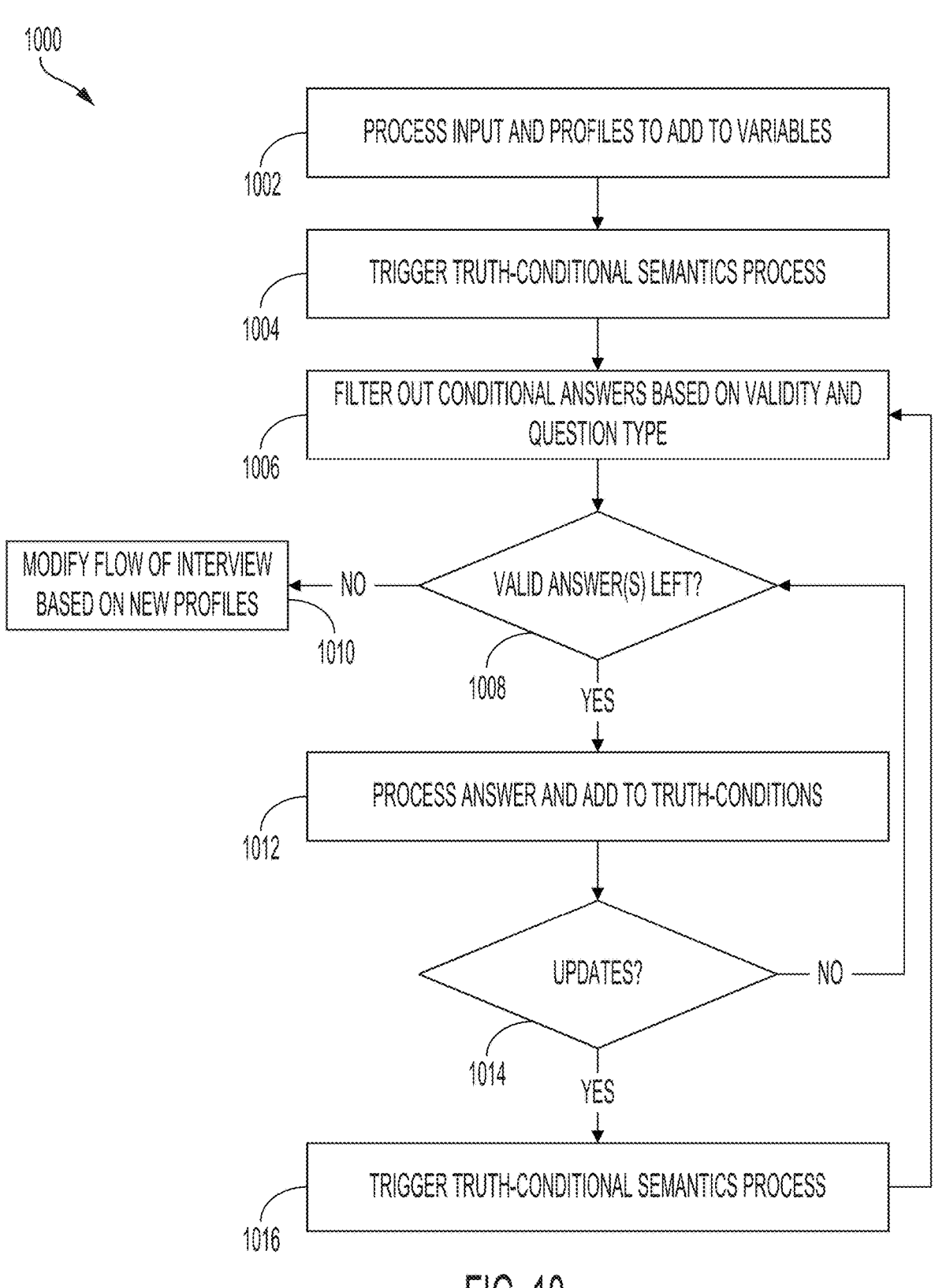
FIG. 10 shows an illustrative example of a process for updating profiles according to pre-processing of user inputs and to processing of different answers in accordance with at least one embodiment.

FIG. 10 shows an illustrative example of a process 1000 for updating profiles according to pre-processing of user inputs and to processing of different answers in accordance with at least one embodiment. At step 1002, the MIC may process a user input and a set of profiles relevant to the interview simulation to add one or more variables. For example, if the virtual interviewer asks a user to indicate where they plan to reside in the United States and the user responds with "Topeka," the MIC may set the variable "ResidenceCity" to "Topeka" within the user profile.

At step 1004, the MIC may trigger a truth-conditional semantics process. This truth-conditional semantics process is described in greater detail herein in connection with FIG. 11. Returning to the earlier illustrative example where the variable "ResidenceCity" is set to "Topeka" in response to a user input, the MIC, through this truth-conditional semantics process, may perform a lookup of unique city names and automatically set the variable "ResidenceState" to "Kansas." Further, through performance of the truth-conditional semantics process, the MIC, at step 1006, may filter out any conditional answers that are no longer valid and according to the question type. This may result in a filtered prioritized list of answers. However, if the required answer is missing, the MIC may return an error.

At step 1008, the MIC may determine, based on the updated list of valid answers, whether there any valid answers remaining. If the MIC determines that there are no more valid answers left to process, the MIC, at step 1010, may modify the flow of the interview simulation based on new profiles. For instance, the MIC may calculate a set of scores corresponding to the interview simulation according to the present state of the interview simulation. As noted above, ongoing scores are calculated based on the meaning of the responses provided by the user to the virtual interviewer. For a given user input, the MIC may modify "eligibility" scores by "relevance" scores, and "credibility" scores by "patience" scores (which are influenced by time remaining). Based on these score updates, the MIC may modify the flow of the interview simulation and exclude or include different topic paths and questions that may be presented to the user.

If the MIC determines that there are additional valid answers left, the MIC, at step 1012 may process an answer and add to truth-conditions. For example, if it is known that the interview is being conducted in the United States, that the user flew to the interview, and that the interview is more than five miles from the nearest airport, a user indicating that they are 19 years of age in response to the question "What is your age?" may result in a determination that the user cannot rent a car (since the minimum age to rent a car is 25). Thus, through the processing of the answer and adding it to the truth-conditions, the MIC, at step 1014, may determine whether there are any updates. If there are any updates to the truth-conditions, the MIC may trigger the truth-conditional semantics process described in greater detail herein in connection with FIG. 11. Once the truth-conditional semantics process is completed, the MIC may return to step 1006 and filter out any conditional answers that are no longer valid and according to the question type. If there are no updates to the truth-conditions, the MIC may return to step 1008 to determine whether there are any valid answers remaining. Thus, the process 1000 may continue until all valid answers have been processed according to the truth-conditional semantics process.

Figure 11:
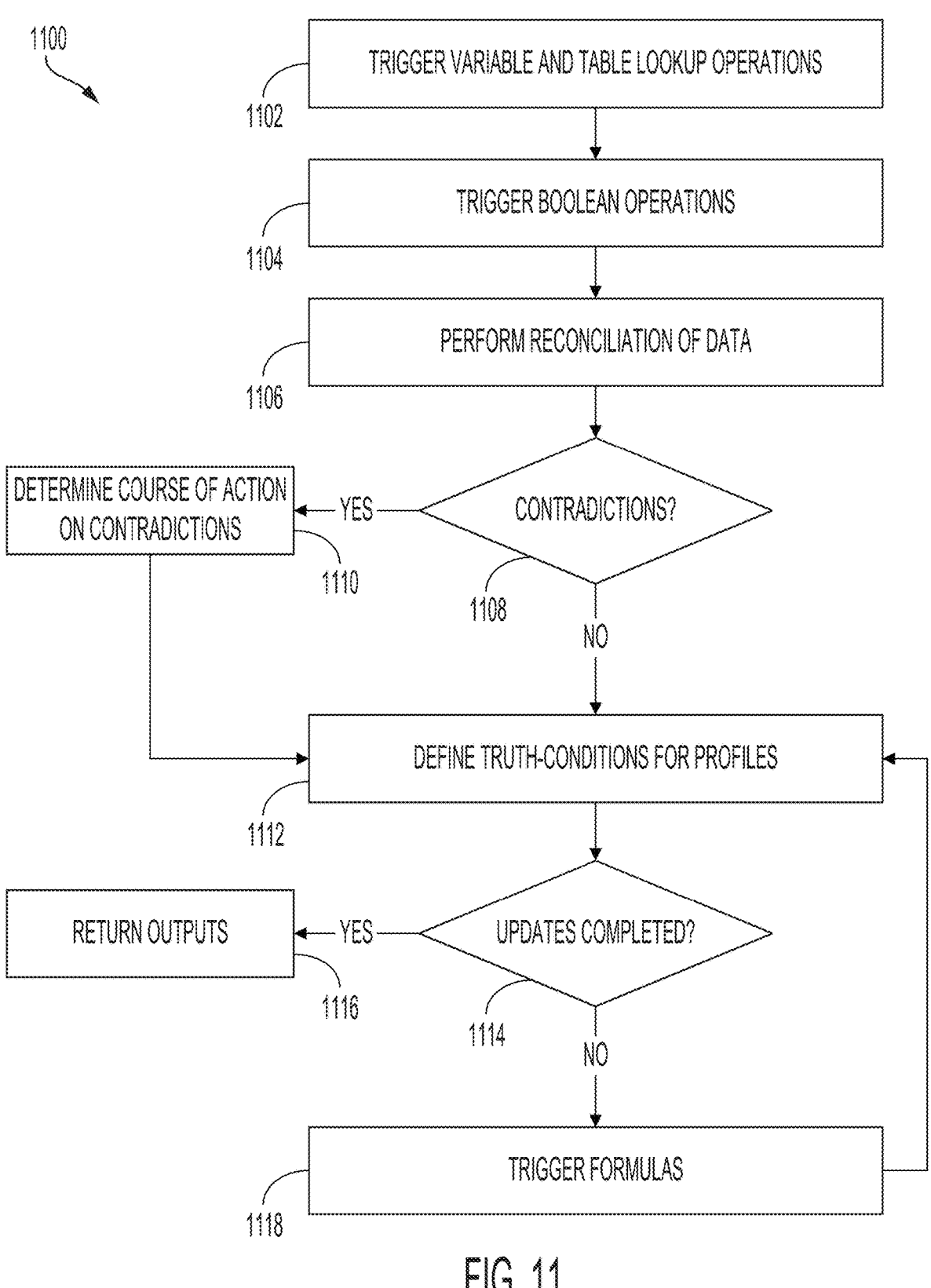
FIG. 11 shows an illustrative example of the truth-conditional semantics process in accordance with at least one embodiment.

FIG. 11 shows an illustrative example of the truth-conditional semantics process 1100 in accordance with at least one embodiment. At step 1102, the MIC may trigger variable and table lookup operations in response to a user input. These operations may include obtaining any variables that are representative of the user input. Further, based on these applicable variables, the MIC may perform one or more table lookup operations to identify any other variables that may be relevant to the truth-conditional semantics process 1100.

At step 1104, the MIC may trigger one or more Boolean operations according to the performed variable and table lookup operations. Boolean operations may help determine logical outcomes and enable truth-conditions. For example, the Boolean expression "IsReady=Has Arrived && Has Necessities" may be defined to indicate that a user is ready if the user has arrived and has certain necessities. Returning to an earlier illustrative example, based on the user's determined age (as provided in a user input), the MIC may trigger a Boolean operation that may inform whether car rental fees apply to the user (e.g., a Boolean set according to a determination whether the user's age<25).

At step 1106, the MIC may perform a reconciliation of data and determine, at step 1108, whether there are any contradictions resulting from the user input. For instance, through the reconciliation of data according to the Boolean operations performed, the MIC may identify one or more contradictions that may be addressed in order to obtain a set of valid answers usable to make an application determination. If the MIC identifies one or more contradictions in the data, the MIC, at step 1110 may determine a course of action to address these contradictions. This may include identifying clarifying questions that may be provided to the user to elicit additional answers that may be processed to remove any of these contradictions.

Once the MIC has addressed any identified contradictions, or determines that there are no contradictions, the MIC, at step 1112, may define a set of truth-conditions for the profiles. For instance, the MIC may store different logic sets and formula results corresponding to the variables and table lookups performed in response to a user input. At step 1114, the MIC may determine whether necessary updates to the profiles have been completed. If these updates have not been completed, the MIC, at 1118 may trigger a set of formulas that may be used to further define the set of truth-conditions for the profiles. For these formulas, the MIC may obtain data from different data matrices that, when combined with the variables and table lookups corresponding to the user input, may be used to define the set of truth-conditions. Once all updates have been completed, the MIC, at step 1116 may return the outputs of the different Boolean operations and formulas.

As an illustrative example of the process 1100, suppose a user responds to the question "Where did you come from?" with "Nigeria," the MIC may set Variable(InputCountryName)="Nigeria." Subsequently, based on this variable, the MIC may evaluate the expression Variable(ResidenceContinentName)=if(NOT InputCountryName.isEmpty) then Lookup [InputCountryName] from Table[CountryToContinent] else NONE. This expression may cause the MIC to perform a lookup of the CountryToContinent table using "Nigeria" as the input to determine that the Variable(ResidenceContinentName)="Africa."

Further, based on the user response of "Nigeria," the MIC may evaluate one or more applicable data matrices to extract data that may be used for applicable truth-condition formulas. For example, from the data matrices, the MIC may use Variable(ResidenceCountryName)="Nigeria" to evaluate the data matrices and determine that the population of Nigeria if 218 million. Accordingly, the MIC may set Variable(Residence.Population)=218 million. Based on this variable, the MIC may consequently evaluate the Boolean truth-condition expression "IsHighPopulation=Residence.Population>150 million" according to the value of Variable(Residence.Population) and set this truth-condition to enabled (i.e., IsHighPopulation exists). The MIC may consequently convert this result into a number that corresponds to a valid answer for the question.

FIG. 12 shows an illustrative example of a process 1200 for conducting a statistical analysis of answers within a tree of answers to prioritize valid answers in accordance with at least one embodiment. The process 1200 may be performed for freeform answer processing using generative artificial intelligence. Using generative artificial intelligence, the domain-specific interview simulation system may determine valid answers to questions for a given user input through recursive grouping, statistical analysis, and filtering to prioritize answers.

At step 1202, the domain-specific interview simulation system obtains a tree of answers to be conditionally executed for each node's children, stating at the root node of the tree. At step 1204, the domain-specific interview simulation system may process each node's children as a single group and propagates knowns from ancestors. This processing of children may be repeated a pre-defined number of times (R) on a given group. For instance, this single group of children is processed in parallel through generative artificial intelligence and this recursion continues until all layers have been analyzed and all potential answers examined and chosen. The specific operations associated with step 1204 are described in greater detail herein in connection with FIGS. 13A and 13B.

At step 1206, the domain-specific interview simulation system may prioritize choices using a combination of statistical modeling and curated domain-expertise. For instance, after each layer, the domain-specific interview simulation system may apply a statistical analysis to assign a weight to each answer. This weight is calculated by counting the number of times the generative artificial intelligence includes the answer out of n*R requests and multiplying that number by 100/(n*R), where n is the number of repeats on the generative artificial intelligence side and R is the number of repeats on the system side, as described above.

At step 1208, the domain-specific interview simulation system may perform post-validation and mark any invalid answers from the tree of answers. For instance, the domain-specific interview simulation system may define a confidence threshold that may be used to determine whether an answer is deemed valid or not. Any answer that fails to satisfy this confidence threshold may be deemed invalid by the domain-specific interview simulation system. Further, the domain-specific interview simulation system may define a post-validation range that may correspond to a range of weights that may trigger a post-validation process to determine whether a given answer having a weight within this range is valid or not. Answers that satisfy the confidence threshold and have weights greater than the upper limit of the post-validation range may be deemed valid.

At step 1210, the domain-specific interview simulation system may discard any outliers using the confidence threshold and post-validation process, and normalize the statistics for each valid answer in the group. At step 1212, the domain-specific interview simulation system may re-prioritize the valid answers based on secondary statistical modeling. For instance, the domain-specific interview simulation system may make offset adjustments and, for non-root layers, choose the first answer or top weighted answer exceeding an override threshold (i.e., the highest score answer which is 15% above the top answer). Thus, for layers below the top level, this secondary statistical modeling ensures that only one child is chosen for a given parent. The first child is chosen unless a sibling has a max weight exceeding this override threshold. This secondary statistical method can be adjusted to support various models, such as Z-score and the like.

At step 1214, the domain-specific interview simulation system determines whether there are any valid children remaining. If so, the domain-specific interview simulation system, at step 1216, may compact the next group to include only valid children of this node and include the node as a known. Once this has been completed, the domain-specific interview simulation system may perform step 1204 for this next group and repeat the remaining steps of process 1200. However, if the domain-specific interview simulation system determines that there are no valid children remaining, the domain-specific interview simulation system may return the list of valid answers to the parent at step 1218.

Figure 13B:
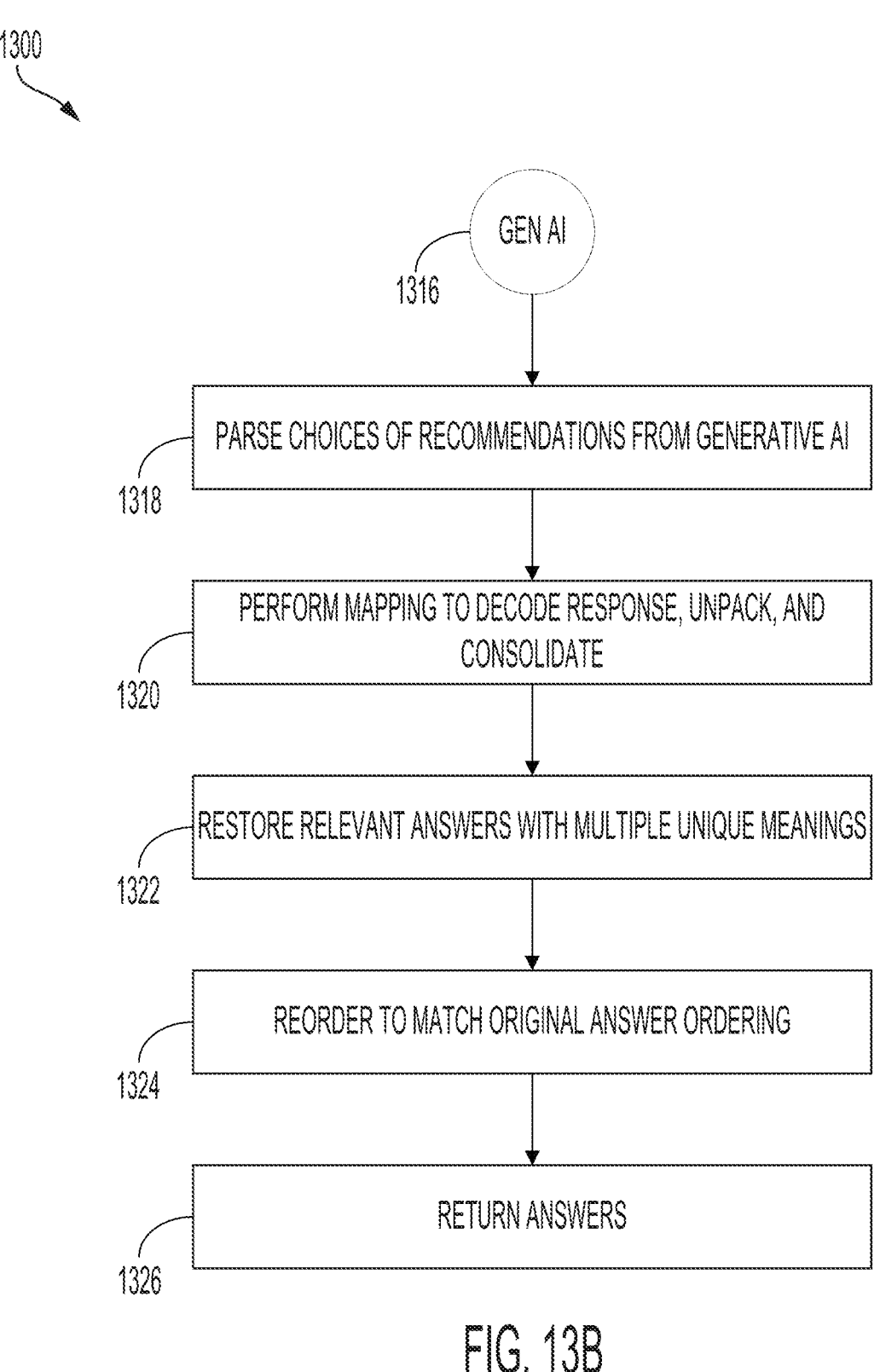

FIGS. 13A-13B show an illustrative example of a process 1300 for parsing and decoding a single group of answers while considering contextual ambiguity in accordance with at least one embodiment. At step 1302, the domain-specific interview simulation system may optimize answers with 1:M meanings with conditional filters. This optimization may be performed by generating a distinct list of nested answers with a map for identical answers.

At step 1304, the domain-specific interview simulation system may sanitize and obfuscate the user input and any personally identifiable information (PII) that may be associated with the user. For instance, the domain-specific interview simulation system may remove any PII and replace this with benign values. This may prevent inadvertent exposure of the user's private data. Further, this may reduce the likelihood of the generative artificial intelligence malfunctioning or generating hallucinations in response to the provided user input.

At step 1306, the domain-specific interview simulation system may use bin packing to balance and optimize a set of payloads for concurrent execution. This operation may include splitting different requests into valid payloads that may be sent in parallel to different generative artificial intelligence platforms for processing. These payloads may be sent to uphold priority and avoid endpoint rejections.

At step 1308, the domain-specific interview simulation system may inject fallback/no-match answers into the valid payloads. By injecting fallback/no-match answers into these payloads, the domain-specific interview simulation system may reduce the likelihood of the generative artificial intelligence platforms returning bad answers. This may further prevent the generative artificial intelligence platforms from returning incorrect answers or doubling down on hallucinations in an attempt to fulfill requests. For example, the domain-specific interview simulation system may inject a fallback answer of "None of these answers are relevant" to allow the generative artificial intelligence platforms to provide this answer instead of returning an incorrect answer or hallucination as a result of the generative artificial intelligence platforms being unable to identify a satisfactory answer.

At step 1310, the domain-specific interview simulation system may perform a mapping to generate or otherwise formulate request data. This process of performing such a mapping is described in greater detail herein in connection with FIGS. 15A-15B. At step 1312, the domain-specific interview simulation system may compile the valid payload of prompt for inference/recommendations for processing through generative artificial intelligence. Once the domain-specific interview simulation system has compiled the valid payload, the domain-specific interview simulation system, at step 1314, may send the payload to the one or more generative artificial intelligence platforms for processing. The request to process this payload may be repeated n number of times (e.g., n=100, etc.) to generate more data for statistical analysis. Thus, step 1316 may correspond to the processing of the payload by the generative artificial intelligence platform the defined n number of times.

As an illustrative example of these aforementioned steps, given R=2 (where R is defined as the number of repeats on the system side) and, for n=5, the prompt "Knowns: \nBob is on the 2nd floor. \n\n\Based on the user input, what does the user intend to do? \n\n1. None of these answers are relevant. \n2. Take the elevator up.\n3. Take the elevator down. \n4. Not take the elevator.", User: "I'm going to the 3rd floor." is defined.

At step 1318, the domain-specific interview simulation system may parse the choices of recommendations from the generative artificial intelligence. Returning to the earlier illustrative example above, the domain-specific interview simulation system may parse the choices made by the generative artificial intelligence from the obtained responses to extract:

R=0–Choices: ["2", "2,4", "2", "2", "2,4"]
    R=1–["2", "2", "2,4", "2", "2"]
    Combined: ["2", "2,4", "2", "2", "2,4", "2", "2", "2,4", "2", "2"]

At step 1320, the domain-specific interview simulation system may perform a mapping to decode the response, unpack the response, and consolidate the response. The domain-specific interview simulation system may handle any contextual ambiguity and conditional choices by compacting multiple identical answer texts and, at step 1322, restoring any relevant answers with multiple unique meanings. Further, at step 1324, the domain-specific interview simulation system may reorder these answers to match the original answer ordering. Once completed, the domain-specific interview simulation system, at step 1326, may return these answers.

Returning to the illustrative example above, if:
    Answer 90="Not take the elevator" (condition: UserPrefersExercise)
    Answer 91="Not take the elevator" (condition: BuildingIsSingleStory)
    Answer 92: "Not take the elevator" (condition: BuildingDoesNotHaveElevator)

then, for the combined choices, each of the answers labeled "4" will map to Answer 90, 91, and 92. The domain-specific interview simulation system may determine how to handle these instances, whether they are related, mutually exclusive, or contradictory.

Figure 14:
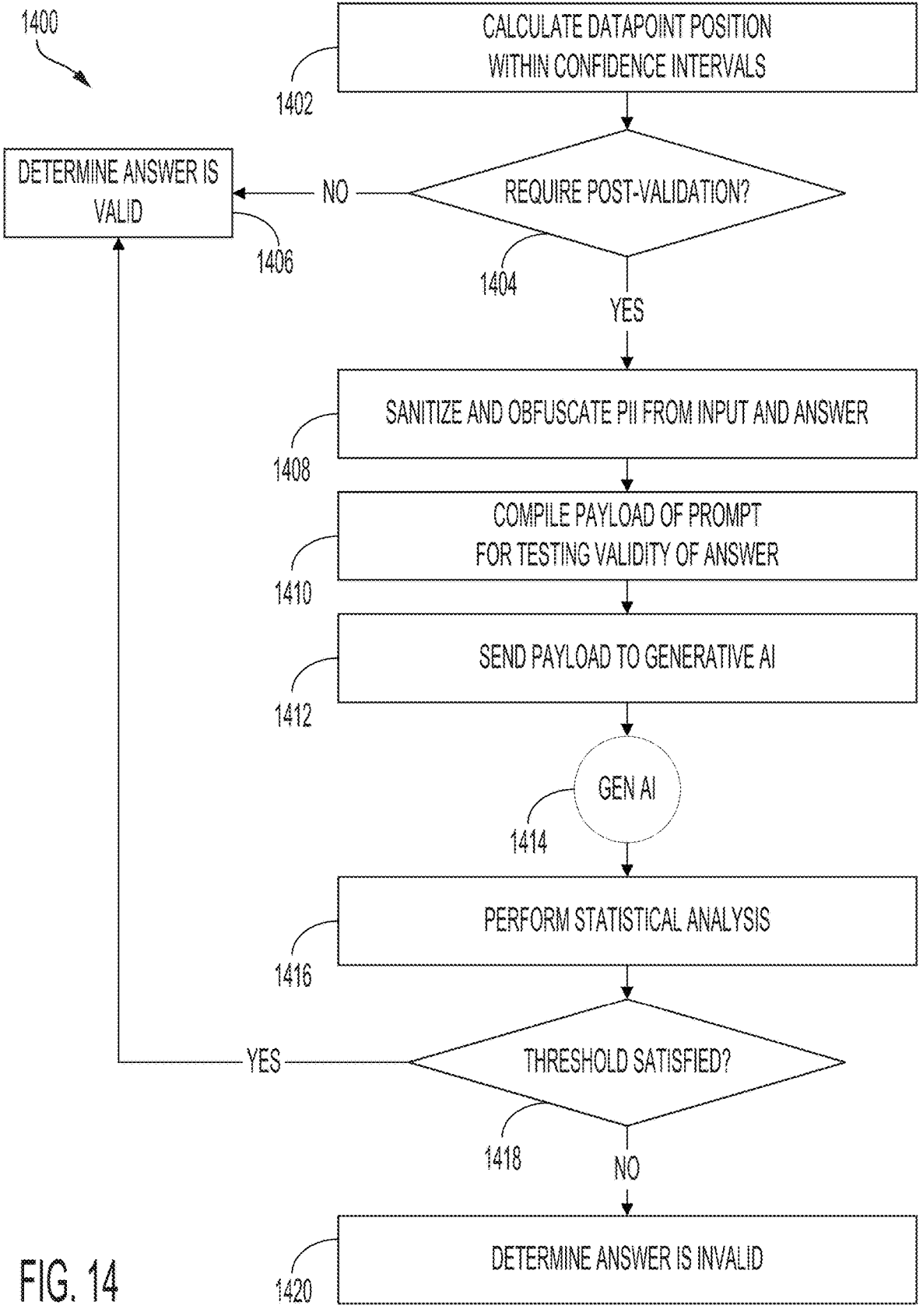
FIG. 14 shows an illustrative example of a process for performing post-validation of answers within a questionable confidence interval range in accordance with at least one embodiment.

FIG. 14 shows an illustrative example of a process 1400 for performing post-validation of answers within a questionable confidence interval range in accordance with at least one embodiment. As noted above, the domain-specific interview simulation system may apply a statistical analysis to assign a weight to each answer. This weight is calculated by counting the number of times the generative artificial intelligence includes the answer out of n*R requests and multiplying that number by 100/(n*R), where n is the number of repeats on the generative artificial intelligence side and R is the number of repeats on the system side, as described above. Based on this weight, the domain-specific interview simulation system, at step 1402, may calculate the datapoint (i.e., answer) position within pre-defined confidence intervals. For instance, the domain-specific interview simulation system may define a confidence interval of 15%-40% whereby any answer that is selected by the generative artificial intelligence platforms within this confidence interval may be deemed questionable. Any answers that fall above this confidence interval (e.g., encountered at a rate greater than 40%, etc.), may be deemed valid.

At step 1404, the domain-specific interview simulation system may determine whether the datapoint falls within the confidence interval, which may denote that post-validation of the datapoint is required. If the datapoint falls above this confidence interval, the domain-specific interview simulation system, at step 1406, may determine that this datapoint is valid. Alternatively, if the domain-specific interview simulation system determines that the datapoint falls within the confidence interval, the domain-specific interview simulation system may determine that this datapoint requires post-validation to determine its validity. Any datapoints that fall below the confidence interval may be deemed invalid and are discarded.

At step 1408, the domain-specific interview simulation system may sanitize and obfuscate any PII from the user input and the answer. Further, the domain-specific interview simulation system, at step 1410, may compile the payload of the prompt for testing the validity of the datapoint. This prompt may be defined to constrain the generative artificial intelligence to three possible answers for the prompt: Yes, No, or Maybe. For example, for n=5, the prompt "Knowns: InBob is on the $2^{nd}$ floor. \nBased on the user input, is the user likely to: Not take the elevator? Return text only Yes, No, or Maybe.", User: "I'm going to the $3^{rd}$ floor." is defined. At step 1412, the domain-specific interview simulation system may transmit the payload to the generative artificial intelligence platform to cause the generative artificial intelligence platform, at step 1414, to process the prompt and return a set of responses. The request to process this payload may be repeated n number of times (e.g., n=100, etc.) to generate more data for statistical analysis.

At step 1416, the domain-specific interview simulation system may perform a statistical analysis on the obtained responses to determine, at step 1418, whether a confidence threshold has been satisfied. For example, the domain-specific interview simulation system may calculate a confidence score for the datapoint according to the equation:

$$\text{Confidence} = 100 * ((\text{Count of "Yes"}) + (\text{Count of "Maybe"}) * 0.75)/n$$

and apply a confidence threshold of 50% for all datapoints. If the confidence score for a datapoint exceeds this confidence threshold, the domain-specific interview simulation system, at step 1406, may determine that the datapoint is valid. Alternatively, if the domain-specific interview simulation system determines that the confidence score of the datapoint falls below the confidence threshold, the domain-specific interview simulation system, at step 1420, may determine that the corresponding answer is invalid. Accordingly, the system may discard this answer from the list of possible answers.

Returning to the illustrative example above, the generative artificial intelligence platform may return the following responses: ["Yes", "Yes", "Yes", "Maybe", "No"]. Based on these responses, the domain-specific interview simulation system may determine that the platform has selected "Yes" 60% of the time, possibly because the $2^{nd}$ and $3^{rd}$ floors are only one level apart. Further, while the platform selected "Maybe" 20% of the time, using the confidence equation noted above, this may be counted as a 15% boost to the confidence score of the datapoint, resulting in a total confidence score of 75%. As this confidence score is greater than the confidence threshold of 50%, the domain-specific interview simulation system may deem the answer to be valid.

In an embodiment, the domain-specific interview simulation system uses the probability distribution (i.e., confidence scores) corresponding to the identified answers to generate a response meaning profile corresponding to the user's response to a given question or prompt. As noted herein, an answer having a high confidence score (i.e., a confidence score exceeding a confidence threshold) may denote a greater likelihood of the answer being explicitly recited in the user's input. Alternatively an answer having a lower confidence score (i.e., a confidence score below the confidence threshold, a confidence score below the minimum value corresponding to a questionable confidence interval range, etc.) may denote that the answer may be implied in the user input or that the generative artificial intelligence platforms are confused as to the meaning of the user input, such as through a lack of clarity (e.g., a vague word is used, syntax grammar is confusing, homonym issues, etc.).

As the response meaning profile is updated based on received user inputs and corresponding identification of answers and confidence scores, the domain-specific interview simulation system may identify patterns or other relationships amongst these answers. For example, if a user input results in completions that are fairly stable (e.g., an answer with a high confidence score and two answers with lower confidence scores at a particular ratio, etc.), the domain-specific interview simulation system may perform any of the operations described herein to further evaluate any vague answers (e.g., answers having lower confidence scores) to converge on a determination of answer validity. Alternatively, if the user input results in completions that result in significant confidence score fluctuations amongst a set of answers, the domain-specific interview simulation system may determine that there may be a need to set a condition that directs the virtual interviewer to prompt the user for clarification with regard to this set of answers. If the user's profile includes contextual information that may be used to address these ambiguities (e.g., reference to conditions, other confidence scores, etc.), the domain-specific interview simulation system may use this contextual information to supplement this set of answers and provide clearer meanings to this set of answers. Thus, through the response meaning profile, the domain-specific interview simulation system may view the entire answer set according to their corresponding confidence scores instead of simply performing any of the aforementioned processes according to a single prioritized answer selected according to its confidence score.

Figure 15A:
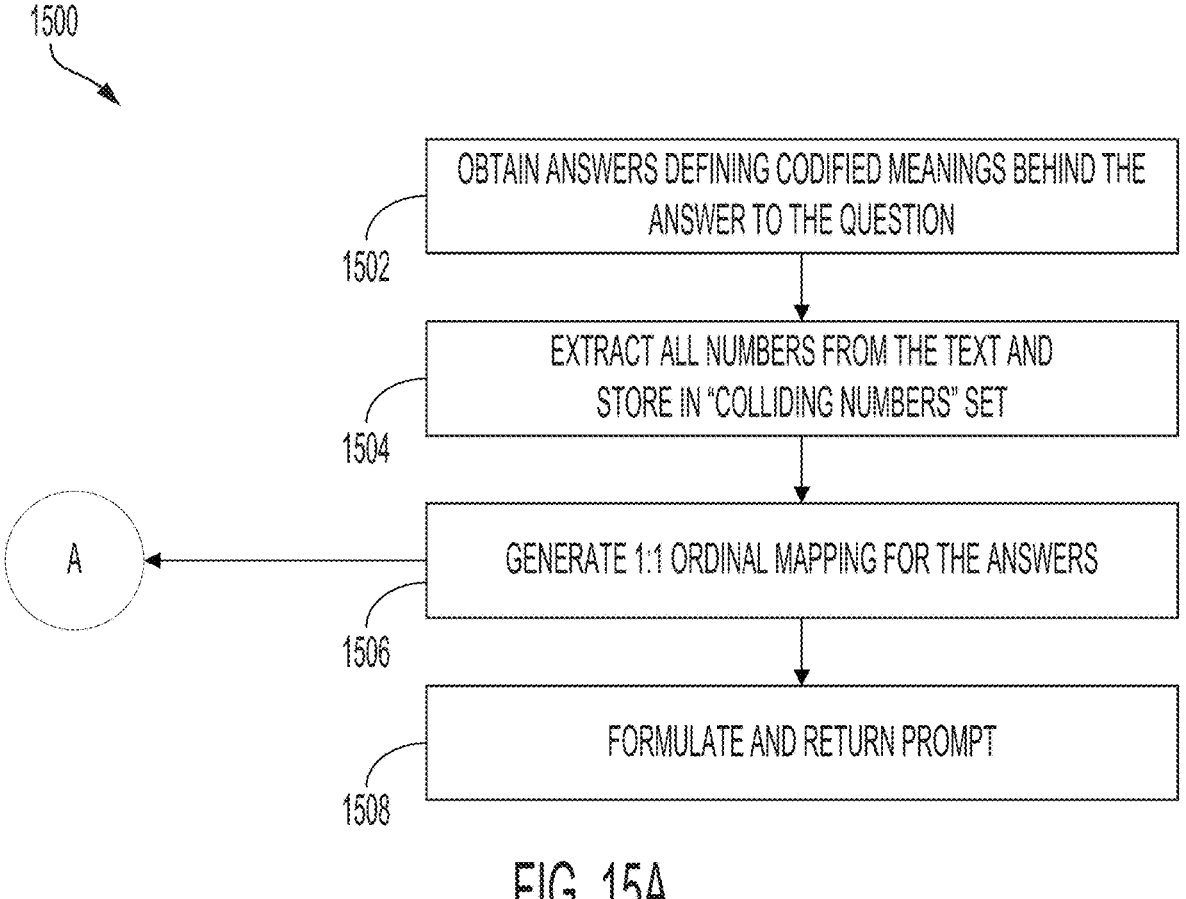
FIGS. 15A-15B show an illustrative example of a process for reducing generative artificial intelligence hallucinations through ordinal mapping of different answers in accordance with at least one embodiment.
Figure 15B:
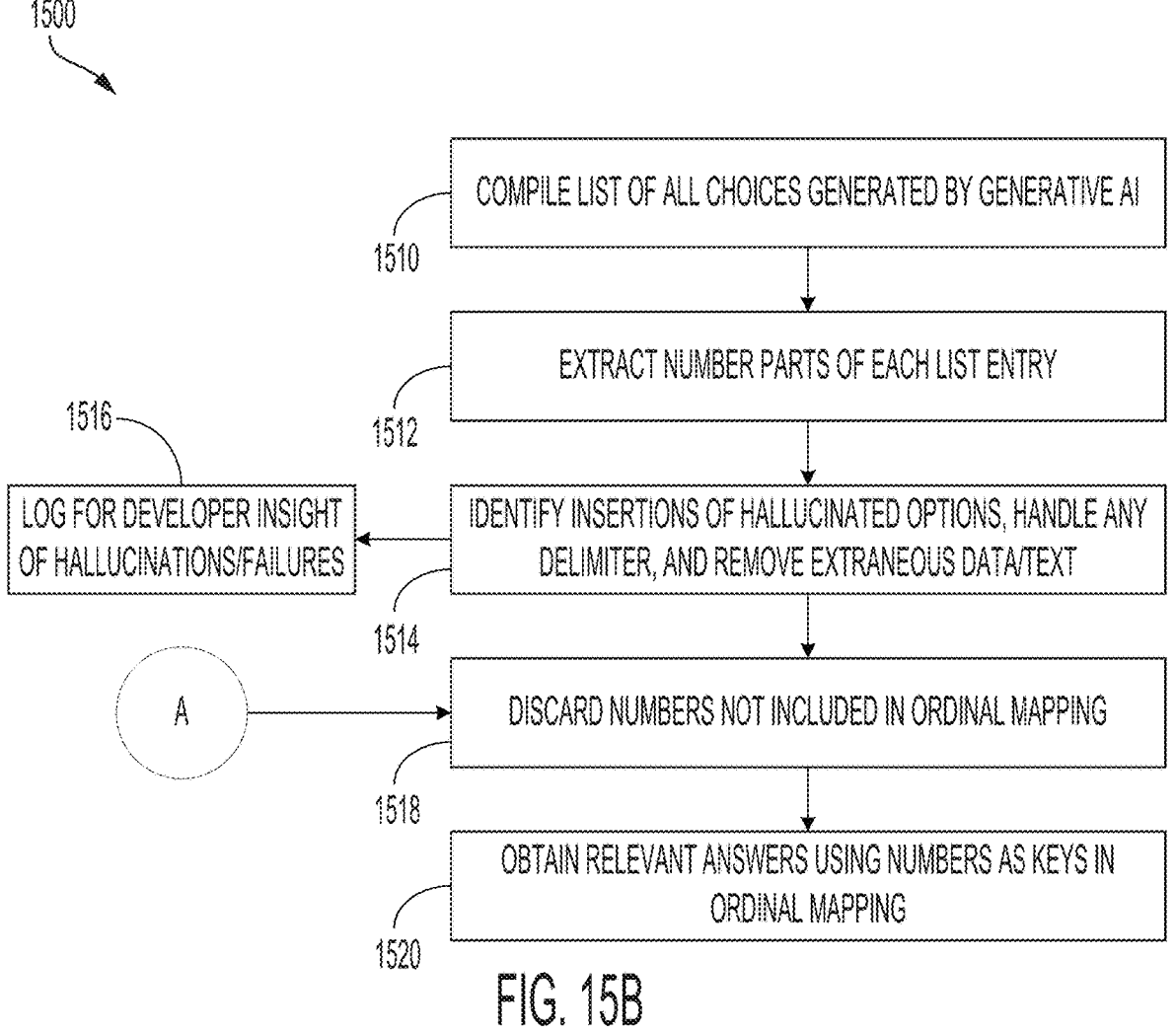
Figure 16A:
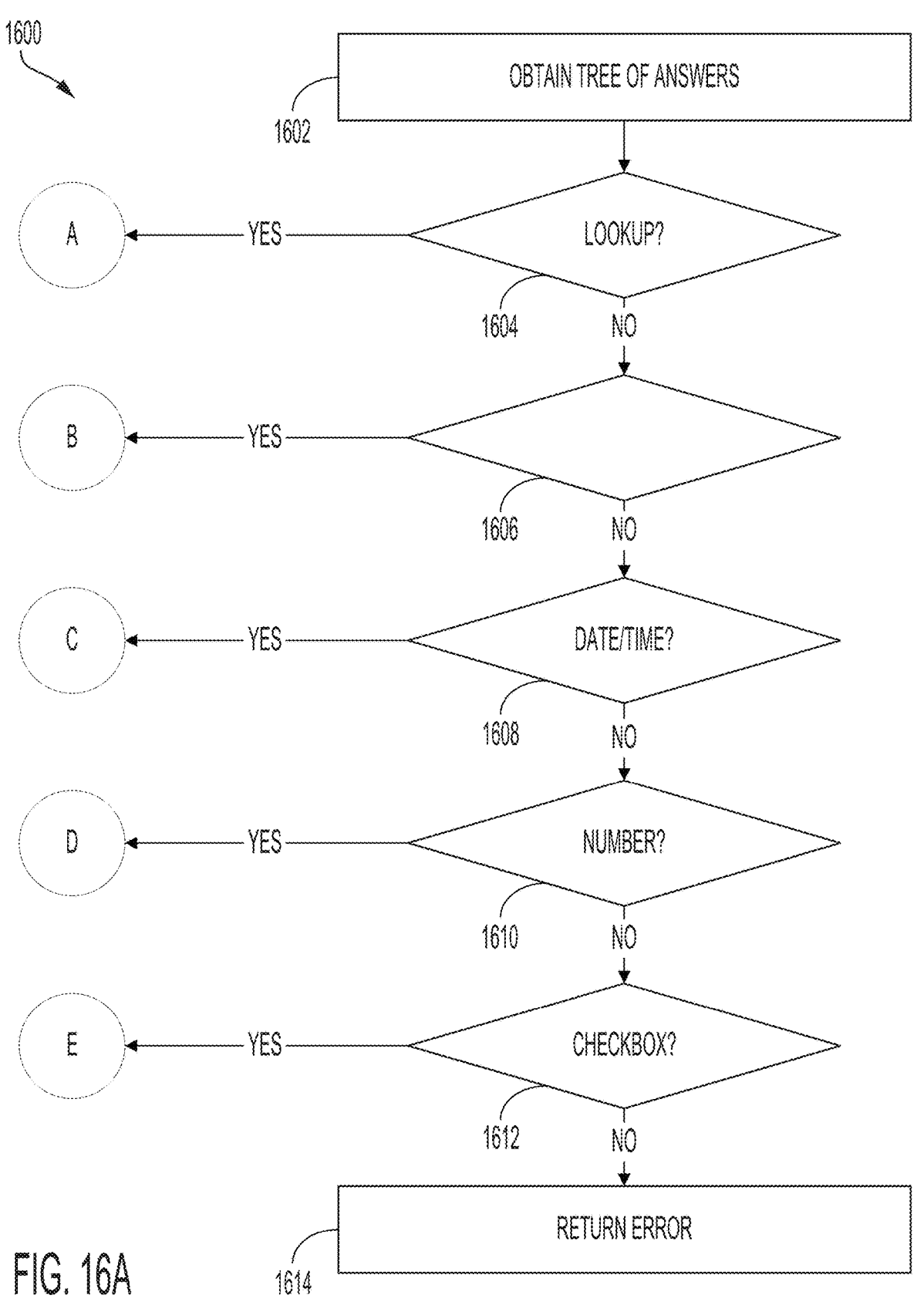
FIGS. 16A-16F show an illustrative example of a process for using NLP to perform user input processing without transmitting requests to different generative artificial intelligence systems in accordance with at least one embodiment.
Figure 16B:
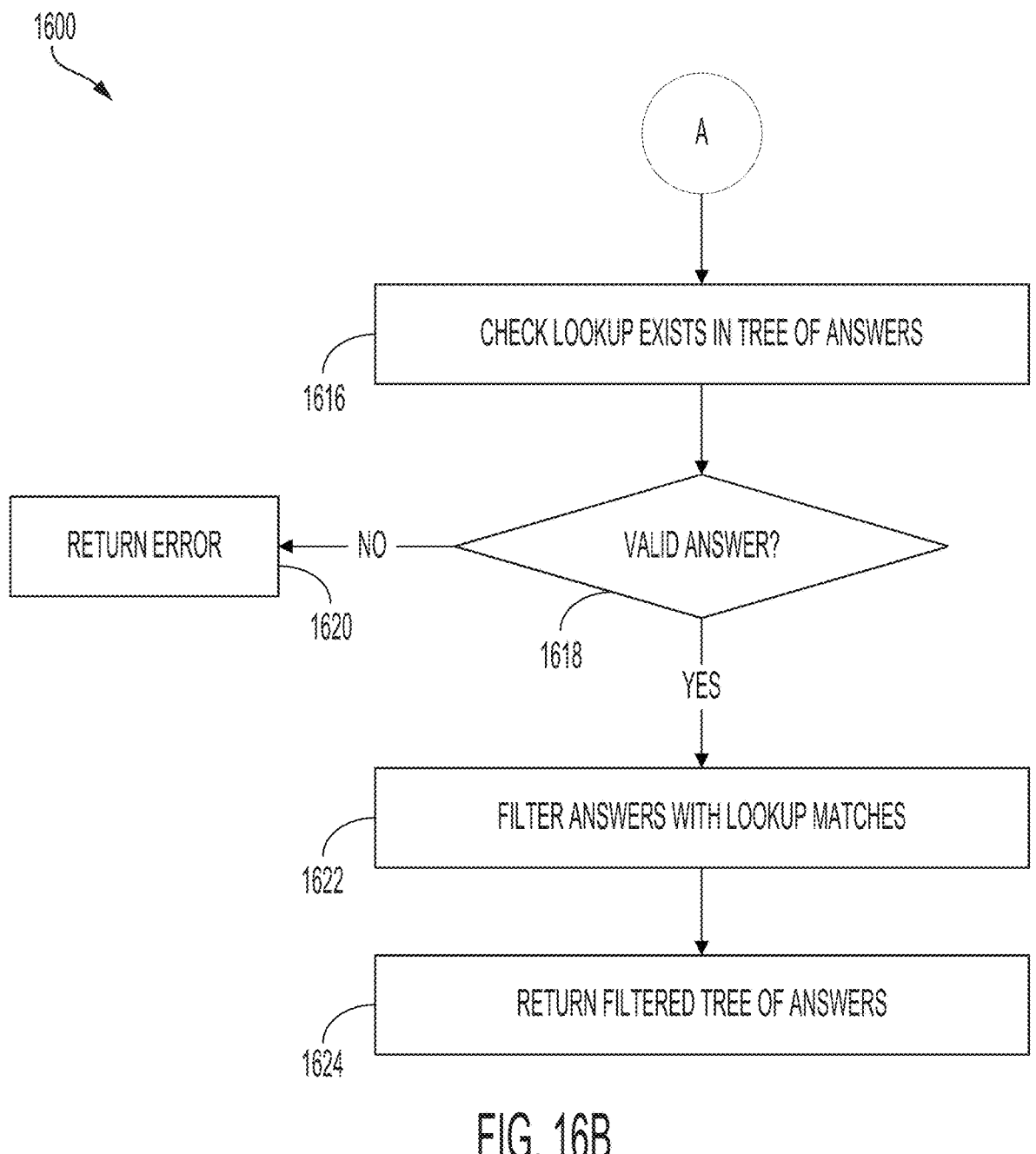
Figure 16C:
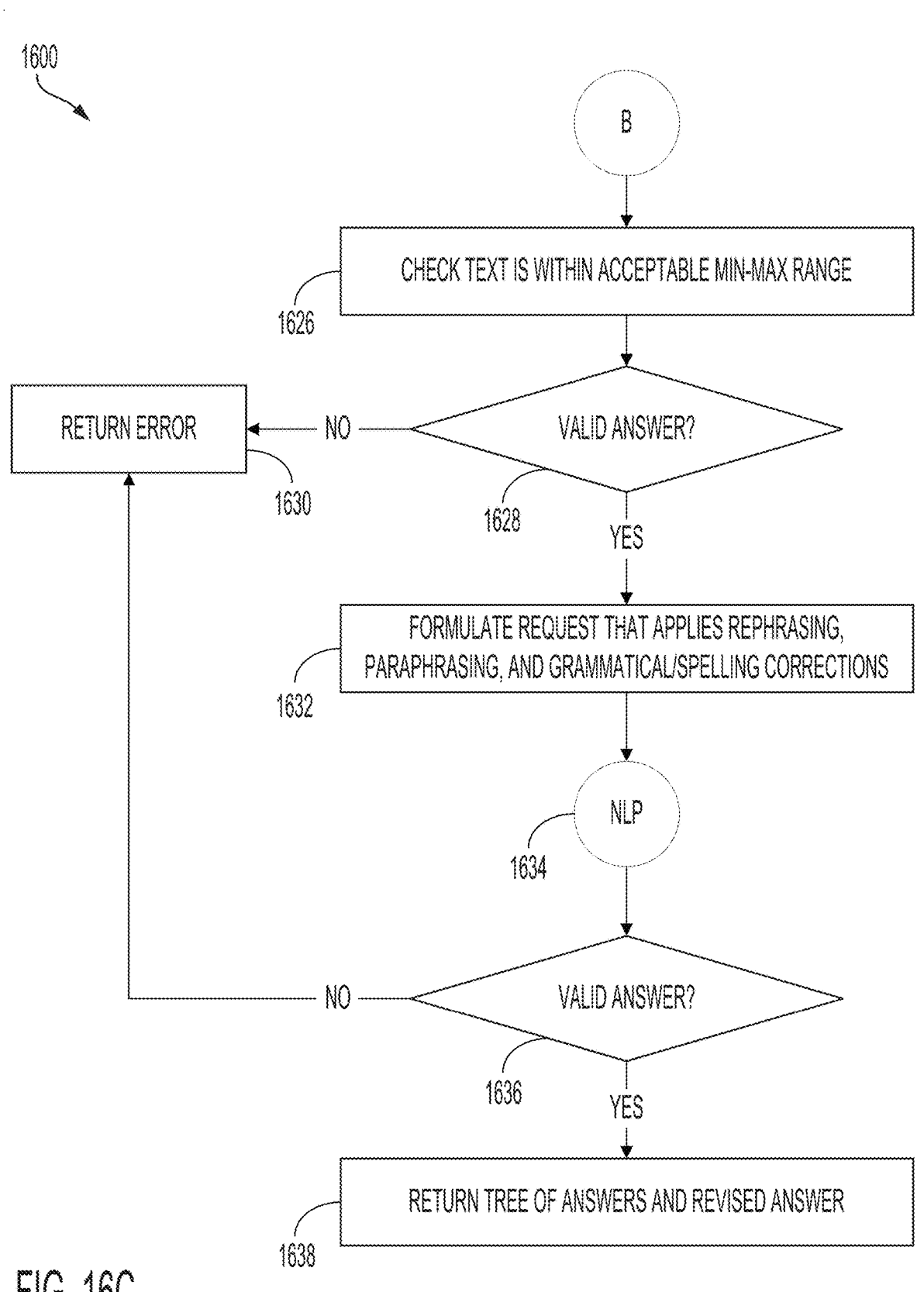
Figure 16D:
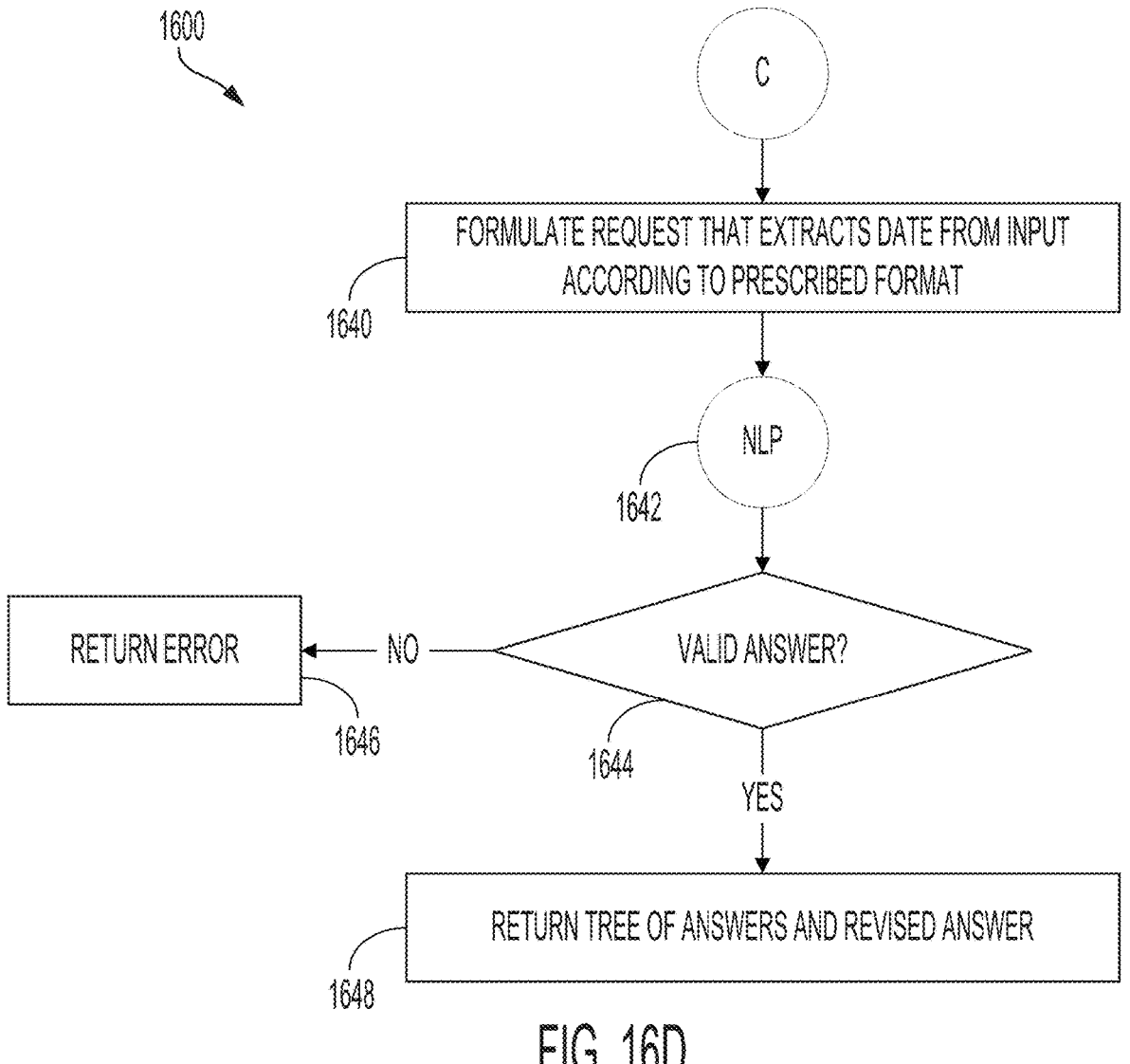
Figure 16E:
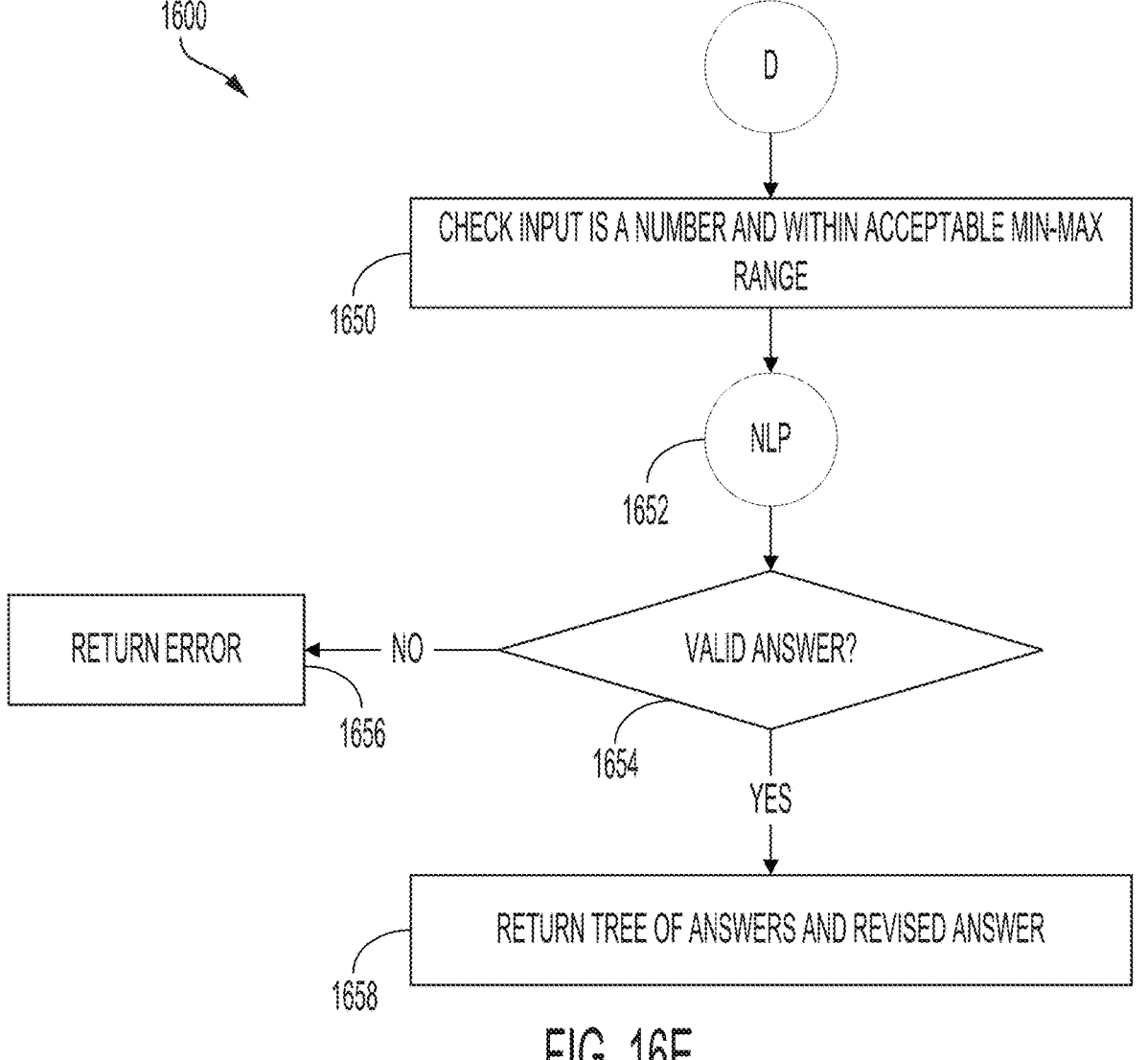
Figure 16F:
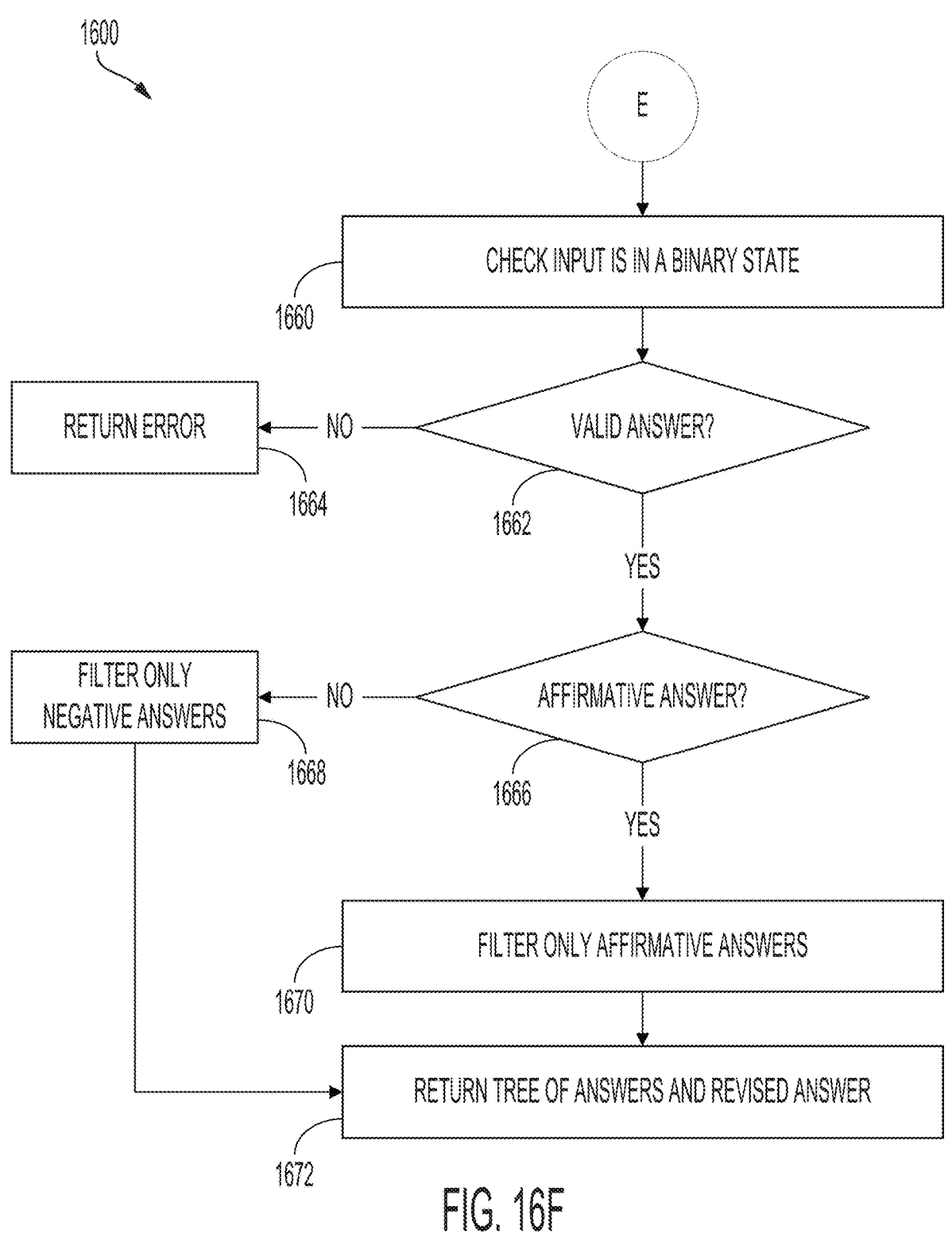

FIGS. 15A-15B show an illustrative example of a process 1500 for reducing generative artificial intelligence hallucinations through ordinal mapping of different answers in accordance with at least one embodiment. This ordinal mapping, as described in greater detail herein, reduces generative artificial intelligence hallucinations and costs in generative artificial intelligence recommendations, preventing collisions and ensuring valid responses. At step 1502, the domain-specific interview simulation system may obtain a set of answers defining codified meanings behind the answer to the question. Choices of answers may later modify the profiles (including semantic conditions) and/or the flow of the interview. Ideally, each answer has relevance, authority, analysis, and emotive impact.

At step 1504, the domain-specific interview simulation system may extract all numbers from the text and store these in the "colliding numbers" set. Further, at step 1506, the domain-specific interview simulation system may generate a 1:1 ordinal mapping for the answers. Once this mapping has been completed, the domain-specific interview simulation system, at step 1508, may formulate and return a generative artificial intelligence prompt. This prompt may request a generative artificial intelligence system to make a suggestion of the best options to select from the ordinal mapping and only return an array of numbers that are keys for the ordinal mapping. For instance, given a list of answers, each with a codified meaning, the domain-specific interview simulation system may generate a list of suggestions to cover all relevant meanings. This generated list can be assigned to an ordinal list that skips any numbers already used in the generated list to prevent collisions.

As an illustrative example of ordinal numbering with sequence skipping, the domain-specific interview simulation system may obtain the following text from a list of answers: ["Taking elevator up", "Taking elevator down", "Taking elevator down 1 floor", "Taking elevator down less than 5 floors"]. The domain-specific interview simulation system may extract the values "1" and "5" from the text as they are indicated in the list of possible answers and store these values as colliding numbers. Once complete, the domain-specific interview simulation system may generate an ordinal list for the generated suggestions: "2. Taking elevator up\n3. Taking elevator down\n4. Taking elevator down 1 floor\n6. Taking elevator down less than five floors." Note that the ordinal list does not include the values "1" and "5" as these values were indicated as colliding numbers.

For an answer list that includes the following answer identifiers:
    33350=Taking elevator up
    33351=Taking elevator down
    33352=Taking elevator down 1 floor
    33353=Taking elevator down less than 5 floors
the domain-specific interview simulation system may generate the following ordinal to answer identifier mapping:
    (2→33350)
    (3→33351)
    (4→33352)
    (6→33353)
At step 1510, the domain-specific interview simulation system may compile a list of all choices generated by the one or more generative artificial intelligence platforms. At step 1512, the domain-specific interview simulation system may extract the number parts of each entry within the list of all choices and, at step 1514, identify any insertions of hallucinated options, handling any delimiter, and removing any extraneous data/text. At step 1516, the domain-specific interview simulation system may identify and log any hallucinated options for developer insight into any hallucinations and failures of the generative artificial intelligence.

At step 1518, the domain-specific interview simulation system may evaluate the ordinal mapping to discard all numbers that are not included in the ordinal mapping, including any fallback/no-match values. Further, the domain-specific interview simulation system may remove any duplicate numbers to make the relevant answers distinct. At step 1520, the domain-specific interview simulation system may obtain the relevant answers by using the numbers as keys in the ordinal mapping.

As an illustrative example of the process 1500 for a single execution (i.e., n=1), suppose an ordinal mapping is generated for the following answers:
    15001=Visit 1 family member
    20032=Pleasure
    80033=Business
    80034=Pleasure
    (15001→2)
    (20032, 80034→18)
    (80033→55)
The prompt that is sent to the generative artificial intelligence platform may specify " . . . \n2. Visit family\n . . . \n18. Pleasure\n . . . \n55. Business\n . . . ". For the user input, "I am going with my brother to Yellowstone Park after helping at our family restaurant" and the provided prompt, the generative artificial intelligence platform may return the following response:

[2, 18, −123456789918934 because I am hallucinating\n
    [55] and 18: I would include as well\nextraneous text]
The domain-specific interview simulation system may
extract the following values:
    [2, 18, 123456789918934, 55, 18]
The domain-specific interview simulation system may dis-
card all invalid values and make the resulting answer list
distinct:
    [2, 18, 55]
The domain-specific interview simulation system may
perform an un-mapping of this answer list by translating "2"
as "15001"; "18" as "20032" and "80034"; and "55" as
"80033", resulting in the new answer list:
    [15001, 20032, 80033, 80034]
The domain-specific interview simulation system may keep
both values "20032" and "80034" although these both
represent the text "Pleasure" as the underlying meanings
may be mutually exclusive. For example, "20032" may be
conditional on sight-seeing, while "80034" may be for
visiting family members.

FIGS. 16A-16F show an illustrative example of a process
1600 for using NLP to perform user input processing with-
out transmitting requests to different generative artificial
intelligence systems in accordance with at least one embodi-
ment. NLP may be implemented to process various types of
user inputs without sending requests to complex generative
artificial intelligence systems. At step 1602, the domain-
specific interview simulation system may obtain a tree of
answers and determine the type of answer expected by the
question.

At step 1604, the domain-specific interview simulation
system may determine whether the user input corresponds to
a lookup answer, such as an answer provided through an
autocompletion operation, selection of an option, selection
of an answer through a dropdown menu, and the like. If the
domain-specific interview simulation system determines
that the user input corresponds to a lookup answer, the
domain-specific interview simulation system may follow
path "A" to step 1616 (illustrated in FIG. 16B) to check
whether the lookup answer selected by the user exists in the
obtained tree of answers. For instance, the domain-specific
interview simulation system may match the raw text to an
exact value in a lookup object, performing fuzzy matching
using Levenshtein distance if an exact match is found.

Accordingly, the domain-specific interview simulation
system, at step 1618, may determine whether the user has
selected a valid answer. If the selected answer does not
correspond to a valid answer maintained in the tree of
answers, the domain-specific interview simulation system,
at step 1620, may return an error. If the selected answer does
correspond to a valid answer in the tree of answers, the
domain-specific interview simulation system, at step 1622,
may filter the tree of answers with the valid answer and, at
step 1624, return the filtered tree of answers.

Returning to FIG. 16A, if the domain-specific interview
simulation system determines that the user input does not
correspond to a lookup answer, the domain-specific inter-
view simulation system, at step 1606, may determine
whether the user input corresponds to a text-based answer.
If the user input corresponds to a text-based answer, the
domain-specific interview simulation system may follow
path "B" to step 1626 (illustrated in FIG. 16C) to check
whether the text is within an acceptable min-max range to
determine, at step 1628, whether the answer provided is
valid. If the domain-specific interview simulation system
determines that the provided answer is not valid, the
domain-specific interview simulation system, at step 1630, may return an error. If the answer is determined to be valid,
the domain-specific interview simulation system, at step
1632, may formulate a request that applies rephrasing,
paraphrasing, and grammatical spelling corrections.

At step 1634, the domain-specific interview simulation
system may process the request through NLP and evaluate
the output of the NLP to determine, at step 1636, whether the
NLP has produced a valid answer. If the NLP does not
produce a valid answer, the domain-specific interview simu-
lation system, at step 1630, may return an error. Otherwise,
if the NLP produces a valid answer, the domain-specific
interview simulation system, at step 1638 may return the tree
of answers and the revised answer. As an illustrative
example, for the user input "I am going to the store," the
domain-specific interview simulation system, through NLP,
may shorten the answer to "go to store."

Returning to FIG. 16A, if the domain-specific interview
simulation system determines that the user input is not a
text-based answer, the domain-specific interview simulation
system, at step 1608, whether the user input is a date/time
answer. For example, if a user responds to a question with
"On the 2$^{nd}$ of February in 2014," the domain-specific
interview simulation system may determine that the user
response is a date/time answer. If the domain-specific inter-
view simulation system determines that the user input cor-
responds to a date/time answer, the domain-specific inter-
view simulation system may follow the "C" path to step
1640 (illustrated in FIG. 16D) to formulate a request that
extracts the date/time from the input according to a pre-
scribed format. For example, the domain-specific interview
simulation system may define a YYYYMMDD date format
whereby a date is represented by the four digits correspond-
ing to the year, followed by the two digits corresponding to
the month of the year, and followed by the two digits
corresponding to the day of the month.

At step 1642, the domain-specific interview simulation
system may process the request through NLP and evaluate
the output of the NLP to determine, at step 1644, whether the
NLP has produced a valid answer. If the NLP does not
produce a valid answer, the domain-specific interview simu-
lation system, at step 1646, may return an error. Otherwise,
if the NLP produces a valid answer, the domain-specific
interview simulation system, at step 1648 may return the tree
of answers and the revised answer. As an illustrative
example, for the user input "On the 2$^{nd}$ of February in 2014,"
the domain-specific interview simulation system, through
NLP and according to the YYYYMMDD date format, may
produce the revised answer to "20140202."

Returning to FIG. 16A, if the domain-specific interview
simulation system determines that the user input is not a
date/time answer, the domain-specific interview simulation
system, at step 1610, whether the user input is a numerical
answer. If the domain-specific interview simulation system
determines that the user input corresponds to a numerical
answer, the domain-specific interview simulation system
may follow the "D" path to step 1650 (illustrated in FIG.
16E) to verify that the user is a number that is within an
acceptable min-max range. For instance, the domain-spe-
cific interview simulation system may process the user input
through NLP at step 1652 to determine, at step 1654,
whether the user input corresponds to a valid answer. If the
NLP does not produce a valid answer, the domain-specific
interview simulation system, at step 1656, may return an
error. Otherwise, if the NLP produces a valid answer, the
domain-specific interview simulation system, at step 1658
may return the tree of answers and the revised answer.

Below are examples of the processing of user inputs classified as being numerical answers through the aforementioned process:

User Input="I don't know"→Error

User Input="12 or 16"→Error

User Input="Eleven"→Answer: 11

User Input="I think 18"→Answer: 18

Returning to FIG. 16A, if the domain-specific interview simulation system determines that the user input is not a numerical answer, the domain-specific interview simulation system, at step 1612, may determine whether the user input corresponds to a checkbox answer provided by the user, such as through the simulation interface or through a submitted document as part of the interview simulation. If the domain-specific interview simulation system determines that the user input corresponds to a checkbox answer, the domain-specific interview simulation system may follow the "E" path to step 1660 (illustrated in FIG. 16F) to check if the user input is in a binary state (e.g., "Yes/No", "True/False", "1/0", etc.) to determine, at step 1662, whether the answer provided is valid. If the domain-specific interview simulation system determines that the provided answer is not valid, the domain-specific interview simulation system, at step 1664, may return an error. If the answer is determined to be valid, the domain-specific interview simulation system, at step 1666, may determine whether the provided answer is an affirmative answer. If the provided answer is not an affirmative answer, the domain-specific interview simulation system, at step 1668, may filter only the negative answers corresponding to the checkbox answer provided by the user. Alternatively, if the provided answer is an affirmative answer, the domain-specific interview simulation system, at step 1670, may filter only the affirmative answers corresponding to the checkbox answer provided by the user. In either case, the domain-specific interview simulation system, at step 1672, may return the tree of answers and the revised answer for processing. Returning to FIG. 16A, if the provided user input does not correspond to any of the answer formats described above, the domain-specific interview simulation system, at step 1614, may return an error.

Figure 17:
FIG. 17 shows an illustrative example of a navigation menu associated with a system editor in accordance with at least one embodiment.

FIG. 17 shows an illustrative example of a navigation menu view 1700 associated with a system editor in accordance with at least one embodiment. The navigation menu of the system editor may provide a user with various user interface elements corresponding to different options for navigating the various functionalities of the system editor. These may include a search answer badge expander, a search panel button, an element centering button, a previous item button, a next item button, a maps navigation button, a group navigation enable button, a question navigation enable button, an answer navigation enable button, a variables section button, a conditions section button, a tables section button, a batch testing section button, an abbreviations section button, a hamburger menu icon for expanding a submenu containing system settings, a delete buttons toggle, a fast delete toggle, a NightMode toggle, a show group weight toggle, and a show batch test weight toggle.

Figure 18:
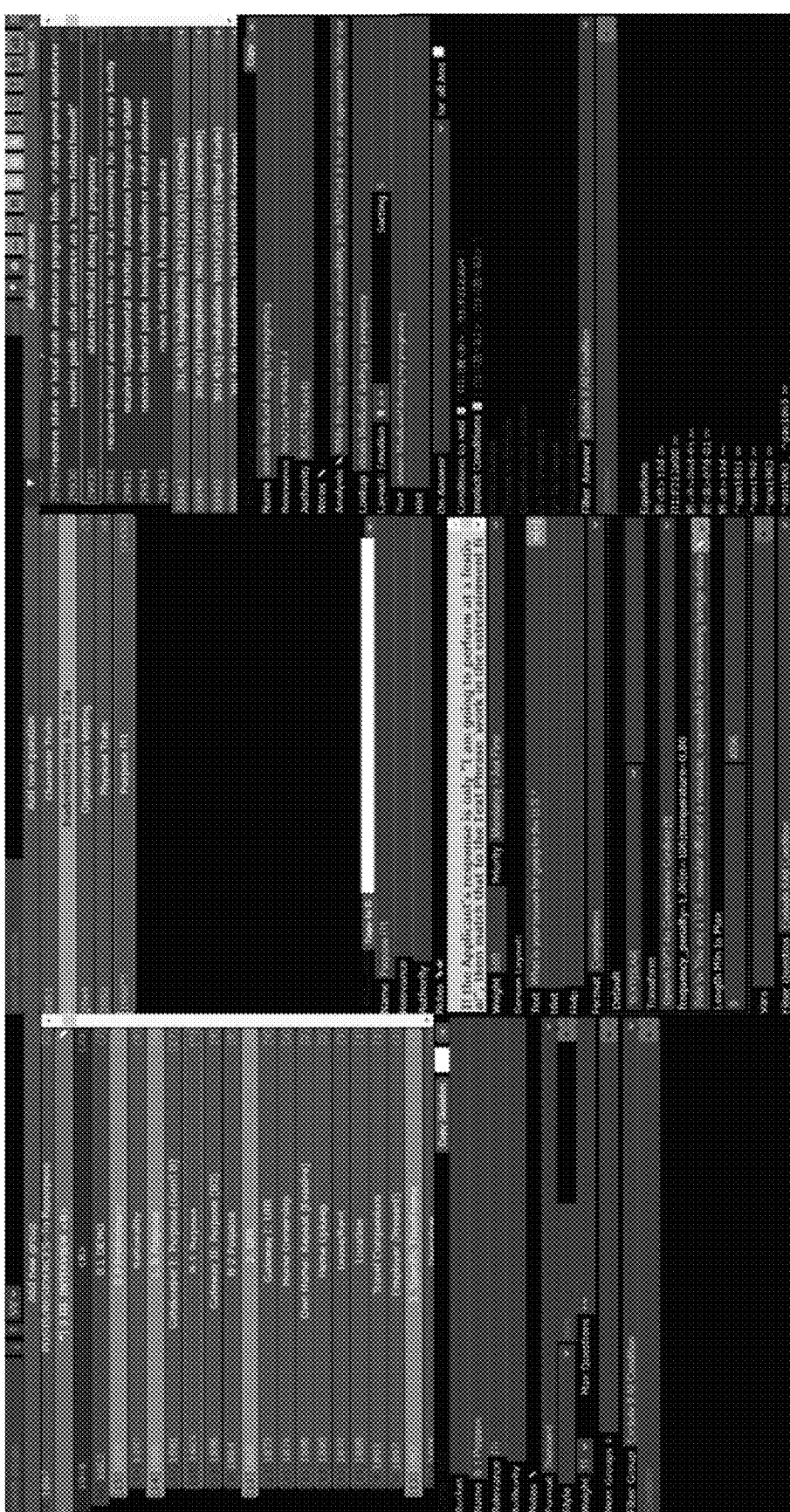
FIG. 18 shows an illustrative example of a main screen view of a system editor in accordance with at least one embodiment.

FIG. 18 shows an illustrative example of a main screen view 1800 of a system editor in accordance with at least one embodiment. As illustrated in FIG. 18, the main screen view 1800 may be divided into three distinct columns: Group, Question, and Answer. Through the various graphical user elements associated with these columns, a user may edit the different interview simulation groups, questions, and answers that may determine the interview simulation flow. Thus, the main screen view 1800 may provide the primary interface for viewing the various controls and other graphical user elements for accessing and edits the different interview simulation groups, questions, and answers.

Figure 19:
FIG. 19 shows an illustrative example of a map view window associated with a system editor in accordance with at least one embodiment.

FIG. 19 shows an illustrative example of a map view window 1900 associated with a system editor in accordance with at least one embodiment. Through the map view window 1900, a user of the system editor may access a group view displaying a group, question, or answer along with its corresponding crosslinks or interactions with related items. This may allow the user to evaluate these crosslinks/interactions to identify different relationships amongst these related items and the group, question, or answer being analyzed. The group view may include a navigable map of the groups, questions, and answers that allow the user to zoom in and out to evaluate different crosslinks or interactions. Hovering over any of the elements presented through the group view may cause the system editor to display relevant information corresponding to the elements.

Figure 20:
FIG. 20 shows an illustrative example of an answer view window associated with a system editor in accordance with at least one embodiment.

FIG. 20 shows an illustrative example of an answer view window 2000 associated with a system editor in accordance with at least one embodiment. Through the answer view window 2000, a system editor may allow the user to evaluate an expanded view during answer editing. This may enable the user to access a larger and clearer visualization of the data associated with the selected answers.

Figure 21:
FIG. 21 shows an illustrative example of a variable view window associated with a system editor in accordance with at least one embodiment.

FIG. 21 shows an illustrative example of a variable view window 2100 associated with a system editor in accordance with at least one embodiment. The system editor, through the variable view window 2100, may enable the user to modify the name, description, and visual grouping of global variables. Further, through the variable view window 2100, a user of the system editor may associate different operations (e.g., triggering different transforms and operations on user inputs as described above in connection with FIGS. 8A-8B, triggering variable and table lookup operations as described above in connection with FIG. 11, etc.) with these variables and view any crosslinks to items throughout the data. Variables, as illustrated in FIG. 21, may be defined through different characters, such alphanumeric characters, logographic characters (e.g., kanji, etc.), syllabary characters (e.g., hiragana, katakana, etc.), and/or the like. Through the use of different character systems, the system editor may provide a greater number of possibilities for defining different variables that may be applicable for different interview simulations.

Figure 22:
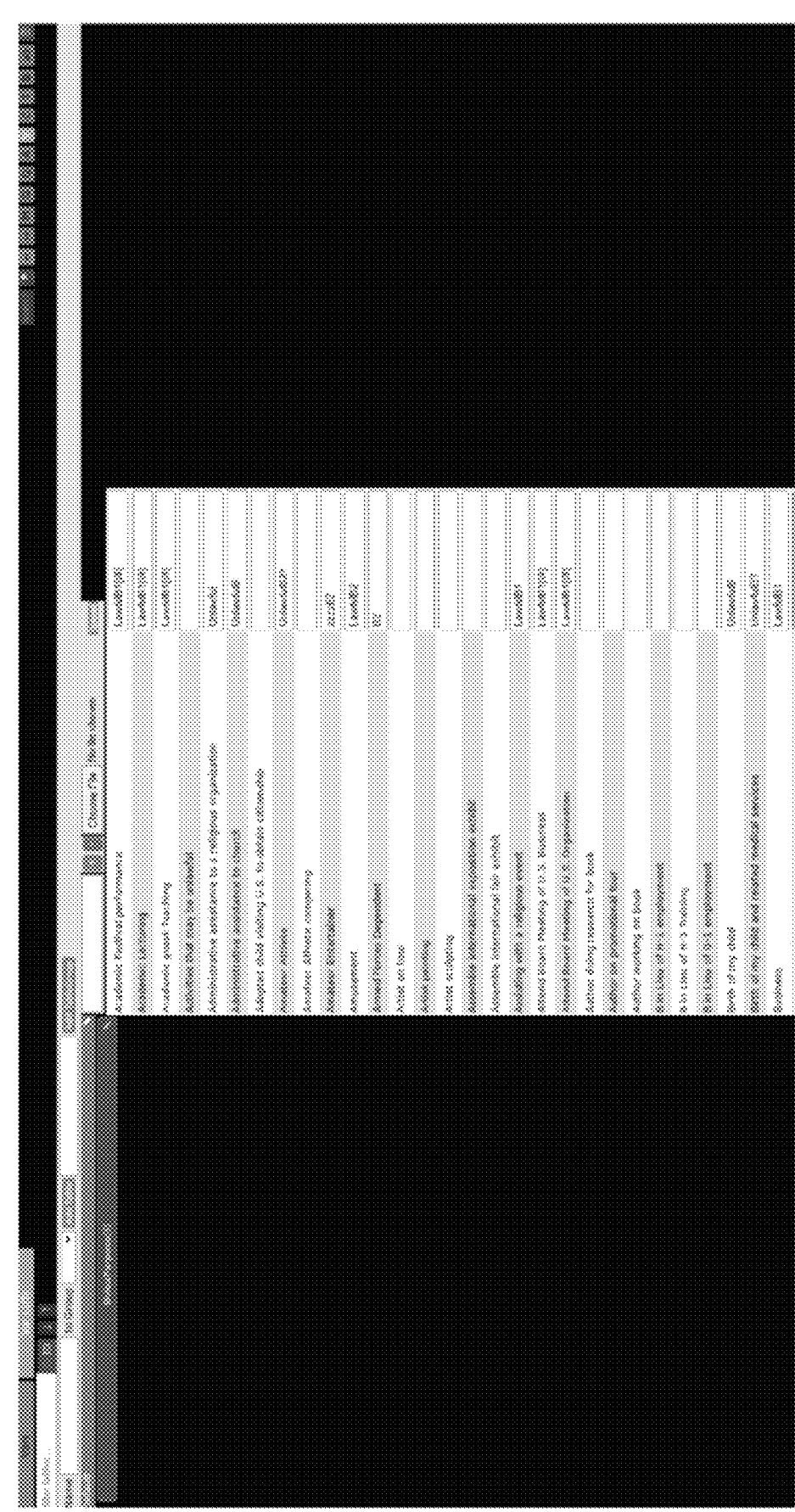
FIG. 22 shows an illustrative example of a variable lookup tables view window associated with a system editor in accordance with at least one embodiment.

FIG. 22 shows an illustrative example of a variable lookup tables view window 2200 associated with a system editor in accordance with at least one embodiment. Through the variable lookup tables view window 2200, a user of the system editor may define data for different table lookup operations that may be performed as part of the truth-conditional semantics process described above in connection with FIG. 11.

Figure 23B:
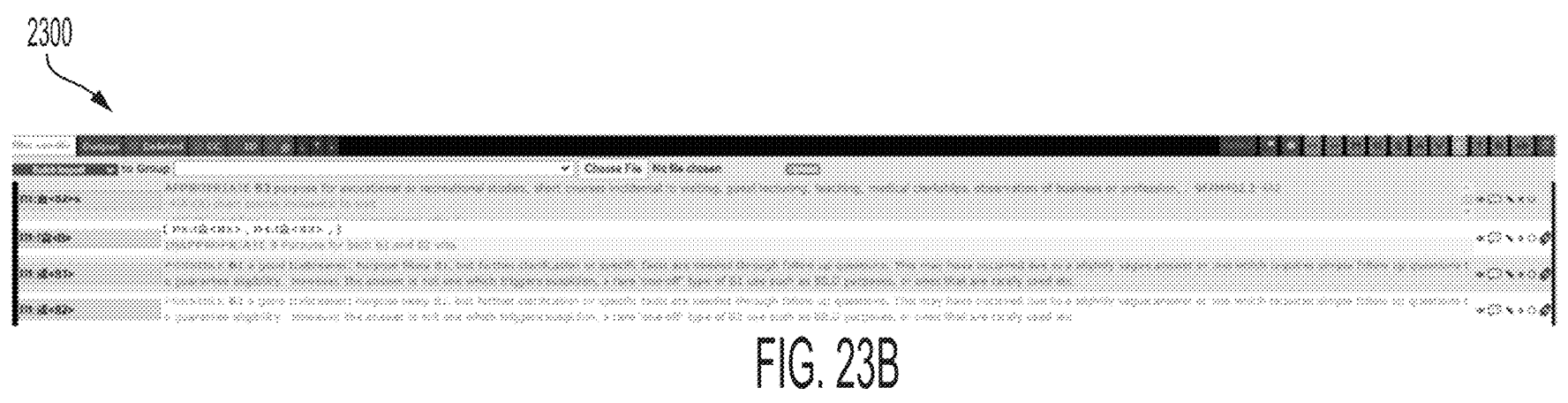

FIGS. 23A-23B show an illustrative example of conditions view windows 2300 associated with a system editor in accordance with at least one embodiment. Through the conditions view windows 2300, the system editor may allow a user to edit the name, description, and visual grouping for different conditions. Further, through the conditions view windows 2300, a user may associate analyses, equations, and operations with different conditions. The system editor, through the conditions view windows 2300, may further allow the user to view any condition crosslinks to items throughout the data.

Figure 24:
FIG. 24 shows an illustrative example of a matrices table view window associated with a system editor in accordance with at least one embodiment.

FIG. 24 shows an illustrative example of a matrices table view window 2400 associated with a system editor in accordance with at least one embodiment. Through the matrices table view window 2400, a user of the system editor may manage the tabular data matrices that may be used to obtain data for performing the truth-conditional semantics process described above in connection with FIG. 11. The system editor, through the matrices table view window 2400, may provide the user with various options for controlling the amount of data that may be displayed in a grid. In an embodiment, the system editor allows a user to manually define different tabular data matrices that may be leveraged as part of the truth-conditional semantics process. Additionally, in an embodiment, the system editor allows the user to link the system editor to one or more data sources to allow the system editor to automatically retrieve data that may be used to define these different tabular data matrices, such as through different application programming interfaces (APIs) and the like. As the system editor retrieves this data, the system editor may automatically generate new tabular data matrices and/or update existing tabular data matrices that may be used for the truth-conditional semantics process.

Figure 25:
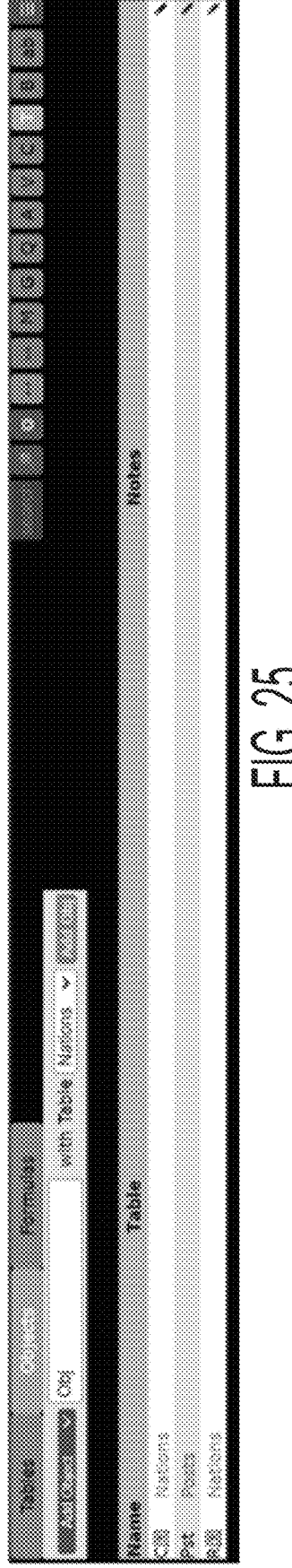
FIG. 25 shows an illustrative example of a matrices object view window associated with a system editor in accordance with at least one embodiment.

FIG. 25 shows an illustrative example of a matrices object view window 2500 associated with a system editor in accordance with at least one embodiment. Through the matrices object view window 2500, the system editor may allow the user to manage different data objects, which may serve as entry points to different table instantiations.

Figure 26:
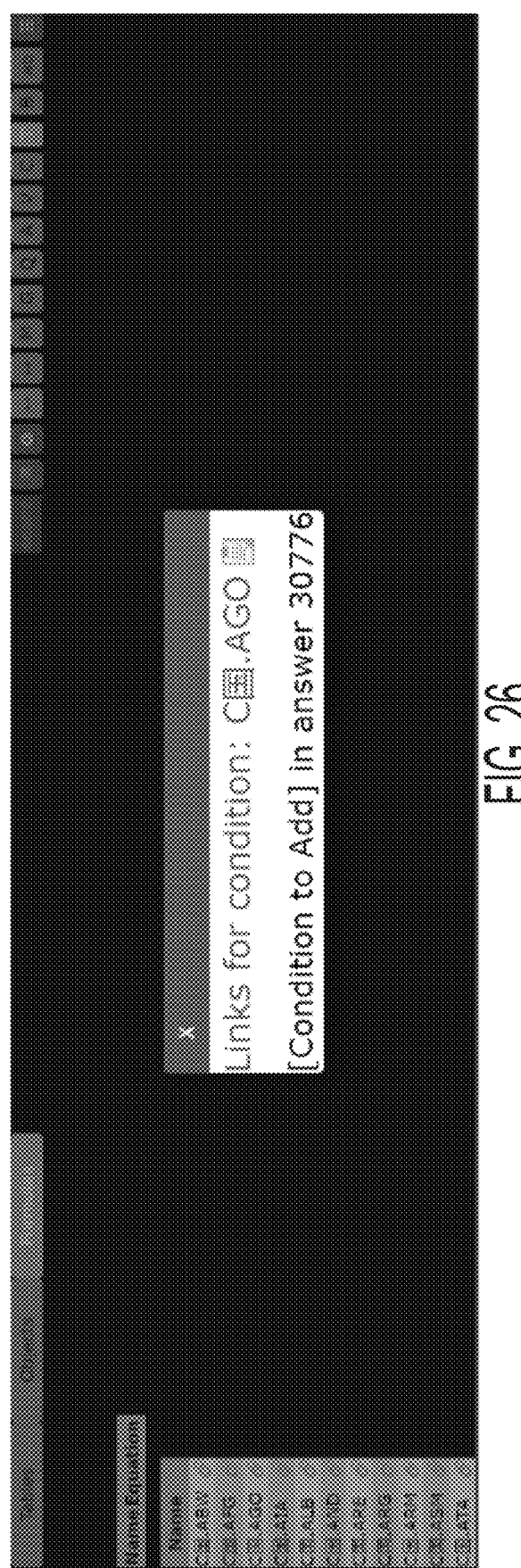
FIG. 26 shows an illustrative example of a matrices formula view window associated with a system editor in accordance with at least one embodiment.

FIG. 26 shows an illustrative example of a matrices formula view window 2600 associated with a system editor in accordance with at least one embodiment. Through the matrices formula view window 2600, the system editor may present the user with system-controlled conditions generated for use in different, applicable formulas.

Figure 27:
FIG. 27 shows an illustrative example of a batch prompts view window associated with a system editor in accordance with at least one embodiment.

FIG. 27 shows an illustrative example of a batch prompts view window 2700 associated with a system editor in accordance with at least one embodiment. Through the batch prompts view window 2700, the system editor may allow the user to review the results of different batch tests performed on individual questions. As noted above, the system editor incorporates a prompt batch tester that is configured to execute thousands of tests against any given prompt and assess its ability to extract meaningful results. These results are reviewed through the batch prompts view window 2700 to select an optimal prompt.

Figure 28:
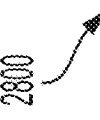
FIG. 28 shows an illustrative example of an abbreviations view window associated with a system editor in accordance with at least one embodiment.

FIG. 28 shows an illustrative example of an abbreviations view window 2800 associated with a system editor in accordance with at least one embodiment. The system editor, through the abbreviations view window 2800, allows users to record notes on abbreviations and subject-matter terms used by the domain-specific interview simulation system. These notes may be displayed through the abbreviations view window 2800 by hovering over any of the presented abbreviations.

Figure 29A:
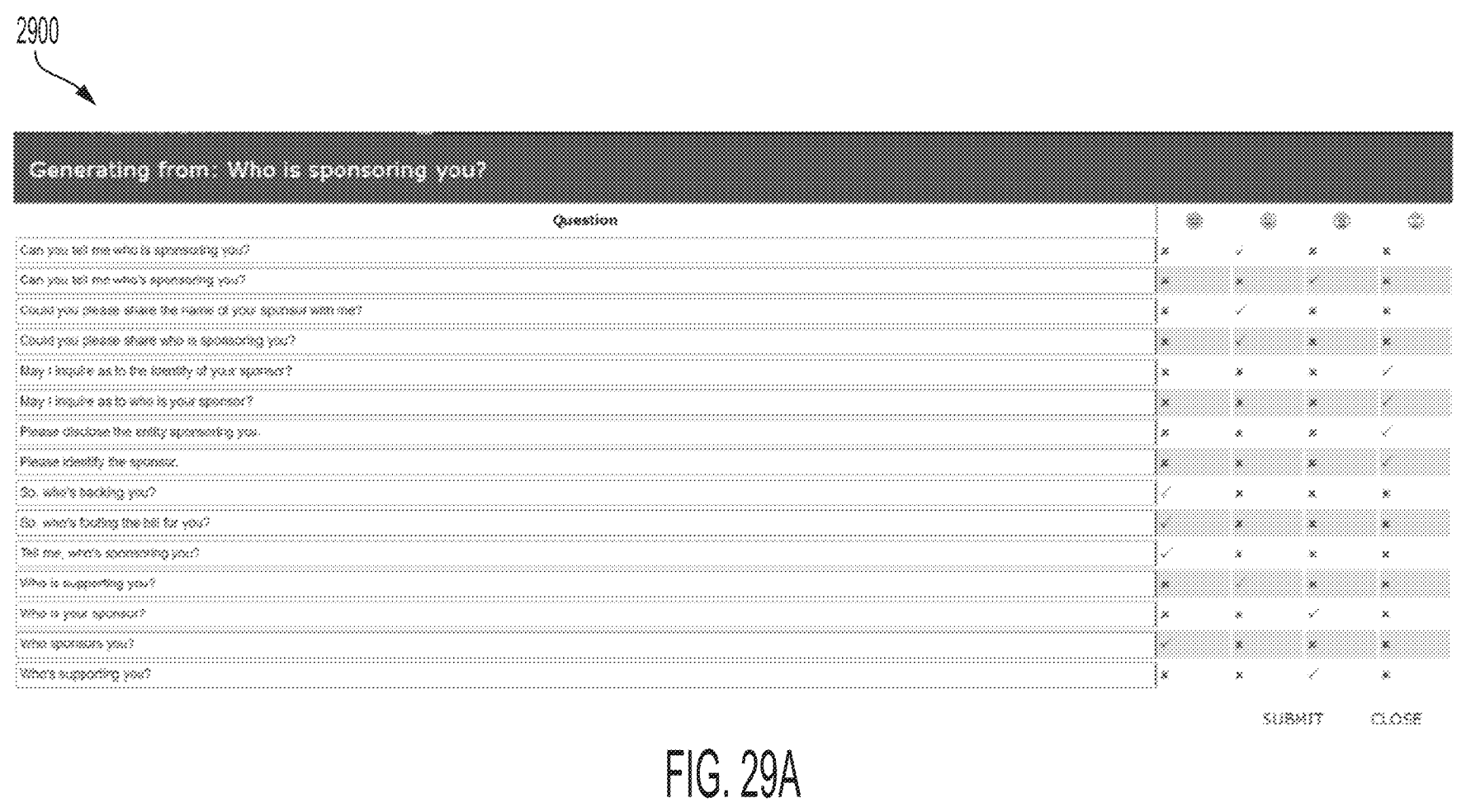
Figure 29B:
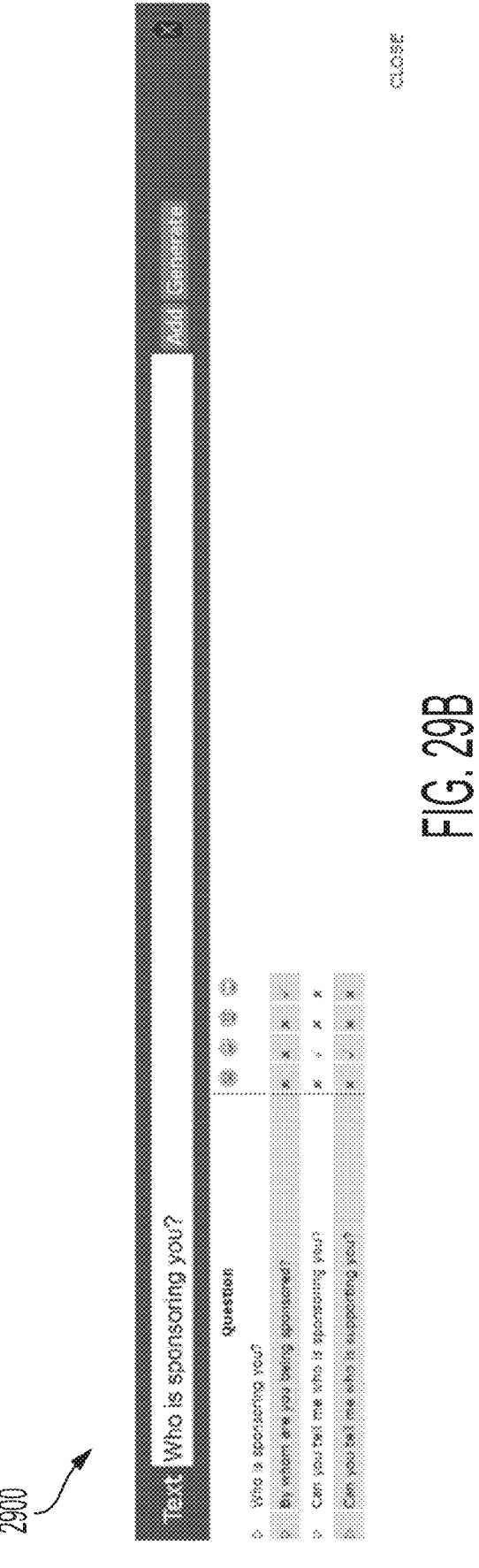

FIGS. 29A-29B show an illustrative example of tone editor view windows 2900 associated with a system editor in accordance with at least one embodiment. The system editor, through the tone editor view windows 2900, may provide a question generator for providing more natural questions, either generated dynamically or selected from a pre-compiled set during the interview simulation. Additionally, through the tone editor view windows 2900, the system editor may allow the user to define the different emotional states that may be presented by the avatar during interview simulations for a given question and according to the interview flow.

Figure 30:
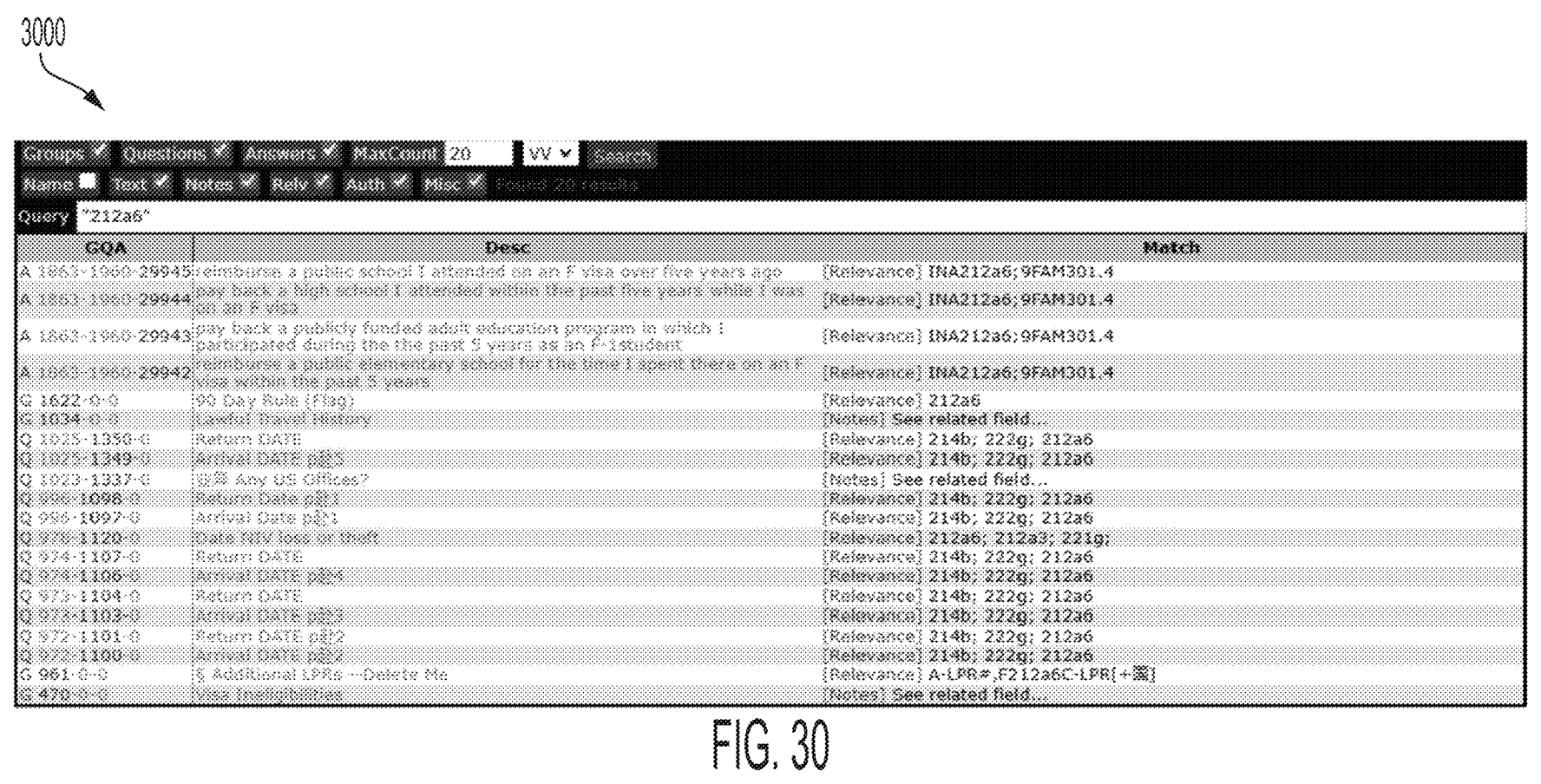

FIG. 30 shows an illustrative example of a search window 3000 associated with a system editor in accordance with at least one embodiment. The search window 3000 may allow a user of the system editor to locate groups, questions, and answers based on phrase matching.

Figure 31:
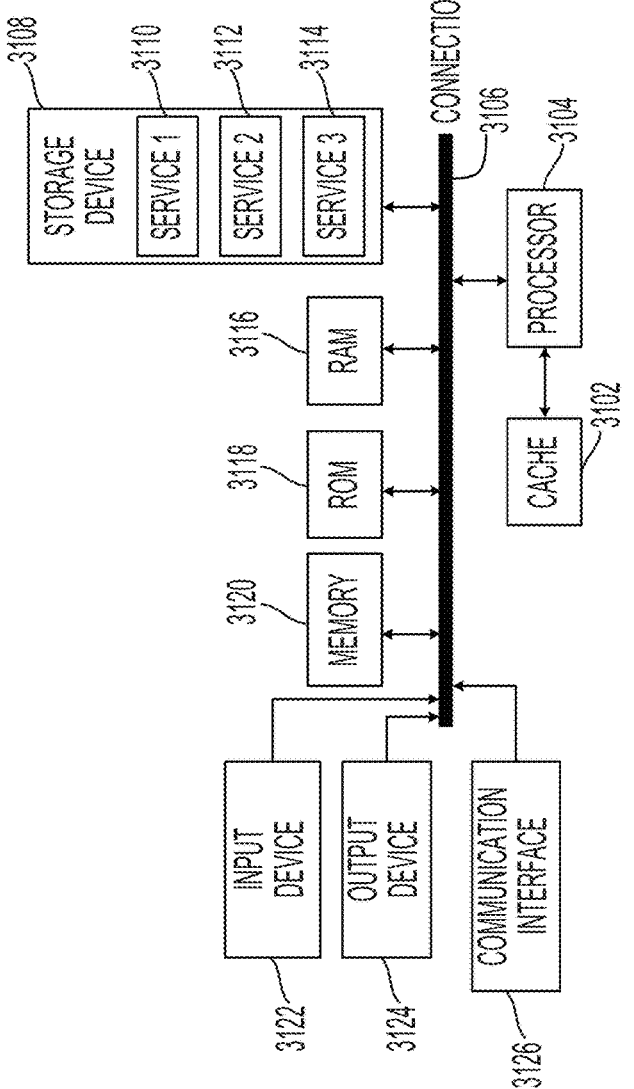
FIG. 31 shows an illustrative example of an environment in which various embodiments can be implemented.

FIG. 31 illustrates a computing system architecture 3100 including various components in electrical communication with each other using a connection 3106, such as a bus, in accordance with some implementations. Example system architecture 3100 includes a processing unit (CPU or processor) 3104 and a system connection 3106 that couples various system components including the system memory 3120, such as ROM 3118 and RAM 3116, to the processor 3104. The system architecture 3100 can include a cache 3102 of high-speed memory connected directly with, in close proximity to, or integrated as part of the processor 3104. The system architecture 3100 can copy data from the memory 3120 and/or the storage device 3108 to the cache 3102 for quick access by the processor 3104. In this way, the cache can provide a performance boost that avoids processor 3104 delays while waiting for data. These and other modules can control or be configured to control the processor 3104 to perform various actions.

Other system memory 3120 may be available for use as well. The memory 3120 can include multiple different types of memory with different performance characteristics. The processor 3104 can include any general purpose processor and a hardware or software service, such as service 1 3110, service 2 3112, and service 3 3114 stored in storage device 3108, configured to control the processor 3104 as well as a special-purpose processor where software instructions are incorporated into the actual processor design. The processor 3104 may be a completely self-contained computing system, containing multiple cores or processors, a bus, memory controller, cache, etc. A multi-core processor may be symmetric or asymmetric.

To enable user interaction with the computing system architecture 3100, an input device 3122 can represent any number of input mechanisms, such as a microphone for speech, a touch-sensitive screen for gesture or graphical input, keyboard, mouse, motion input, speech and so forth. An output device 3124 can also be one or more of a number of output mechanisms known to those of skill in the art. In some instances, multimodal systems can enable a user to provide multiple types of input to communicate with the computing system architecture 3100. The communications interface 3126 can generally govern and manage the user input and system output. There is no restriction on operating on any particular hardware arrangement and therefore the basic features here may easily be substituted for improved hardware or firmware arrangements as they are developed.

Storage device 3108 is a non-volatile memory and can be a hard disk or other types of computer readable media which can store data that are accessible by a computer, such as magnetic cassettes, flash memory cards, solid state memory devices, digital versatile disks, cartridges, RAMs 3116, ROM 3118, and hybrids thereof.

The storage device 3108 can include services 3110, 3112, 3114 for controlling the processor 3104. Other hardware or software modules are contemplated. The storage device 3108 can be connected to the system connection 3106. In one aspect, a hardware module that performs a particular function can include the software component stored in a computer-readable medium in connection with the necessary hardware components, such as the processor 3104, connection 3106, output device 3124, and so forth, to carry out the function.

The disclosed methods can be performed using a computing system. An example computing system can include processor(s) (e.g., a central processing unit (CPU), a graphics processing unit (GPU), a tensor processing unit (TPU), etc.), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

The disclosed methods can be performed using a computing system. An example computing system can include a processor(s) (e.g., CPU, GPU, TPU, etc.), memory, non-volatile memory, and an interface device. The memory may store data and/or and one or more code sets, software, scripts, etc. The components of the computer system can be coupled together via a bus or through some other known or convenient device. A processor, such as a CPU, GPU, TPU, and the like may be configured to carry out all or part of methods described herein for example by executing code for example stored in memory. One or more of a user device or computer, a provider server or system, or a suspended database update system may include the components of the computing system or variations on such a system. In some embodiments, the disclosed methods can be performed using virtualized environments.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. TPU/GPU processors such as used in NVIDIA A100 Tensor Core GPU, or Google Cloud TPU v4 may also provide optimized parallel computation of NLP inferences. As a further example, quantum systems such as the D-Wave Advantage2 and its successors, may offer quantum annealing and superposition that may represent all possible word meanings and, pulling from surrounding context (e.g. speaker prior statements, domain knowledge, cultural usage patterns, etc.), probabilities at once rather than one by one. For example, the phrase "I'm just helping out" may have three main interpretations (i.e., work, volunteer service, or business discussions). A quantum system using entanglement could encode all three with their associated probabilities in parallel and resolve pragmatic ambiguity so that changes in interpretation of one phrase updates the probabilities for relates phrases instantly. This parallelism could make probabilistic semantic disambiguation much faster compared to traditional methods.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor. In some embodiments, the data may be encrypted.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor. In some embodiments, the software may be encrypted.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually affect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices.

The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

51

What is claimed is:

1. A computer-implemented method comprising:

detecting a request to initiate a domain-specific simulation performed through a communications session between a user and an automated agent;

identifying an initial prompt, wherein the initial prompt is identified from a pool of prompts according to an initial simulation flow, and wherein the pool of prompts and the initial simulation flow are determined based on a domain associated with the domain-specific simulation and a user profile corresponding to the user;

obtaining a user input in response to the automated agent presenting the initial prompt through the communications session;

performing a set of transforms on the user input to extract one or more input variables;

filtering a set of applicable responses to the initial prompt according to the one or more input variables, the user profile, and a set of applicable response conditions to generate a tree of applicable responses;

processing the one or more input variables and the tree of applicable responses through a set of generative artificial intelligence platforms to obtain a set of valid responses corresponding to the user input, wherein the set of valid responses is generated according to confidence scores associated with different responses included in the set of valid responses;

processing the set of valid responses to calculate a set of performance metrics corresponding to the domain-specific simulation, wherein the set of performance metrics is used to generate a new simulation flow and to identify a new prompt for a new user input; and providing the new prompt to the automated agent, wherein when the new prompt is received by the automated agent, the automated agent communicates the new prompt through the communications session.

2. The computer-implemented method of claim 1, wherein filtering the set of applicable responses includes:

processing the one or more input variables through a set of data matrices to identify other input variables applicable to the initial prompt; and performing a truth-conditional semantics process on the one or more input variables and the other input variables to generate the tree of applicable responses.

3. The computer-implemented method of claim 1, further comprising:

processing the set of performance metrics to identify a tone for the new prompt; and generating executable code according to the tone, wherein when the executable code is executed by the automated agent, the automated agent updates an avatar to graphically display an emotion corresponding to the tone for the new prompt and the new simulation flow.

4. The computer-implemented method of claim 1, wherein obtaining the set of valid responses further comprises:

processing the one or more input variables and the tree of applicable responses through the set of generative artificial intelligence platforms a pre-defined number of times to generate different sets of response recommendations; and processing the different sets of response recommendations according to a set of statistical methods to derive the confidence scores associated with the different responses.

5. The computer-implemented method of claim 1, wherein obtaining the set of valid responses further comprises:

converting the tree of applicable responses into a set of numerical values, wherein a numerical value from the set of numerical values corresponds to a particular response from the tree;

processing a generative artificial intelligence prompt including the set of numerical values through the set of generative artificial intelligence platforms to obtain an output set of numerical values; and filtering the output set of numerical values according to the tree of applicable responses and the confidence scores to obtain the set of valid responses.

6. The computer-implemented method of claim 1, further comprising:

detecting that the user input includes personally identifiable information (PII); and obfuscating the PII from the user input to prevent dissemination of the PII to the set of generative artificial intelligence platforms.

7. The computer-implemented method of claim 1, wherein obtaining the set of valid responses further comprises:

determining that a confidence score associated with a response is within a set of confidence intervals;

performing a post-validation process on the response through the set of generative artificial intelligence platforms to obtain a new confidence score corresponding to the response; and adding the response to the set of valid responses as a result of the new confidence score satisfying a confidence threshold.

8. A system, comprising:

one or more processors; and memory storing thereon instructions that, as a result of being executed by the one or more processors, cause the system to:

detect a request to initiate a domain-specific simulation performed through a communications session between a user and an automated agent;

identify an initial prompt, wherein the initial prompt is identified from a pool of prompts according to an initial simulation flow, and wherein the pool of prompts and the initial simulation flow are determined based on a domain associated with the domain-specific simulation and a user profile corresponding to the user;

obtain a user input in response to the automated agent presenting the initial prompt through the communications session;

perform a set of transforms on the user input to extract one or more input variables;

filter a set of applicable responses to the initial prompt according to the one or more input variables, the user profile, and a set of applicable response conditions to generate a tree of applicable responses;

process the one or more input variables and the tree of applicable responses through a set of generative artificial intelligence platforms to obtain a set of valid responses corresponding to the user input, wherein the set of valid responses is generated according to confidence scores associated with different responses included in the set of valid responses;

process the set of valid responses to calculate a set of performance metrics corresponding to the domain-specific simulation, wherein the set of performance metrics is used to generate a new simulation flow and to identify a new prompt for a new user input; and provide the new prompt to the automated agent, wherein when the new prompt is received by the automated agent, the automated agent communicates the new prompt through the communications session.

9. The system of claim 8, wherein the instructions that cause the system to filter the set of applicable responses further cause the system to:

process the one or more input variables through a set of data matrices to identify other input variables applicable to the initial prompt; and perform a truth-conditional semantics process on the one or more input variables and the other input variables to generate the tree of applicable responses.

10. The system of claim 8, wherein the instructions further cause the system to:

process the set of performance metrics to identify a tone for the new prompt; and generate executable code according to the tone, wherein when the executable code is executed by the automated agent, the automated agent updates an avatar to graphically display an emotion corresponding to the tone for the new prompt and the new simulation flow.

11. The system of claim 8, wherein the instructions that cause the system to obtain the set of valid responses further cause the system to:

process the one or more input variables and the tree of applicable responses through the set of generative artificial intelligence platforms a pre-defined number of times to generate different sets of response recommendations; and process the different sets of response recommendations according to a set of statistical methods to derive the confidence scores associated with the different responses.

12. The system of claim 8, wherein the instructions that cause the system to obtain the set of valid responses further cause the system to:

convert the tree of applicable responses into a set of numerical values, wherein a numerical value from the set of numerical values corresponds to a particular response from the tree;

process a generative artificial intelligence prompt including the set of numerical values through the set of generative artificial intelligence platforms to obtain an output set of numerical values; and filter the output set of numerical values according to the tree of applicable responses and the confidence scores to obtain the set of valid responses.

13. The system of claim 8, wherein the instructions further cause the system to:

detect that the user input includes personally identifiable information (PII); and obfuscate the PII from the user input to prevent dissemination of the PII to the set of generative artificial intelligence platforms.

14. The system of claim 8, wherein the instructions that cause the system to obtain the set of valid responses further cause the system to:

determine that a confidence score associated with a response is within a set of confidence intervals;

perform a post-validation process on the response through the set of generative artificial intelligence platforms to obtain a new confidence score corresponding to the response; and add the response to the set of valid responses as a result of the new confidence score satisfying a confidence threshold.

15. A non-transitory computer-readable storage medium storing thereon executable instructions that, as a result of being executed by one or more processors of a computer system, cause the computer system to:

detect a request to initiate a domain-specific simulation performed through a communications session between a user and an automated agent;

identify an initial prompt, wherein the initial prompt is identified from a pool of prompts according to an initial simulation flow, and wherein the pool of prompts and the initial simulation flow are determined based on a domain associated with the domain-specific simulation and a user profile corresponding to the user;

obtain a user input in response to the automated agent presenting the initial prompt through the communications session;

perform a set of transforms on the user input to extract one or more input variables;

filter a set of applicable responses to the initial prompt according to the one or more input variables, the user profile, and a set of applicable response conditions to generate a tree of applicable responses;

process the one or more input variables and the tree of applicable responses through a set of generative artificial intelligence platforms to obtain a set of valid responses corresponding to the user input, wherein the set of valid responses is generated according to confidence scores associated with different responses included in the set of valid responses;

process the set of valid responses to calculate a set of performance metrics corresponding to the domain-specific simulation, wherein the set of performance metrics is used to generate a new simulation flow and to identify a new prompt for a new user input; and provide the new prompt to the automated agent, wherein when the new prompt is received by the automated agent, the automated agent communicates the new prompt through the communications session.

16. The non-transitory computer-readable storage medium of claim 15, wherein the executable instructions that cause the computer system to filter the set of applicable responses further cause the computer system to:

process the one or more input variables through a set of data matrices to identify other input variables applicable to the initial prompt; and perform a truth-conditional semantics process on the one or more input variables and the other input variables to generate the tree of applicable responses.

17. The non-transitory computer-readable storage medium of claim 15, wherein the executable instructions further cause the computer system to:

process the set of performance metrics to identify a tone for the new prompt; and generate executable code according to the tone, wherein when the executable code is executed by the automated agent, the automated agent updates an avatar to graphically display an emotion corresponding to the tone for the new prompt and the new simulation flow.

18. The non-transitory computer-readable storage medium of claim 15, wherein the executable instructions that cause the computer system to obtain the set of valid responses further cause the computer system to:

process the one or more input variables and the tree of applicable responses through the set of generative artificial intelligence platforms a pre-defined number of times to generate different sets of response recommendations; and process the different sets of response recommendations according to a set of statistical methods to derive the confidence scores associated with the different responses.

19. The non-transitory computer-readable storage medium of claim 15, wherein the executable instructions that cause the computer system to obtain the set of valid responses further cause the computer system to:

convert the tree of applicable responses into a set of numerical values, wherein a numerical value from the set of numerical values corresponds to a particular response from the tree;

process a generative artificial intelligence prompt including the set of numerical values through the set of generative artificial intelligence platforms to obtain an output set of numerical values; and filter the output set of numerical values according to the tree of applicable responses and the confidence scores to obtain the set of valid responses.

20. The non-transitory computer-readable storage medium of claim 15, wherein the executable instructions further cause the computer system to:

detect that the user input includes personally identifiable information (PII); and obfuscate the PII from the user input to prevent dissemination of the PII to the set of generative artificial intelligence platforms.

21. The non-transitory computer-readable storage medium of claim 15, wherein the executable instructions that cause the computer system to obtain the set of valid responses further cause the computer system to:

determine that a confidence score associated with a response is within a set of confidence intervals;

perform a post-validation process on the response through the set of generative artificial intelligence platforms to obtain a new confidence score corresponding to the response; and add the response to the set of valid responses as a result of the new confidence score satisfying a confidence threshold.

* * * * *